（12） United States Patent
Long et al.

(10) Patent No.: US 12,228,831 B2
(45) Date of Patent: Feb. 18, 2025

(54) ARRAY SUBSTRATE AND DISPLAY DEVICE

(71) Applicant: CHENGDU BOE DISPLAY SCI-TECH CO., LTD., Chengdu (CN)

(72) Inventors: Chunping Long, Beijing (CN); Yongda Ma, Beijing (CN)

(73) Assignee: CHENGDU BOE DISPLAY SCI-TECH CO., LTD., Chengdu (CN)

( * ) Notice: Subject to any disclaimer, the term of this patent is extended or adjusted under 35 U.S.C. 154(b) by 0 days.

(21) Appl. No.: 18/026,218

(22) PCT Filed: Jun. 15, 2022

(86) PCT No.: PCT/CN2022/098833
§ 371 (c)(1),
(2) Date: Mar. 14, 2023

(87) PCT Pub. No.: WO2023/155344
PCT Pub. Date: Aug. 24, 2023

(65) Prior Publication Data
US 2024/0302700 A1    Sep. 12, 2024

(30) Foreign Application Priority Data

Feb. 18, 2022  (CN) .......................... 202210148521.6

(51) Int. Cl.
*G02F 1/1362*    (2006.01)
*G02F 1/1343*    (2006.01)
*G02F 1/1368*    (2006.01)

(52) U.S. Cl.
CPC .. *G02F 1/136286* (2013.01); *G02F 1/134318* (2021.01); *G02F 1/136227* (2013.01); *G02F 1/1368* (2013.01)

(58) Field of Classification Search
CPC ............. G02F 1/136286; G02F 1/1357; G02F 1/134372; G02F 2001/1635; G02F 1/155;
(Continued)

(56) References Cited

U.S. PATENT DOCUMENTS 7,333,170 B2    2/2008  Baek
8,339,545 B2   12/2012  Wang
(Continued)

FOREIGN PATENT DOCUMENTS

CN    101126874 A    2/2008
CN    101202287 A    6/2008
(Continued)

OTHER PUBLICATIONS

Office Action issued by the Chinese Patent Office in the priority application No. 202210148521.6. The Office Action has a mailing date of Mar. 31, 2022.
(Continued)

*Primary Examiner* — Hoan C Nguyen
(74) *Attorney, Agent, or Firm* — Dilworth & Barrese, LLP; Michael J. Musella, Esq.

(57) ABSTRACT

An array substrate and a display device are provided. The array substrate includes a base substrate, gate lines and a metal layer on the base substrate. The metal layer is located on a side of the gate lines away from the base substrate, and includes data lines, a first connecting portion and a first electrode and a second electrode of a thin film transistor. The first electrode is electrically connected to a pixel electrode by the first connecting portion. A gate line includes a gate line pad which includes a protrusion protruding towards a pixel region relative to the portion of the gate line other than the gate line pad. The metal layer located in the pixel region includes a plurality of traces extending along at least part of a contour of the pixel region and including first traces surrounding the protrusion.

18 Claims, 17 Drawing Sheets

(58) Field of Classification Search
CPC ............. G02F 1/134318; G02F 1/1343; G02F 1/136227; G02F 1/1368; G02F 1/136213; G02F 1/134309; G02F 1/1362; G02F 2201/121; G02F 2201/123; G09G 3/3648; G09G 2310/0264

See application file for complete search history.

(56) References Cited

U.S. PATENT DOCUMENTS

| | | | |
|---|---|---|---|
| 8,603,866 | B2 | 12/2013 | Kim et al. |
| 9,470,945 | B2 | 10/2016 | Chang et al. |
| 9,477,127 | B2 | 10/2016 | Li |
| 9,885,930 | B2 | 2/2018 | Wang et al. |
| 10,495,918 | B2 | 12/2019 | Noh et al. |
| 10,684,521 | B2 | 6/2020 | Shin et al. |
| 2011/0097836 | A1* | 4/2011 | Kim .................... H01L 27/1288 257/E21.414 |
| 2011/0156040 | A1* | 6/2011 | Kwack ............... H01L 27/0207 438/30 |
| 2012/0084973 | A1 | 4/2012 | Wu |
| 2012/0099041 | A1 | 4/2012 | Xie et al. |
| 2013/0292713 | A1* | 11/2013 | Wu ...................... H01L 27/156 257/88 |
| 2014/0159059 | A1* | 6/2014 | Jeong ................ G02F 1/133707 438/22 |
| 2015/0001541 | A1* | 1/2015 | Shin .................... H01L 27/1248 257/59 |
| 2015/0370105 | A1 | 12/2015 | Hong et al. |
| 2017/0025440 | A1 | 1/2017 | Koyama |
| 2018/0074355 | A1 | 3/2018 | Cheng et al. |
| 2019/0227399 | A1* | 7/2019 | Shin .................... G02F 1/1343 |

FOREIGN PATENT DOCUMENTS

| | | | |
|---|---|---|---|
| CN | 101217131 | A | 7/2008 |
| CN | 101666948 | A | 3/2010 |
| CN | 101825814 | A | 9/2010 |
| CN | 101840116 | A | 9/2010 |
| CN | 102023429 | A | 4/2011 |
| CN | 201984264 | U | 9/2011 |
| CN | 102236222 | A | 11/2011 |
| CN | 103185994 | A | 7/2013 |
| CN | 103996657 | A | 8/2014 |
| CN | 104007591 | A | 8/2014 |
| CN | 104298035 | A | 1/2015 |
| CN | 104503164 | A | 4/2015 |
| CN | 104898343 | A | 9/2015 |
| CN | 205507295 | U | 8/2016 |
| CN | 107608148 | A | 1/2018 |
| CN | 110068966 | A | 7/2019 |
| CN | 112230480 | A | 1/2021 |
| CN | 215340638 | U | 12/2021 |
| CN | 114236930 | A | 3/2022 |
| JP | H0815711 | | 1/1996 |
| JP | 2005134914 | A | 5/2005 |
| JP | 2010224090 | A | 10/2010 |
| JP | 2011257528 | A | 12/2011 |
| KR | 20080061185 | A * | 7/2008 |
| KR | 20150062741 | A * | 6/2015 |
| WO | 2015172343 | A1 | 11/2015 |

OTHER PUBLICATIONS

International Search Report for PCT application No. PCT/CN2022/098833, which has a mailing date of Nov. 11, 2022.

* cited by examiner

ARRAY SUBSTRATE AND DISPLAY DEVICE

CROSS-REFERENCE TO RELATED APPLICATION

The application is a U.S. National Phase of International Application No. PCT/CN2022/098833 filed on Jun. 15, 2022, which claims priority to the Chinese patent application No. 202210148521.6, filed Feb. 18, 2022, the entire disclosure of which these applications is incorporated herein by reference as part of the present application.

TECHNICAL FIELD

At least one embodiment of the present disclosure relates to an array substrate and a display device.

BACKGROUND

At present, liquid crystal display apparatuses including thin film transistors have been widely used, and an increasing number of liquid crystal display apparatuses are developing toward a wide viewing angle and a high definition to provide users with better use experience.

SUMMARY

Embodiments of the disclosure provide an array substrate and a display device.

At least an embodiment of the disclosure provides an array substrate, comprising: a base substrate; a plurality of gate lines located on the base substrate; a metal layer located on a side of the plurality of gate lines away from the base substrate, wherein the metal layer comprises a plurality of data lines that extend in a first direction and are arranged in a second direction; the plurality of gate lines extend in the second direction and are arranged in the first direction; the first direction and the second direction intersect; the plurality of data lines and the plurality of gate lines intersect to define a plurality of pixel regions; wherein at least one gate line comprises a gate line pad that comprises a protrusion protruding towards the pixel region relative to a portion of the gate line other than the gate line pad, and the metal layer located in the pixel region comprises a plurality of traces extending along at least part of a contour of the pixel region; the plurality of traces comprise a plurality of first traces surrounding at least part of edges of the protrusion, and the plurality of first traces are connected end to end; the array substrate further comprises a pixel electrode and a thin film transistor, wherein the thin film transistor comprises a first electrode, a gate electrode and a second electrode; the first electrode and the second electrode both overlap a film layer where the gate lines are located; the first electrode is electrically connected to the pixel electrode by a first connecting portion, and the second electrode is electrically connected to the data line; the first electrode, the second electrode and the first connecting portion are all structures in the metal layer; the plurality of pixel regions comprise at least one first pixel region and at least one second pixel region; the first pixel region is a pixel region corresponding to the gate line pad, and the second pixel region is a pixel region corresponding to the portion of the gate line other than the gate line pad; the first connecting portion comprises at least part of the plurality of first traces; and a ratio of an area of an orthographic projection of the first connecting portion within the first pixel region on the base substrate to an area of an orthographic projection of the first connecting portion within the second pixel region on the base substrate is 0.8-1.2.

For example, according to an embodiment of the disclosure, each first trace extends in the first direction or the second direction, and the plurality of first traces are connected end to end to form a step structure.

For example, according to an embodiment of the disclosure, the plurality of first traces are connected end to end to form an arc-shaped structure.

For example, according to an embodiment of the disclosure, the first connecting portion overlaps the pixel electrode in a direction perpendicular to the base substrate.

For example, according to an embodiment of the disclosure, the metal layer further comprises a common electrode located in the pixel region; in a direction perpendicular to the base substrate, the common electrode overlaps the pixel electrode, and the first electrode and the second electrode of the thin film transistor are both insulated from the common electrode.

For example, according to an embodiment of the disclosure, the common electrode comprises at least part of the plurality of first traces.

For example, according to an embodiment of the disclosure, the common electrode comprises at least part of the plurality of first traces; and a ratio of an area of an orthographic projection of the common electrode within the first pixel region on the base substrate to an area of an orthographic projection of the common electrode within the second pixel region on the base substrate is 0.8-1.2.

For example, according to an embodiment of the disclosure, a ratio of a length of the common electrode within the first pixel region to a length of the common electrode within the second pixel region is 0.8-1.2.

For example, according to an embodiment of the disclosure, a ratio of a length of the first connecting portion within the first pixel region to a length of the first connecting portion within the second pixel region is 0.8-1.2.

For example, according to an embodiment of the disclosure, the edges of the protrusion comprises a protrusion edge of which an extension direction is parallel neither to the first direction nor to the second direction; a number of the plurality of first traces is greater than or equal to 2, and a length of each first trace is $L_i$; an orthographic projection of each first trace on the base substrate is a first orthographic projection, an orthographic projection of the protrusion edge on the base substrate is a second orthographic projection; the first orthographic projection comprises a long edge extending in an extension direction thereof and close to the second orthographic projection; a minimum distance between the long edge and the second orthographic projection is $d_i$; an included angle between the long edge and the second orthographic projection is Bi; and a first parameter $C_{pad}$ in a capacitance between the first trace and the protrusion edge meets:

$$C_{pad} = \sum_{i=1}^{N} \ln\left(\frac{L_i}{d_i} \times \sin\theta_i + 1\right),$$

with N being the number of the plurality of first traces, i being a positive integer of not less than 1 and N being a positive integer of not less than 2.

For example, according to an embodiment of the disclosure, the first parameter $C_{pad}$ meets: $0.035 \leq C_{pad} \leq 5$.

For example, according to an embodiment of the disclosure, the plurality of traces within the second pixel region comprise a second trace parallel to the second direction, and an edge on a side, close to the second trace, of the gate line having a shortest distance to the second trace is a sloping edge not parallel to the second direction; a minimum distance between an orthographic projection of the second trace on the base substrate and an orthographic projection of the sloping edge on the base substrate is $d_h$; a length of the second trace is $L_h$; an included angle between the orthographic projection of the second trace on the base substrate and the orthographic projection of the sloping edge on the base substrate is $\theta_h$; and a second parameter $C_{tft}$ for a capacitance between the second trace and the sloping edge meets:

$$C_{tft} = \ln\left[\left(\frac{L_h}{d_h}\right) \times \sin\theta_h + 1\right].$$

For example, according to an embodiment of the disclosure, the second parameter $C_{tft}$ meets: $0.01 \leq C_{tft} \leq 2.5$.

For example, according to an embodiment of the disclosure, a ratio of the first parameter to the second parameter meets: $1 \leq C_{pad}/C_{tft} \leq 7$.

For example, according to an embodiment of the disclosure, each of the plurality of traces extends in the first direction or the second direction.

For example, according to an embodiment of the disclosure, the gate line pad is configured to be opposed to a support portion in a direction perpendicular to the base substrate.

For example, according to an embodiment of the disclosure, the first connecting portion extends in the first direction to be electrically connected to the pixel electrode.

For example, according to an embodiment of the disclosure, the gate line pad comprises the gate electrode.

For example, according to an embodiment of the disclosure, the plurality of first traces comprise two portions, and one of the two portions is the common electrode, and the other one of the two portions is the first connecting portion.

For example, according to an embodiment of the disclosure, two gate lines located on two sides of at least one first pixel region each comprise the gate line pad protruding towards the first pixel region; the common electrode comprises the first trace surrounding the protrusion of the gate line pad on one of the two gate lines; and the first connecting portion comprises the first trace surrounding the protrusion of the gate line pad on the other one of the two gate lines.

For example, according to an embodiment of the disclosure, the gate electrode is located on a portion of the gate line other than the gate line pad.

For example, according to an embodiment of the disclosure, the common electrode within the second pixel region comprises a first common sub-electrode extending in the second direction and a second common sub-electrode extending in the first direction; the first common sub-electrode is disposed at a position away from the first electrode of the thin film transistor corresponding to the pixel region where the first common sub-electrode is located; two ends of the first common sub-electrode are electrically connected to two second common sub-electrodes, respectively; and the two second common sub-electrodes are adjacent to two data lines, respectively.

For example, according to an embodiment of the disclosure, the first connecting portion comprises at least a sub-portion extending in the first direction.

For example, according to an embodiment of the disclosure, the first connecting portion comprises a sub-portion extending in the first direction and a sub-portion extending in the second direction.

For example, according to an embodiment of the disclosure, the array substrate further comprises a common electrode line disposed at a same layer with the plurality of gate lines, wherein the common electrode is electrically connected to the common electrode line.

For example, according to an embodiment of the disclosure, the common electrode line extends in the second direction, and the first connecting portion overlaps the common electrode line in the direction perpendicular to the base substrate.

For example, according to an embodiment of the disclosure, an insulating layer is disposed between the pixel electrode and the metal layer; the first connecting portion is electrically connected to the pixel electrode through a via hole in the insulating layer; and a straight line parallel to the first direction passes through an orthographic projection of the via hole and the gate line pad on the base substrate.

For example, according to an embodiment of the disclosure, the common electrode further comprises a third common sub-electrode extending in the first direction; and the third common sub-electrode and at least part of the sub-portions extending in the first direction in the first connecting portion are located in a same straight line to divide the pixel region into two subpixel regions.

For example, according to an embodiment of the disclosure, at least part of the first connecting portion and the third common sub-electrode are located on two sides of the common electrode line, respectively.

For example, according to an embodiment of the disclosure, the metal layer further comprises a second connecting portion that connects the data line and the second electrode of the thin film transistor; the gate line comprises a hollowed-out pattern; and the data line overlaps the hallowed-out pattern.

For example, according to an embodiment of the disclosure, the second connecting portion overlaps the hallowed-out pattern.

For example, according to an embodiment of the disclosure, a first end of the second connecting portion is electrically connected to the second electrode of the thin film transistor, and a second end of the second connecting portion is electrically connected to the data line; and a width of the hallowed-out pattern increases gradually in a direction from the first end pointing to the second end.

For example, according to an embodiment of the disclosure, the first connecting portion and the first electrode of the thin film transistor are of an integrated structure.

At least one embodiment of the disclosure provides an array substrate, comprising: a base substrate; a plurality of gate lines located on the base substrate; a metal layer located on a side of the plurality of gate lines away from the base substrate, wherein the metal layer comprises a plurality of data lines that extend in a first direction and are arranged in a second direction; the plurality of gate lines extend in the second direction and are arranged in the first direction; the first direction and the second direction intersect; the plurality of data lines and the plurality of gate lines intersect to define a plurality of pixel regions; wherein at least one gate line comprises a gate line pad that comprises a protrusion protruding towards the pixel region relative to a portion of the gate line other than the gate line pad, and the metal layer located in the pixel region comprises a plurality of traces extending along at least part of a contour of the pixel region; the plurality of traces comprise a plurality of first traces surrounding at least part of edges of the protrusion, and the plurality of first traces are connected end to end; the array substrate further comprises a pixel electrode and a thin film transistor, wherein the thin film transistor comprises a first electrode, a gate electrode and a second electrode; the first electrode and the second electrode both overlap a film layer where the gate lines are located; the first electrode is electrically connected to the pixel electrode by a first connecting portion, and the second electrode is electrically connected to the data line; the first electrode, the second electrode and the first connecting portion are all structures in the metal layer; the metal layer further comprises a common electrode located in the pixel region; in a direction perpendicular to the base substrate, the common electrode overlaps the pixel electrode, and the first electrode and the second electrode of the thin film transistor are both insulated from the common electrode; the plurality of pixel regions comprise at least one first pixel region and at least one second pixel region; the first pixel region is a pixel region corresponding to the gate line pad, and the second pixel region is a pixel region corresponding to the portion of the gate line other than the gate line pad; the common electrode comprises at least part of the plurality of first traces; and a ratio of an area of an orthographic projection of the common electrode within the first pixel region on the base substrate to an area of an orthographic projection of the common electrode within the second pixel region on the base substrate is 0.8-1.2.

For example, according to an embodiment of the disclosure, each first trace extends in the first direction or the second direction, and the plurality of first traces are connected end to end to form a step structure.

For example, according to an embodiment of the disclosure, the plurality of first traces are connected end to end to form an arc-shaped structure.

For example, according to an embodiment of the disclosure, a ratio of a length of the common electrode within the first pixel region to a length of the common electrode within the second pixel region is 0.8-1.2.

For example, according to an embodiment of the disclosure, the gate line pad is configured to be opposed to a support portion in the direction perpendicular to the base substrate.

For example, according to an embodiment of the disclosure, the metal layer further comprises a second connecting portion that connects the data line and the second electrode of the thin film transistor; the gate line comprises a hollowed-out pattern; the data line overlaps the hallowed-out pattern; and the second connecting portion overlaps the hallowed-out pattern.

Another embodiment of the disclosure provides a display device, comprising the array substrate according to any embodiments as mentioned above.

BRIEF DESCRIPTION OF DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

Figure 1:
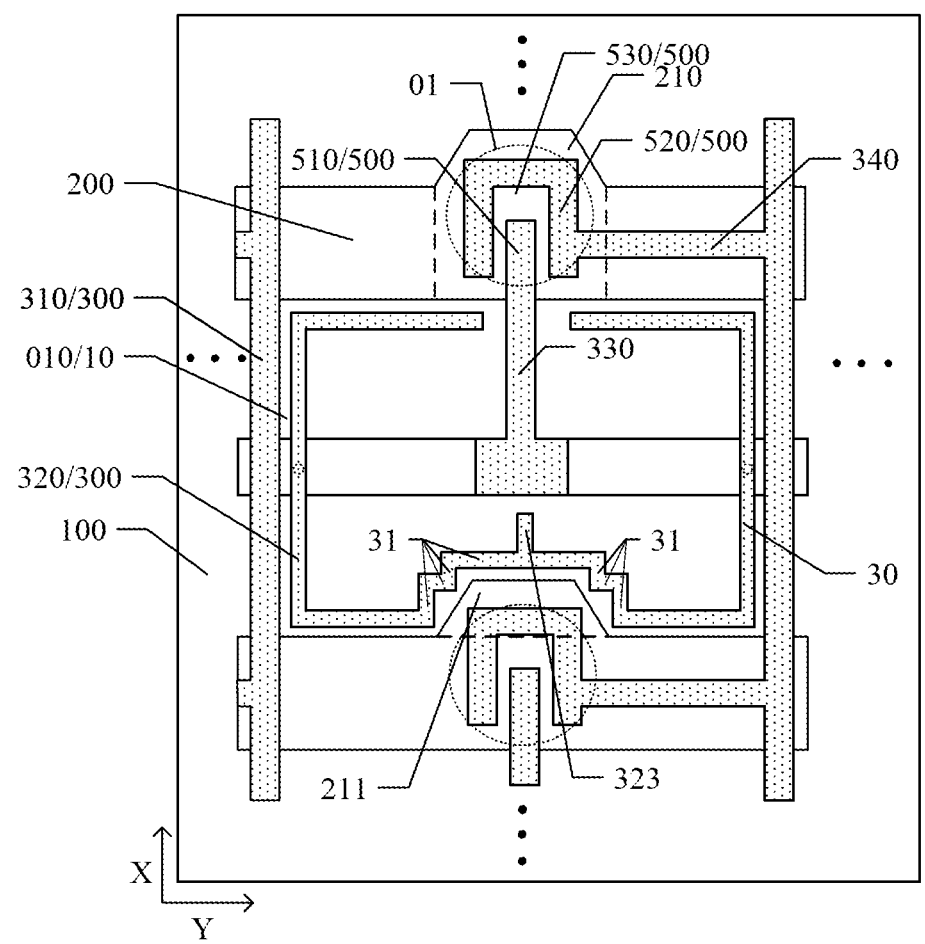
FIG. 1 is a schematic diagram illustrating a partial planar structure of an array substrate according to an example of an embodiment of the present disclosure.

List of Reference Numerals: 01—support portion; 010—first pixel region; 020—second pixel region; 10—pixel region; 11—via hole; 12—via hole; 13—insulating layer; 30—trace; 31—first trace; 32—second trace; 33—trace sub-portion; 100—base substrate; 200—gate line; 201—hollowed-out pattern; 210—gate line pad; 211—protrusion; 2110—protrusion edge; 300—metal layer; 310—data line; 320—common electrode; 321—first common sub-electrode; 322—second common sub-electrode; 323—third common sub-electrode; 324—fourth common sub-electrode; 330—first connecting portion; 340—second connecting portion; 400—pixel electrode; 500—thin film transistor; 510—first electrode; 520—second electrode; 530—gate electrode; and 600—common electrode line.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise specified, the technical terms or scientific terms used in the disclosure shall have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components.

Embodiments of the present disclosure provide an array substrate and a display device. The array substrate includes a base substrate, and a plurality of gate lines and a metal layer that are located on the base substrate. The metal layer is located on a side, away from the base substrate, of the plurality of gate lines. The metal layer includes a plurality of data lines that extend in a first direction and are arranged in a second direction. The plurality of gate lines extend in the second direction and are arranged in the first direction. The first direction and the second direction intersect. The plurality of data lines and the plurality of gate lines intersect to define a plurality of pixel regions. At least one gate line includes a gate line pad that includes a protrusion protruding towards the pixel region relative to a portion of the gate line other than the gate line pad, and the metal layer located in the pixel region includes a plurality of traces extending along at least part of a contour of the pixel region. The plurality of traces include a plurality of first traces surrounding at least part of edges of the protrusion. Each first trace extends in the first direction or the second direction, and the plurality of first traces are connected end to end to form a step structure. In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

The array substrate and the display device provided in the embodiments of the present disclosure will be described below with reference to the accompanying drawings.

FIG. 1 is a schematic diagram illustrating a partial planar structure of an array substrate according to an example of an embodiment of the present disclosure. As shown in FIG. 1, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10. FIG. 1 schematically illustrates a pixel region 10.

For example, as shown in FIG. 1, the plurality of data lines 310 extend in an X-direction and arranged in a Y-direction. The plurality of gate lines 200 extend in the Y-direction and are arranged in the X-direction. For example, FIG. 1 schematically illustrates that the first direction is the X-direction, while the second direction is the Y-direction, the first direction being perpendicular to the second direction. Without limitation, the first direction may not be perpendicular to the second direction, either. For example, an included angle between the two directions may be 30-60 degrees. For example, the first direction and the second direction may be interchangeable.

For example, FIG. 1 schematically illustrates that a planar shape (the planar shape parallel to plane XY) of each data line 310 is a linear strip shape extending in the first direction. Without limitation, the planar shape of the data line 310 may also be a non-linear strip shape extending as a whole in the first direction, e.g., a broken line shape. For example, FIG. 1 schematically illustrates that the planar shape of each data line 310 is a linear strip shape having an identical width at every part. Without limitation, the planar shape of each data line 310 may also be a strip shape having unequal widths. The specific shape of the data line may be set according to product requirements. For example, the overall extension direction of each gate line 200 is the second direction. For example, the planar shape of the gate line 200 may be a strip shape having unequal widths. Without limitation, the specific shape of the gate line may be set according to product requirements.

For example, as shown in FIG. 1, two adjacent data lines 310 and two adjacent gate lines 200 are disposed crosswise to define a pixel region 10. For example, a pixel region 10 is a subpixel. For example, the array substrate includes a plurality of subpixels (a plurality of pixel regions 10) that include subpixels configured to display light of different colors. For example, the plurality of subpixels include a red subpixel configured to display red light, a green subpixel configured to display green light, and a blue subpixel configured to display blue light. For example, two adjacent subpixels arranged in at least one of the first direction and the second direction are subpixels configured to display light of different colors, respectively.

For example, a shape of the pixel region 10 is a polygon. For example, the shape of the pixel region 10 is a quadrangle. For example, the shape of the pixel region 10 is a rectangle. The embodiments of the present disclosure have no limitation on this. The shape of the pixel region 10 is related to shapes of an edge of the data line 310 and an edge of the gate line 200.

For example, each pixel region 10 includes a display region for display. An area of the display region may be smaller than that of the pixel region 10. For example, a shape of the display region may be the same as that of the pixel region 10. Alternatively, the shape of the display region may be different from that of the pixel region 10.

For example, as shown in FIG. 1, the metal layer 300 further includes a common electrode 320 located in the pixel region 10. For example, the common electrode 320 may be a film layer disposed at a same layer and made of a same material with the data line 310. As a matter of course, the embodiments of the present disclosure are not limited thereto, and the common electrode may also be disposed at a different layer from the metal layer.

As shown in FIG. 1, at least one gate line 200 includes a gate line pad 210 that includes a protrusion 211 protruding towards the pixel region 10 relative to a portion of the gate line 200 other than the gate line pad 210.

For example, as shown in FIG. 1, the gate line pad 210 is part of structure of the gate line 200. For example, in the X-direction, a width of the gate line pad 210 is greater than a width of the portion of the gate line 200 other than the gate line pad 210. For example, in a width direction, a portion, protruding relative to the portion of the gate line 200 other than the gate line pad 210, of the gate line pad 210 is a protrusion 211.

For example, as shown in FIG. 1, the gate line pad 210 may include a protrusion 211 protruding relative to a side of the gate line 200. For example, a plurality of gate line pads 210 may be disposed on one gate line 200, and the plurality of gate line pads 210 each include a protrusion 211 protruding relative to the same side of the gate line 200.

For example, the pixel region 10 includes no protrusion 211.

For example, as shown in FIG. 1, the gate line pad 210 is configured to be opposed to a support portion 01. For example, the gate line pad 210 overlaps the support portion 01 in a direction perpendicular to the base substrate 100. For example, an orthographic projection of the gate line pad 210 on the base substrate 100 may overlap an orthographic projection of the support portion 01 on the base substrate 100. For example, the orthographic projection of the support portion 01 on the base substrate 100 may completely fall into the orthographic projection of the gate line pad 210 on the base substrate 100. For example, FIG. 1 schematically illustrates that a planar shape, parallel to the plane XY, of the support portion 01 is a circle, which, without limitation, may also be a regular shape such as a polygon, or an irregular shape.

The "direction perpendicular to the base substrate 100" described above is a direction perpendicular to a main board surface of the base substrate 100 on which the structures such as the gate lines are disposed, e.g., a direction perpendicular to the plane XY.

For example, the array substrate may be an array substrate in a liquid crystal display panel, and the liquid crystal display panel may also include an opposed substrate (not shown), a liquid crystal layer located between the array substrate and the opposed substrate, and a sealant for encapsulating the liquid crystal layer. For example, the opposed substrate may be a color film substrate. For example, the support portion 01 (also referred to as a spacer) is located in the liquid crystal layer between the array substrate and the opposed substrate to maintain the gap cell uniformity of the display panel. For example, the support portion 01 may be a photosensitive spacer support, i.e., a spacer having high position accuracy formed by photo lithography of a photosensitive composition. The support portion 01 includes a resin, a polymeric compound, a photopolymerization initiator, etc., which will not be limited in the embodiments of the present disclosure.

For example, the liquid crystal display panel further includes a first polarizing layer disposed on a side, away from the opposed substrate, of the array substrate, and a second polarizing layer disposed on a side, away from the array substrate, of the opposed substrate. For example, a backlight source may be disposed on a non-display side of the display panel. The backlight source is configured to provide backlight to the display panel.

For example, the array substrate includes a support portion 01 that overlaps the gate line 210 in the direction perpendicular to the base substrate 100. Without limitation, the support portion may be disposed on the opposed substrate. The position of the support portion may be set according to product requirements.

For example, a position of the gate line pad 210 may be set according to the position of the support portion 01. For example, the number of support portions 01 is K, and the number of gate line pads 210 is also K. The support portions 01 are disposed correspondingly to the gate line pads 210 one to one.

As shown in FIG. 1, the metal layer 300 located in the pixel region 10 includes a plurality of traces 30 extending along at least part of a contour of the pixel region 10. For example, at least part of the above-mentioned plurality of traces 30 are electrically connected traces. For example, the electrically connected traces in the above-mentioned plurality of traces 30 are integrated traces. The "integrated traces" described above may be traces formed by performing a same patterning process on a same metal material layer. The "plurality of traces 30 extending along at least part of the contour of the pixel region 10" described above may refer to the plurality of traces extending along an edge of the data line 310 and an edge of the gate line 200. The plurality of traces extending along at least part of the contour of the pixel region described above may be parallel to the extension direction of the edge of the data line or the gate line. Without limitation, part of the plurality of traces may not be parallel to a certain portion of the edge of the gate line or the data line, either. Whether a trace is parallel to an edge of a signal line (including the gate line and the data line) adjacent (in a planar view) thereto may be set according to product requirements.

For example, as shown in FIG. 1, an edge of the protrusion 211 of the gate line pad 210 includes a broken line or a curve.

As shown in FIG. 1, the plurality of traces 30 include a plurality of first traces 31 surrounding at least part of edges of the protrusion 211. Each first trace 31 extends in the first direction or the second direction, and the plurality of first traces 31 are connected end to end to form a step structure. The "plurality of first traces 31 surrounding at least part of edges of the protrusion 211" described above may refer to an orthographic projection of the plurality of first traces 31 on the base substrate 100 surrounding an orthographic projection of at least part of edges of the protrusion 211 on the base substrate 100.

In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

For example, two first traces 31, connected end to end, in the plurality of first traces 31 are electrically connected. For example, the plurality of first traces 31 may be of an integrated structure. For example, a distance between the orthographic projection of the plurality of first traces 31 on the base substrate 100 and the surrounded orthographic projection of the edges of the protrusion 211 on the base substrate is smaller than a distance between an orthographic projection of other trace on the base substrate 100 and the edge of the protrusion 211. For example, distances between different first traces 31 and the surrounded edges of the protrusion 211 may be the same or different. For example, an extension direction of the first trace 31 may be parallel to the surrounded edge of the protrusion 211. The extension direction of the first trace 31 may also intersect the surrounded edge of the protrusion 211.

For example, as shown in FIG. 1, the extension direction of the traces 30 other than the first traces 31 in the plurality of traces 30 may be parallel to the extension direction of the adjacent data line 310 or gate line 200. For example, the extension direction of the traces 30 other than the first traces 31 in the plurality of traces 30 may be parallel to the extension direction of the edge, close to the traces 30, of the adjacent data line 310 or gate line 200.

For example, as shown in FIG. 1, two traces 30 located at two outermost ends of the plurality of first traces 31 may extend in the second direction. For example, the two traces 30 located at the two outermost ends of the plurality of first traces 31 may be both electrically connected to the first traces 31. For example, the two traces 30 located at the two outermost ends of the plurality of first traces 31 may be both of an integrated structure with the first traces 31. Without limitation, one of the two traces located at the two outermost ends of the plurality of first traces may also be spaced apart from the first traces.

For example, as shown in FIG. 1, any trace 31 in the plurality of traces 30 may extend in the first direction or extend in the second direction.

For example, as shown in FIG. 1, a shape of the protrusion 211 may be a trapezoid, and an upper base of the trapezoid protrudes towards the pixel region 10 relative to other portion of the gate line 200, while the lower base of the trapezoid may be flush with at least part of edges of the other portion of the gate line 200.

For example, as shown in FIG. 1, the protrusion 211 is disposed on only one side of the gate line 200, and an edge at a position opposite to the protrusion 211 on the other side of the gate line 200 extends in the Y-direction. In this case, the plurality of first traces 31 in the plurality of traces 30 within each pixel region are centrally distributed at a position in the plurality of traces 30 to surround one protrusion 211.

In the array substrate provided in the embodiments of the present disclosure, no matter whether the edges of the protrusion are parallel to the first direction and the second direction, the first traces surrounding the edges of the protrusion are designed to extend in the first direction or the second direction so that the influence of the plurality of traces on the aperture ratio of the pixel region can be minimized.

Figure 2:
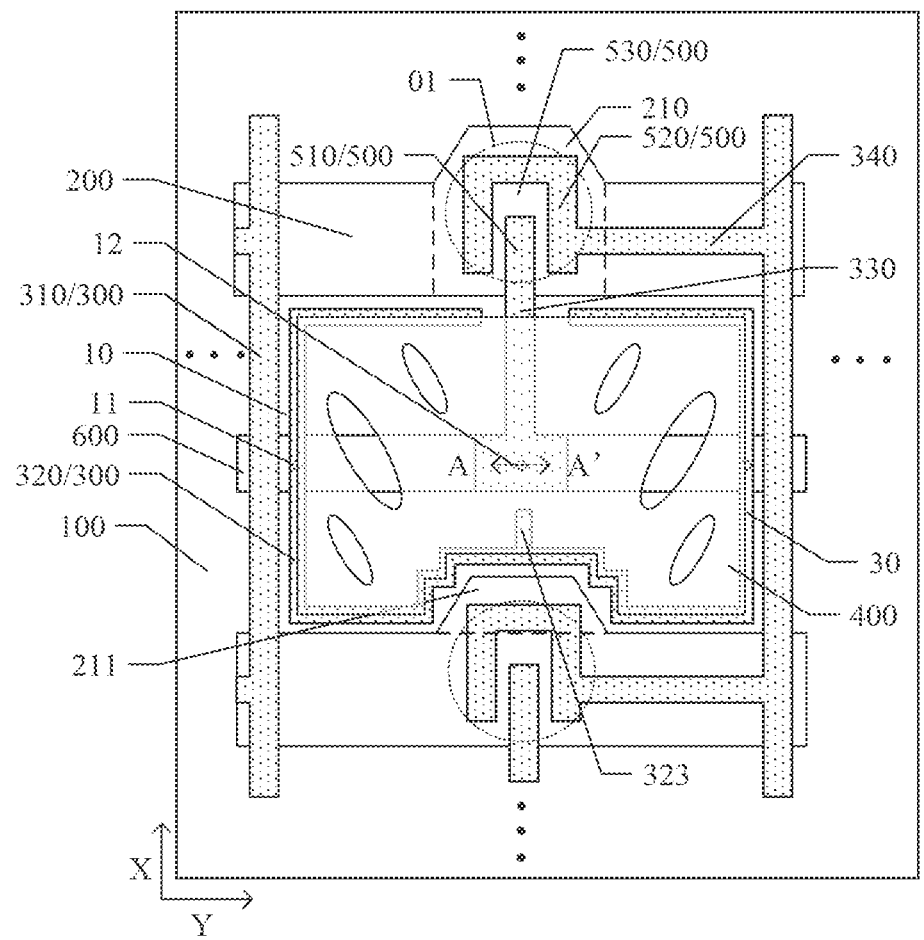
FIG. 2 is a schematic diagram illustrating a partial planar structure of the array substrate shown in FIG. 1 with a pixel electrode disposed thereon.

FIG. 2 is a schematic diagram illustrating a partial planar structure of the array substrate shown in FIG. 1 with a pixel electrode disposed thereon. For example, as shown in FIG. 1 and FIG. 2, the array substrate further includes a plurality of pixel electrodes 400 and a plurality of thin film transistors 500. For example, the pixel electrode 400 overlaps the metal layer 300 in the direction perpendicular to the base substrate 100. For example, each pixel region 10 includes one pixel electrode 400. The pixel electrode 400 included in each pixel region 10 may be an entire electrode. Without limitation, the pixel electrode included in each pixel region may also be a plurality of strip-shaped structures. For example, the pixel electrode 400 may be a transparent conductive material. The pixel electrode 400 covers a light-emitting region of the pixel region 10.

For example, as shown in FIG. 1, the embodiment of the present disclosure schematically illustrates that the pixel electrode 400 is located on a side, away from the base substrate 100, of the metal layer 300. Without limitation, the pixel electrode may be located between the metal layer and the base substrate. The positions of the pixel electrode and the metal layer may be set according to product requirements.

For example, as shown in FIG. 1 and FIG. 2, each pixel region 10 may include one thin film transistor 500. Without limitation, the number of the thin film transistors included in each pixel region may be set according to the performance of a desired pixel electrode. For example, the number of the thin film transistors in each pixel region may be 2 or more.

For example, as shown in FIG. 1 and FIG. 2, each thin film transistor 500 includes a first electrode 510, a gate electrode 530 and a second electrode 520. The first electrode 510 and the second electrode 520 both overlap a film layer where the gate lines 200 are located. For example, the thin film transistor 500 further includes an active layer. The first electrode 510 and the second electrode 520 both overlap the active layer, and the gate electrode 530 overlaps the active layer.

For example, as shown in FIG. 1 and FIG. 2, the first electrode 510 of the thin film transistor 500 is electrically connected to the pixel electrode 400 by a first connecting portion 330, and the second electrode 520 of the thin film transistor 500 is electrically connected to the data line 310.

Figure 3:
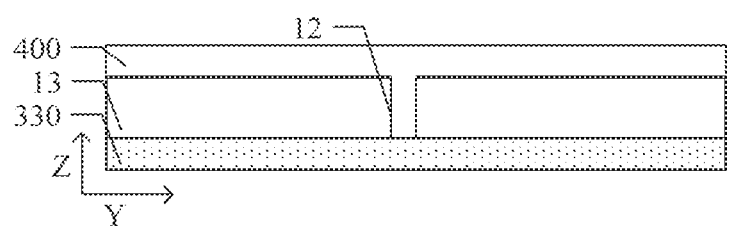
FIG. 3 is a sectional view of a metal layer, an insulating layer and a pixel electrode taken along line AA' shown in FIG. 2.

FIG. 3 is a sectional view of a metal layer, an insulating layer and a pixel electrode taken along line AA' shown in FIG. 2. For example, as shown in FIG. 1 to FIG. 3, an insulating layer 13 is disposed between the pixel electrode 400 and the metal layer 300, and the first connecting portion 330 is electrically connected to the pixel electrode 400 through a via hole 12 in the insulating layer 13.

For example, as shown in FIG. 1 and FIG. 2, the first electrode 510 of the thin film transistor 500, the second electrode 520 of the thin film transistor 500 and the first connecting portion 330 are all structures in the metal layer 300. For example, the first electrode 510 of the thin film transistor 500 and the second electrode 520 of the thin film transistor 500 are both insulated from the common electrode 320. For example, the first electrode 510 of the thin film transistor 500 and the second electrode 520 of the thin film transistor 500 are both spaced apart from the common electrode 320. For example, the first connecting portion 330 is spaced apart from the common electrode 320.

For example, as shown in FIG. 1 and FIG. 2, the first electrode 510 of the thin film transistor 500 and the first connecting portion 330 may be of an integrated structure. Without limitation, the first electrode 510 of the thin film transistor 500 and the first connecting portion 330 may also be of a structure formed by the two electrically connected. For example, the first electrode 510 of the thin film transistor 500 may be a portion where the metal layer 300 overlaps the active layer, and the first connecting portion 330 may be a portion where the metal layer 300 does not overlap the active layer.

For example, as shown in FIG. 1 and FIG. 2, the first connecting portion 330 and the common electrode 320 both overlap the pixel electrode 400 in the direction perpendicular to the base substrate 100. For example, part of the first connecting portion 330 overlaps the pixel electrode 400 in the direction perpendicular to the base substrate 100. For example, part of the common electrode 320 overlaps the pixel electrode 400 in the direction perpendicular to the base substrate 100.

For example, as shown in FIG. 1, a straight line extending in the first direction passes through an orthographic projection of the first electrode 510 of the thin film transistor 500 on the base substrate 100 and an orthographic projection of the via hole 12 on the base substrate 100. For example, the first connecting portion 330 includes at least a sub-portion extending in the first direction. For example, the first connecting portion 330 includes only the sub-portion extending in the first direction. For example, the sub-portion, extending in the first direction, in the first connecting portion 330 is electrically connected to the pixel electrode 400.

For example, as shown in FIG. 1, the metal layer 300 further includes a second connecting portion 340 that connects the data line 310 and the second electrode 520 of the thin film transistor 500.

For example, as shown in FIG. 1, the second connecting portion 340 overlaps the gate line 200 in the direction perpendicular to the base substrate 100. For example, the second connecting portion 340 may be of an integrated structure with the second electrode 520 of the thin film transistor 500. For example, the second connecting portion 340 may be of an integrated structure with the data line 310. For example, the second electrode 520 of the thin film transistor 500, the second connecting portion 340 and the data line 310 may be of an integrated structure. Without limitation, the second connecting portion and the second electrode of the thin film transistor may also be of a structure formed by the two electrically connected, or the second connecting portion and the data line may also be of a structure formed by the two electrically connected.

For example, the second connecting portion 340 may extend in the second direction. For example, the second connecting portion 340 is spaced apart from the common electrode 320. For example, the second connecting portion 340 is a portion where the metal layer 300 does not overlap the active layer of the thin film transistor 500. For example, the second connecting portion 340 does not overlap the pixel electrode 400 in the direction perpendicular to the base substrate 100.

Figure 4:
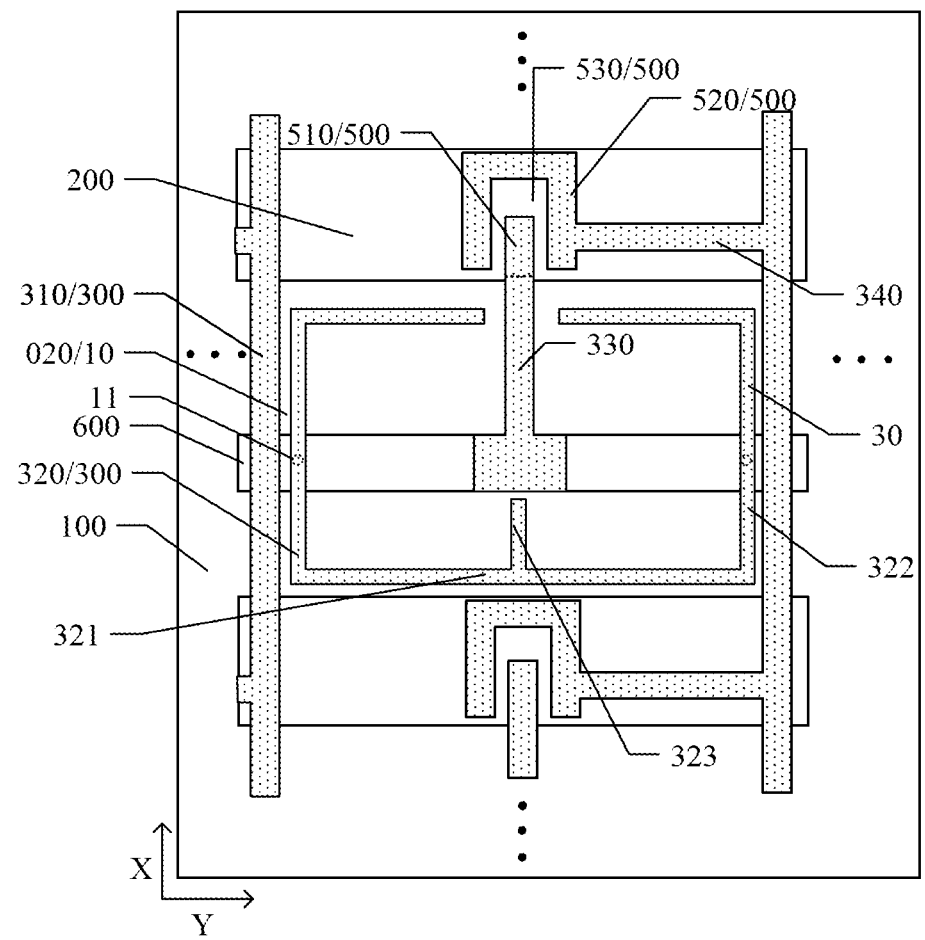
FIG. 4 is a schematic diagram of another pixel region on the array substrate shown in FIG. 1.

FIG. 4 is a schematic diagram of another pixel region on the array substrate shown in FIG. 1. For example, as shown in FIG. 1 to FIG. 4, the plurality of pixel regions 10 include at least one first pixel region 010 and at least one second pixel region 020. The first pixel region 010 is a pixel region 10 corresponding to the gate line pad 210, while the second pixel region 020 is a pixel region 10 corresponding to the portion of the gate line 200 other than the gate line pad 210.

For example, as shown in FIG. 1 to FIG. 4, the first pixel region 010 and the second pixel region 020 are different pixel regions. That is, the first pixel region 010 and the second pixel region 020 are regions defined by different data lines 310 crossing with different gate lines 200. For example, the number of the second pixel regions 020 may be greater than that of the first pixel regions 010. Without limitation, the number of the second pixel regions 020 may be less than that of the first pixel regions 010, or the number of the second pixel regions 020 may be equal to that of the first pixel regions 010.

For example, as shown in FIG. 4, the second pixel region 020 corresponds to a position, at which no gate line pad is located, of the gate line 200. The extension direction of each trace 30 located within the second pixel region 020 and extending along at least part of the contour of the second pixel region 020 may be parallel to the extension direction of the edge, close to the second pixel region 020, of a signal line (a gate line or a data line) adjacent to the trace 30.

For example, as shown in FIG. 1 and FIG. 4, the gate line 200 corresponding to the second pixel region 020 may be as wide as the gate line 200 on two sides of the gate line pad 210 corresponding to the first pixel region 010. Without limitation, for example, the gate line 200 corresponding to the second pixel region 020 may be different in width from the gate line 200 on two sides of the gate line pad 210 corresponding to the first pixel region 010. For example, the gate line 200 corresponding to the second pixel region 020 has an identical width at every position. Without limitation, one portion of the gate line 200 corresponding to the second pixel region 020 may be different in width from the other portion. For example, the gate line 200 corresponding to the second pixel region 020 may have a greater width at a position where the gate electrode of the thin film transistor is located than at other positions. For example, the gate electrode of the thin film transistor may be a portion of the gate line.

For example, as shown in FIG. 1 to FIG. 4, the common electrode 320 includes at least part of the plurality of first traces; and a ratio of an area of an orthographic projection of the common electrode 320 within the first pixel region 010 on the base substrate 100 to an area of an orthographic projection of the common electrode 320 within the second pixel region 020 on the base substrate 100 is 0.8-1.2. For example, the ratio of the area of the orthographic projection of the common electrode 320 within the first pixel region 010 on the base substrate 100 to the area of the orthographic projection of the common electrode 320 within the second pixel region 020 on the base substrate 100 is 0.9-1.1. For example, the area of the orthographic projection of the common electrode 320 within the first pixel region 010 on the base substrate 100 is roughly equal to the area of the orthographic projection of the common electrode 320 within the second pixel region 020 on the base substrate 100.

The pixel electrode within each pixel region overlaps the common electrode. The ratio of the area of the orthographic projection of the common electrode disposed within the first pixel region corresponding to the gate line pad (i.e., the position where the support portion is disposed) to the area of the orthographic projection of the common electrode disposed within the second pixel region corresponding to non-gate line pad (i.e., the position where no support portion is disposed) is designed to be 0.8-1.2 so that the difference between capacitances generated between the pixel electrodes and the common electrodes within different pixel regions can be reduced and the consistency of the capacitances of different pixel regions can be improved. Thus, the display effect of a display device using the array substrate may be improved.

For example, an overlapping area of the common electrode 320 and the pixel electrode within the first pixel region 010 is a first overlapping area, while an overlapping area of the common electrode 320 and the pixel electrode within the second pixel region 020 is a second overlapping area, and a ratio of the first overlapping area to the second overlapping area is 0.8-1.2. For example, the ratio of the first overlapping area to the second overlapping area is 0.9-1.1. For example, the first overlapping area is roughly equal to the second overlapping area.

The ratio of the first overlapping area of the common electrode and the pixel electrode disposed within the first pixel region corresponding to the gate line pad (i.e., the position where the support portion is disposed) to the second overlapping area of the common electrode and the pixel electrode disposed within the second pixel region corresponding to non-gate line pad (i.e., the position where no support portion is disposed) is designed to be 0.8-1.2 so that the difference between capacitances generated between the pixel electrodes and the common electrodes within different pixel regions can be reduced and the consistency of the capacitances of different pixel regions can be improved. Thus, the display effect of a display device using the array substrate may be improved.

For example, as shown in FIG. 1 to FIG. 4, a ratio of a length of the common electrode 320 within the first pixel region 010 to a length of the common electrode 320 within the second pixel region 020 is 0.8-1.2. For example, the ratio of the length of the common electrode 320 within the first pixel region 010 to the length of the common electrode 320 within the second pixel region 020 is 0.9-1.1. For example, the common electrode 320 within each pixel region 10 may be a metal trace which is uniform in width.

The common electrode includes the first trace. According to an example of the embodiment of the present disclosure, the common electrode within the first pixel region is formed into a broken line shape at a position corresponding to the gate line pad, and each common electrode in the broken line-shaped metal line is set to extend in the first direction or the second direction, which is conducive to allowing the length of the common electrode within the first pixel region to be equal to that of the common electrode within the second pixel region as much as possible. The difference between capacitances generated between the pixel electrodes and the common electrodes within different pixel regions can be reduced and the consistency of the capacitances of different pixel regions can be improved. Thus, the display effect of a display device using the array substrate may be improved.

For example, as shown in FIG. 1, the first trace 31 may be the common electrode 320. For example, the length of each first trace 31 may be smaller than the length of part of other traces than the first traces 31 in the plurality of traces 30.

For example, as shown in FIG. 4, the common electrode 320 within the second pixel region 020 includes a first common sub-electrode 321 extending in the second direction and a second common sub-electrode 322 extending in the first direction. The first common sub-electrode 321 is disposed at a position away from the first electrode 510 of the thin film transistor 500 corresponding to the pixel region where the first common sub-electrode 321 is located. Two ends of the first common sub-electrode 321 are electrically connected to two second common sub-electrodes 322, respectively, and the two second common sub-electrodes 322 are adjacent to two data lines 310, respectively. The "two second common sub-electrodes 322 being adjacent to two data lines 310, respectively" described above may refer to that no other common electrode or other data line is disposed between the orthographic projection of each second common sub-electrode 322 on the base substrate 100 and the orthographic projection of the corresponding data line 310 on the base substrate 100.

For example, as shown in FIG. 1 to FIG. 4, a distance between the first trace 31 in the first pixel region 010 and the first electrode 510 of the thin film transistor 500 corresponding to the first pixel region 010 is smaller than that between the first common sub-electrode 321 within the second pixel region 020 and the first electrode 510 of the thin film transistor 500 corresponding to the second pixel region 020.

For example, as shown in FIG. 1 to FIG. 4, the traces 30 included in the common electrode 320 are connected end to end.

For example, as shown in FIG. 1 to FIG. 4, all the plurality of traces 30 may be the common electrode 320. The plurality of traces 30 are connected end to end to form a ring with an opening. The first connecting portion 330 is inserted into the opening of the ring, and the ring is insulated from the first connecting portion 330. For example, a gap is formed between the first connecting portion 330 and an edge of the opening of the ring.

For example, as shown in FIG. 1 to FIG. 4, each of the plurality of traces 30 extends in the first direction or the second direction. No matter whether the edge, close to the pixel region, of the gate line or the edge, close to the pixel region, of the data line extends in the first direction and the second direction, each of the plurality of traces is designed to extend in the first direction or the second direction so that the influence of the plurality of traces disposed on the metal layer on the aperture opening ratio of the pixel region can be minimized.

For example, as shown in FIG. 1 to FIG. 4, the gate line pad 210 includes the gate electrode 530 of the thin film transistor 500. For example, the gate electrode 530 of the thin film transistor 500 overlaps the support portion 01 in the direction perpendicular to the base substrate 100. For example, the first electrode 510 and the second electrode 520 of the thin film transistor 500 may both overlap the support portion 01.

For example, as shown in FIG. 1 to FIG. 4, a straight line extending in the X-direction passes through the orthographic projection of the gate electrode 530 of the thin film transistor 500 on the base substrate 100 and the orthographic projection of the via hole 12 on the base substrate 100. For example, a straight line parallel to the first direction passes through the orthographic projections of the via hole 12 and the gate line pad 210 on the base substrate 100.

For example, as shown in FIG. 1 to FIG. 4, the first connecting portion 330 extends in the first direction to be electrically connected to the pixel electrode 400. For example, the first connecting portion 330 has a greater width at a position directly facing the via hole 12 than at other positions of the first connecting portion 330 to facilitate the electrical connection of the first connecting portion 330 with the pixel electrode 400 through the via hole 12.

For example, as shown in FIG. 1 to FIG. 4, the array substrate further includes a common electrode line 600 that is disposed at a same layer with the plurality of gate lines 200. For example, the common electrode 320 is electrically connected to the common electrode line 600.

For example, as shown in FIG. 1 to FIG. 4, an insulating layer (not shown) is disposed between the common electrode 320 and the common electrode line 600, and the common electrode 320 is electrically connected to the common electrode line 600 through a via hole 11 in the insulating layer.

For example, as shown in FIG. 1 to FIG. 4, the common electrode 320 within at least one pixel region 10 may be of an integrated structure, and the common electrode 320 within the pixel region 10 may be electrically connected to the common electrode line 600 through at least one via hole 11. Without limitation, the common electrode within at least one pixel region may also be designed as at least two structures separated from each other, with each structure being electrically connected to the common electrode line.

For example, as shown in FIG. 1 to FIG. 4, the common electrode line 600 extends in the second direction. For example, the gate line 200 and the common electrode line 600 may be disposed alternately in the first direction. For example, the common electrode line 600 overlaps the pixel electrode 400 in the direction perpendicular to the base substrate 100.

For example, as shown in FIG. 1 to FIG. 4, the first connecting portion 330 overlaps the common electrode line 600 in the direction perpendicular to the base substrate 100.

For example, as shown in FIG. 1 and FIG. 2, the via hole 12 overlaps the common electrode line 600 in the direction perpendicular to the base substrate 100.

For example, as shown in FIG. 1 to FIG. 4, the common electrode 320 further includes a third common sub-electrode 323 extending in first direction. The third common sub-electrode 323 and at least part of the sub-portions extending in the first direction in the first connecting portion 330 are located in a same straight line to divide one pixel region 10 into two subpixel regions. For example, the third common sub-electrode 323 and the first connecting portion 330 are configured to act in combination to divide one pixel region into two subpixel regions. Of course, the embodiments of the present disclosure are not limited thereto, and the third common sub-electrode may also be not located in the extension direction of the same straight line with the first connecting portion.

For example, as shown in FIG. 1 to FIG. 4, the two subpixel regions included in one pixel region 10 are arranged in the Y-direction. For example, the shapes of the pixel electrodes in different subpixel regions may be the same or different. For example, the shapes of different subpixel regions in the same pixel region 10 may be the same or different. For example, the areas of different subpixel regions in the same pixel region 10 may be the same or different.

For example, as shown in FIG. 1 to FIG. 4, at least part of the first connecting portion 330 and the third common sub-electrode 323 are located on two sides of the common electrode line 600, respectively. For example, the first connecting portion 330 includes one portion overlapping the common electrode line 600 and the other portion not overlapping the common electrode line 600. The portion, not overlapping the common electrode line 600, of the first connecting portion 330 and the third common sub-electrode 323 are located on the two sides of the common electrode line 600, respectively. Of course, the embodiments of the present disclosure are not limited thereto, and the first connecting portion may also include two portions located on the two sides of the common electrode line. In this case, the third common sub-electrode may be omitted. Alternatively, a portion, located on the same side of the common electrode line with the third common sub-electrode, of the first connecting portion is designed to have a smaller length to guarantee that the first connecting portion is spaced apart from the third common sub-electrode. For example, when the first connecting portion includes two portions located on the two sides of the common electrode line, the two portions may be equal or unequal in width. For example, when the first connecting portion includes two portions located on the two sides of the common electrode line, the portion, located on the same side of the common electrode line with the third common sub-electrode, of the first connecting portion may be as wide as the third common sub-electrode. Without limitation, the two may also be different in width.

Figure 5:
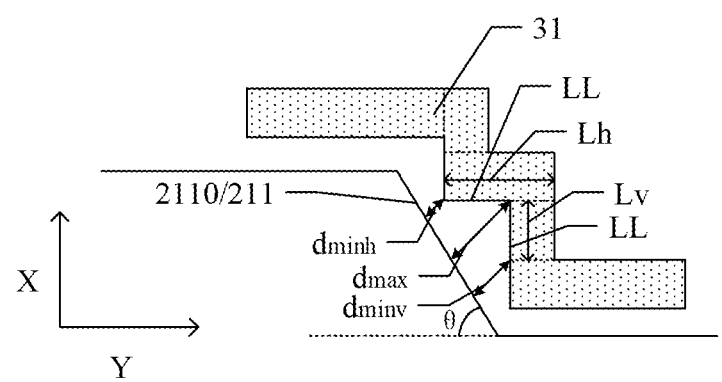
FIG. 5 is a schematic diagram of a portion of a protrusion shown in FIG. 1 and a first trace located at an edge of the portion of the protrusion.

FIG. 5 is a schematic diagram of a portion of a protrusion shown in FIG. 1 and a first trace located at an edge of the portion of the protrusion. For example, as shown in FIG. 1 and FIG. 5, an edge of the protrusion 211 of the gate line pad 210 includes a protrusion edge 2110 of which the extension direction is not parallel to both of the first direction and the second direction. For example, the protrusion 211 may include a plurality of edges. In addition to the protrusion edge 2110, the plurality of edges may further include an edge parallel to the first direction or the second direction. The "protrusion edge 2110 of which the extension direction is not parallel to both of the first direction and the second direction" described above refers to that the orthographic projection of the protrusion edge 2110 on the base substrate 100 is not parallel to both of the first direction and the second direction.

For example, as shown in FIG. 1, the edges of the protrusion 211 may include the protrusion edge 2110 not parallel to both of the first direction and the second direction and an edge parallel to the second direction. Without limitation, the edges of the protrusion 211 may further include an edge parallel to the first direction. For example, the number of the protrusion edges 2110 included in the protrusion 211 may be 1, 2 or more. The embodiments of the present disclosure have no limitation on the number of the protrusion edges included in each protrusion and not parallel to both of the first direction and the second direction, which may be set according to product requirements. The "edge parallel to the second direction" described above refers to that the orthographic projection of the edge of the protrusion 211 on the base substrate 100 is parallel to the second direction; and the "edge parallel to the first direction" described above refers to that the orthographic projection of the edge of the protrusion 211 on the base substrate 100 is parallel to the first direction.

For example, when the protrusion 211 includes a plurality of protrusion edges 2110, the lengths of the plurality of protrusion edges 2110 may be the same or different. For example, included angles between the plurality of protrusion edges 2110 and the second direction may be the same or different. The number of the plurality of protrusion edges and inclination angles relative to the second direction may be set according to product requirements. The above-mentioned length of the protrusion edge may refer to the length of the orthographic projection of the protrusion edge on the base substrate.

For example, as shown in FIG. 1 and FIG. 5, the number of the plurality of first traces 31 is greater than or equal to 2. For example, the number of the first traces 31 corresponding to one protrusion edge 2110 of the protrusion 211 is not less than 2. For example, the plurality of first traces 31 corresponding to one protrusion edge 2110 may be connected to one another to form a step structure. For example, the numbers of the first traces 31 corresponding to different protrusion edges 211 in the same protrusion 211 may be the same or different, which will not be limited in the embodiments of the present disclosure. For example, the lengths of different first traces 31 corresponding to the same protrusion edge 2110 may be different. For example, the orthographic projections of different first traces 31 corresponding to the same protrusion edge 2110 on the base substrate 100 may be the same in width. For example, different first traces 31 corresponding to the same protrusion edge 2110 may be the same in thickness in the direction perpendicular to the base substrate 100.

For example, as shown in FIG. 1 and FIG. 5, the edges of the protrusion 211 may include an edge parallel to the second direction. In the plurality of first traces 31, the first trace 31 opposite to the edge, parallel to the second direction, of the protrusion 211 is parallel to the edge of the protrusion 211. That is, the orthographic projection of the first trace 31 on the base substrate 100 is parallel to that of the edge of the protrusion 211 on the base substrate 100.

For example, as shown in FIG. 1 and FIG. 5, the edges of the protrusion 211 include an edge parallel to the first direction or the second direction and an edge not parallel to both of the first direction and the second direction, the plurality of first traces 31 surrounding the edges of the protrusion 211 may include a first trace 31 parallel to part of the edges of the protrusion 211 and a first trace 31 not parallel to the other part of the edges of the protrusion 211.

For example, as shown in FIG. 1 and FIG. 5, the orthographic projection of each first trace 31 on the base substrate 100 is a first orthographic projection, while the orthographic projection of the protrusion edge 2110 on the base substrate 100 is a second orthographic projection. The first orthographic projection includes a long edge LL extending in an extension direction thereof and close to the second orthographic projection, and the long edge LL has a distance d to the second orthographic projection. For example, the protrusion edge 2110 is in a non-parallel relationship with the first trace 31 opposite thereto. The distance between the second orthographic projection of the protrusion edge 2110 on the base substrate 100 and the long edge LL of the first orthographic projection of the first trace 31 on the base substrate 100 may include a maximum distance dmax and a minimum distance dmin. A plurality of connecting lines perpendicular to the second orthographic projection are present between the second orthographic projection and the long edge LL of the first orthographic projection. The length of the longest one of these connecting lines may be dmax, while the length of the shortest one of these connecting lines may be dmin.

For example, as shown in FIG. 1 and FIG. 5, the following description is made by taking for example the protrusion edge 2110, not parallel to both of the first direction and the second direction, of the protrusion 211, and the first trace 31 opposite thereto and extending in the second direction. The included angle between the protrusion edge 2110 and the second direction is 0. For example, the included angle between the second orthographic projection of the protrusion edge 2110 on the base substrate 100 and the long edge LL of the first orthographic projection of the first trace 31 on the base substrate 100 is 0; the length of the first trace 31 is 1, and the width of the first trace 31 is W; the distance between the second orthographic projection of the protrusion edge 2110 on the base substrate 100 and the long edge LL of the first orthographic projection of the first trace 31 on the base substrate 100 includes the minimum distance dmin; and an edge field capacitance between the first trace 31 and the protrusion edge 2110 meets the following relation formula (1):

$$dC = \frac{\varepsilon_d \times W \times dl}{l \times \sin\theta + d\min}, \quad C = \int_0^L \frac{\varepsilon_d \times W \times dl}{l \times \sin\theta + d\min},$$

where $\varepsilon_d$ is a relative dielectric constant.

For example, the length of the first trace 31 described above is a length in the Y-direction, and the width of the first trace 31 described above may refer to a dimension in the X-direction.

Integration is made to the above-mentioned edge field capacitance to obtain a relation formula (2):

$$C = \varepsilon_d \times W \times \ln[(l/d\min) \times \sin\theta + 1].$$

For example, the length of the first trace 31 parallel to the second direction in the first traces 31 opposite to the protrusion edge 2110 shown in FIG. 5 may be a first length $L_h$, and the minimum distance between the first trace 31 and the protrusion edge 2110 may be a first minimum distance dminh, and a capacitance between the first trace 31 and the protrusion edge 2110 may be Ch. The length of the first trace 31 parallel to the first direction in the first traces 31 opposite to the protrusion edge 2110 shown in FIG. 5 may be a second length Lv, and the minimum distance between the first trace 31 and the protrusion edge 2110 may be a second minimum distance dminv, and a capacitance between the first trace 31 and the protrusion edge 2110 may be Cv.

For example, the above-mentioned first length Lh may be 12.21 microns; the above-mentioned second length Lv may be 6.29 microns; the above-mentioned first minimum distance dminh may be 8.34 microns; the above-mentioned second minimum distance dminv may be 9.16 microns; the included angle θ between the protrusion edge 2110 and the long edge LL of the orthographic projection of each of two first traces 31 may be 45 degrees; and the width W of each first trace 31 may be 3.5 microns.

For example, assuming that Fd is 1, the above-mentioned values of the first length $L_h$, the first minimum distance dminh, the width W and the included angle θ are substituted into the relation formula ln[(l/dmin)×sin θ+1] to obtain a value of 0.710606; and the above-mentioned values of the first length Lh, the first minimum distance dminh, the width W and the included angle θ may be substituted into the above-mentioned relation formula (2) to obtain the capacitance Ch=2.487122 F. The above-mentioned values of the second length Lv, the second minimum distance dminv, the width W and the included angle θ are substituted into the relation formula ln[(l/dmin)×sin θ+1] to obtain a value of 0.39579; and the above-mentioned values of the second length Lv, the second minimum distance dminv, the width W and the included angle θ may be substituted into the above-mentioned relation formula (2) to obtain the capacitance 1.385264 F. Thus, Ch+Cv=3.872386.

The above description regarding Fd being 1 is merely exemplary. In an actual product, the value of Fd is related to a material of the insulating layer between the gate line layer and the metal layer. For example, the material of the insulating layer between the gate line layer and the metal layer may include an organic material or an inorganic material, e.g., may be silicon oxide, silicon nitride or the like.

For example, the above-mentioned values of the first length Lh, the second length Lv, the first minimum distance dminh and the second minimum distance dminv may be set according to a size of a display device to which the array substrate is applied. For example, a dimension of a subpixel on the array substrate may be 25-95 microns. Thus, the minimum of the first length Lh may be 2 microns; the minimum of the second length Lv may be 2 microns; the minimum of the first minimum distance dminh may be 2 microns; and the minimum of the second minimum distance dminv may be 2 microns. The above-mentioned minimums of the first length Lh, the second length Lv, the first minimum distance dminh and the second minimum distance dminv may be then substituted into the relation formula ln[(l/dmin)×sin θ+1] to obtain the minimum of the first parameter Cpad, namely 0.483114. Similarly, the maximum of the first length Lh may be 30 microns; the maximum of the second length Lv may be 30 microns; the maximum of the first minimum distance dminh may be 20 microns; and the maximum of the second minimum distance dminv may be 20 microns. The above-mentioned maximums of the first length Lh, the second length Lv, the first minimum distance dminh and the second minimum distance dminv may be then substituted into the relation formula ln[(l/dmin)×sin θ+1] to obtain the maximum of the first parameter Cpad, namely 4.903148.

For example, according to the above calculation processes, the length of each first trace 31 is Li; the orthographic projection of each first trace 31 on the base substrate 100 is the first orthographic projection, while the orthographic projection of the protrusion edge 2110 on the base substrate 100 is the second orthographic projection; the first orthographic projection includes a long edge LL extending in an extension direction thereof and close to the second orthographic projection; a minimum distance between the long edge LL and the second orthographic projection is di; the included angle between the long edge LL and the second orthographic projection is θi; and a first parameter Cpad in a capacitance between the first trace 31 and the protrusion edge 2110 meets:

$$C_{pad} = \sum_{i=1}^{N} \ln\left(\frac{L_i}{d_i} \times \sin\theta_i + 1\right),$$

with N being the number of the plurality of first traces 31, i being a positive integer of not less than 1 and N being a positive integer of not less than 2. The product of the above-mentioned first parameter Cpad with the relative dielectric constant Fd and the width W is the above-mentioned capacitance.

For example, the above-mentioned first parameter Cpad meets: $0.035 \leq Cpad \leq 5$. For example, the above-mentioned first parameter Cpad meets: $0.1 \leq Cpad \leq 4.5$. For example, the above-mentioned first parameter Cpad meets: $0.5 \leq Cpad \leq 4$. For example, the above-mentioned first parameter Cpad meets: $1 \leq Cpad \leq 3.5$. For example, the above-mentioned first parameter Cpad meets: $1.5 \leq Cpad \leq 3$. For example, the above-mentioned first parameter Cpad meets: $2 \leq Cpad \leq 2.5$.

For example, a plurality of pixel regions 10 are disposed on the array substrate. The plurality of pixel regions 10 may be arranged in an array in the first direction and the second direction. For example, in the pixel regions 10 arranged in the first direction, three second pixel regions 020 are disposed between two adjacent first pixel regions 010; and/or, in the pixel regions 10 arranged in the second direction, three second pixel regions 020 are disposed between two adjacent first pixel regions 010. As a matter of course, the embodiments of the present disclosure have no limitation on this, and four or more second pixel regions may also be disposed between two adjacent first pixel regions.

For example, the gate line pad may serve as the gate electrode of the thin film transistor.

An embodiment of the present disclosure provides a design of an electrode line which is applicable to the array substrate of a liquid crystal display device and can maintain the consistency of the storage capacitance of adjacent pixels or the capacitance (Cpd) generated between the common electrode and the pixel electrode; meanwhile, the influence of the electrode line on the aperture ratio is minimized, and finally, the parasitic capacitance of the gate line or the gate electrode can be reduced.

For example, at the edges of the protrusion, the first traces are not parallel to the contour of the edges of the protrusion; the first traces are presented as a step-like shape; and each first trace is parallel to the gate line and the data line respectively, further reducing the capacitance Cgd between the gate line and the drain electrode of the thin film transistor and the capacitance Cgc between the gate line and the common electrode.

Figure 6:
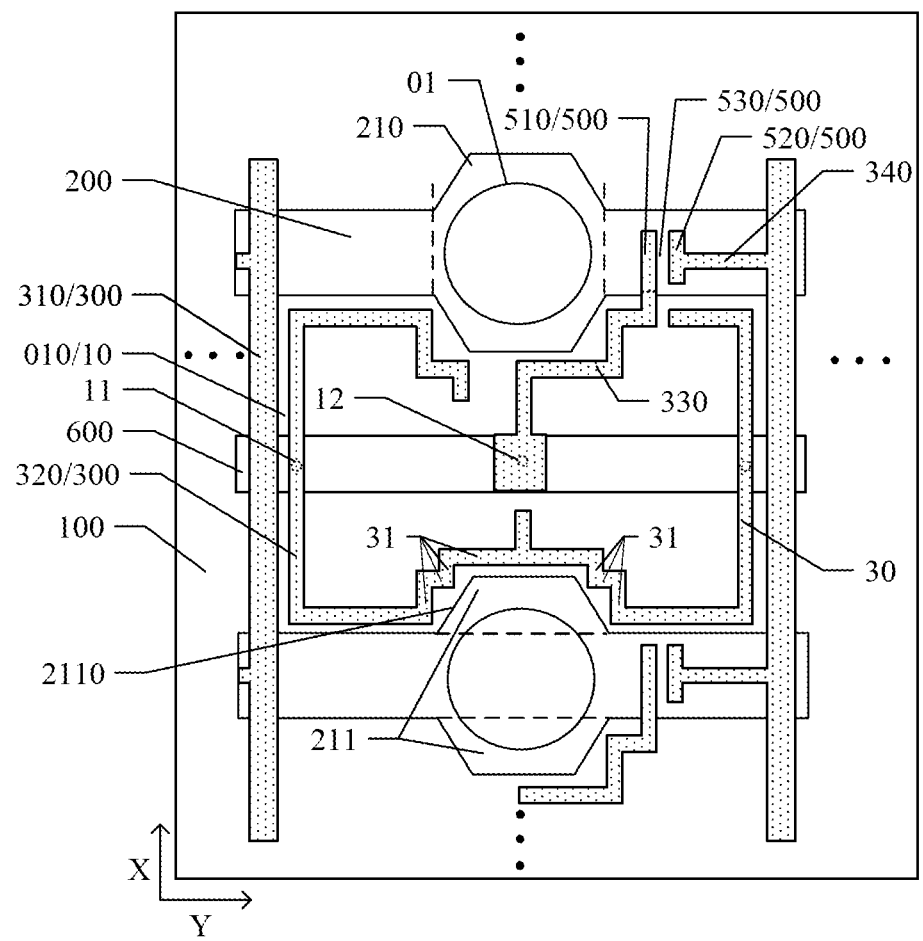
FIG. 6 is a schematic diagram illustrating a partial planar structure of an array substrate provided in another example implemented according to the present disclosure.

FIG. 6 is a schematic diagram illustrating a partial planar structure of an array substrate provided in another example implemented according to the present disclosure. As shown in FIG. 6, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10. FIG. 6 schematically illustrates a pixel region 10.

For example, as shown in FIG. 6, the plurality of data lines 310 extend in an X-direction and arranged in a Y-direction. The plurality of gate lines 200 extend in the Y-direction and are arranged in the X-direction. For example, the first direction is the X-direction, while the second direction is the Y-direction, and the first direction is perpendicular to the second direction. Without limitation, the first direction may also not be perpendicular to the second direction. For example, the first direction and the second direction may be interchangeable.

For example, as shown in FIG. 6, two adjacent data lines 310 and two adjacent gate lines 200 are disposed crosswise to define a pixel region 10. For example, a pixel region 10 is a subpixel. For example, the array substrate includes a plurality of subpixels (a plurality of pixel regions 10) that include subpixels configured to display light of different colors. For example, the plurality of subpixels include a red subpixel configured to display red light, a green subpixel configured to display green light, and a blue subpixel configured to display blue light. For example, two adjacent subpixels arranged in at least one of the first direction and the second direction are subpixels configured to display light of different colors, respectively.

For example, a shape of the pixel region 10 can be a polygon. For example, the shape of the pixel region 10 is a quadrangle. For example, the shape of the pixel region 10 is a rectangle. The embodiments of the present disclosure have no limitation on this. The shape of the pixel region 10 is related to shapes of an edge of the data line 310 and an edge of the gate line 200.

For example, each pixel region 10 includes a display region for display. An area of the display region may be smaller than that of the pixel region 10. For example, a shape of the display region may be the same as that of the pixel region 10. Alternatively, the shape of the display region may be different from that of the pixel region 10.

As shown in FIG. 6, the metal layer 300 further includes a common electrode 320 located in the pixel region 10. For example, the common electrode 320 may be a film layer disposed at a same layer and made of a same material with the data line 310.

As shown in FIG. 6, at least one gate line 200 includes a gate line pad 210 that includes a protrusion 211 protruding towards the pixel region 10 relative to a portion of the gate line 200 other than the gate line pad 210.

For example, as shown in FIG. 6, the gate line pad 210 is part of structure of the gate line 200. For example, in the X-direction, a width of the gate line pad 210 is greater than a width of other portion of the gate line 200 other than the gate line pad 210. For example, in a width direction, a portion, protruding relative to the portion of the gate line 200 other than the gate line pad 210, of the gate line pad 210 is a protrusion 211.

For example, the example shown in FIG. 6 differs from the example shown in FIG. 1 in that the gate line pad 210 includes protrusions 211 protruding relative to two sides of the gate line 200. For example, a plurality of gate line pads 210 may be disposed on one gate line 200, and the plurality of gate line pads 210 each include protrusions 211 protruding relative to the two sides of the gate line 200.

For example, as shown in FIG. 6, the gate line pad 210 is configured to be opposed to a support portion 01. For example, the gate line pad 210 overlaps the support portion 01 in a direction perpendicular to the base substrate 100. For example, an orthographic projection of the gate line pad 210 on the base substrate 100 may overlap an orthographic projection of the support portion 01 on the base substrate 100. For example, the orthographic projection of the support portion 01 on the base substrate 100 may completely fall into the orthographic projection of the gate line pad 210 on the base substrate 100. For example, the support portion 01 in this example may have the same features with the support portion 01 in the example shown in FIG. 1, which will not be described here redundantly. For example, FIG. 6 schematically illustrates that the support portion 01 is disposed on the array substrate. Without limitation, the support portion may be disposed on the opposed substrate. The position of the support portion may be set according to product requirements.

As shown in FIG. 6, the metal layer 300 located in the pixel region 10 includes a plurality of traces 30 extending along at least part of the contour of the pixel region 10. For example, at least part of the above-mentioned plurality of traces 30 are electrically connected traces. For example, the electrically connected traces in the above-mentioned plurality of traces 30 are integrated traces. The "integrated traces" described above may be traces formed by performing a same patterning process on a same metal material layer. The "plurality of traces 30 extending along at least part of the contour of the pixel region 10" described above may refer to the plurality of traces extending along an edge of the data line 310 and an edge of the gate line 200. The plurality of traces extending along at least part of the contour of the pixel region described above may be parallel to the extension direction of the edge of the data line or the gate line. Without limitation, part of the plurality of traces may also be not parallel to a certain portion of the edge of the gate line or the data line. Whether a trace is parallel to an edge of a signal line (including the gate line and the data line) adjacent (in a planar view) thereto may be set according to product requirements.

For example, as shown in FIG. 6, an edge of the protrusion 211 of the gate line pad 210 includes a broken line or a curve.

As shown in FIG. 6, the plurality of traces 30 include a plurality of first traces 31 surrounding at least part of edges of the protrusion 211. Each first trace 31 extends in the first direction or the second direction, and the plurality of first traces 31 are connected end to end to form a step structure. The "plurality of first traces 31 surrounding at least part of edges of the protrusion 211" described above may refer to an orthographic projection of the plurality of first traces 31 on the base substrate 100 surrounding an orthographic projection of at least part of edges of the protrusion 211 on the base substrate 100.

In the embodiment of the present disclosure, the first traces surrounding the protrusion of the gate line pad are designed as the step structure, which is conducive to reducing the influence of the metal layer on an aperture opening ratio in a pixel region while improving the consistency of capacitances generated by the metal layer and pixel electrodes in different pixel regions.

For example, two first traces 31, connected end to end, in the plurality of first traces 31 are electrically connected. For example, the plurality of first traces 31 may be of an integrated structure. For example, a distance between the orthographic projection of the plurality of first traces 31 on the base substrate 100 and the surrounded orthographic projection of the edges of the protrusion 211 on the base substrate is smaller than a distance between an orthographic projection of other trace on the base substrate 100 and the edge of the protrusion 211. For example, distances between different first traces 31 and the surrounded edges of the protrusion 211 may be the same or different. For example, an extension direction of the first trace 31 may be parallel to the surrounded edge of the protrusion 211. The extension direction of the first trace 31 may also intersect the surrounded edge of the protrusion 211.

For example, as shown in FIG. 6, the extension direction of the traces 30 other than the first traces 31 in the plurality of traces 30 may be parallel to the extension direction of the adjacent data line 310 or gate line 200. For example, the extension direction of the traces 30 other than the first traces 31 in the plurality of traces 30 may be parallel to the extension direction of the edge, close to the traces 30, of the adjacent data line 310 or gate line 200.

For example, as shown in FIG. 6, two traces 30 located at two outermost ends of the plurality of first traces 31 may extend in the second direction. For example, the two traces 30 located at the two outermost ends of the plurality of first traces 31 may be both electrically connected to the first traces 31. For example, the two traces 30 located at the two outermost ends of the plurality of first traces 31 may be both of an integrated structure with the first traces 31. Without limitation, one of the two traces located at the two outermost ends of the plurality of first traces may also be spaced apart from the first traces.

For example, as shown in FIG. 6, any trace 31 in the plurality of traces 30 may extend in the first direction or extend in the second direction.

For example, as shown in FIG. 6, the protrusions 211 located on two sides of a center line, extending in the Y-direction, of one gate line 200 may be the same or different in shape. For example, two protrusions 211 included in the same gate line pad 210 and protruding relative to other portion of the gate line 200 may be the same or different in shape. For example, the shapes of the two protrusions 211 included in the same gate line pad 210 may both be a trapezoid, and an upper base of the trapezoid protrudes towards the pixel region 10 relative to other portion of the gate line 200, while the lower base of the trapezoid may be flush with at least part of edges of the other portion of the gate line 200.

For example, as shown in FIG. 6, the protrusions 211 are disposed on both sides of the gate line 200 in the X-direction. In this case, in one pixel region 10, a plurality of first traces 31 in a plurality of traces 30 are centrally distributed at two positions in the plurality of traces 30.

For example, the array substrate further includes a plurality of pixel electrodes 400 and a plurality of thin film transistors 500. In this example, the pixel electrode included in the array substrate may have the same features with the pixel electrode shown in FIG. 2, which will not be described here redundantly.

For example, as shown in FIG. 6, each pixel region 10 may include one thin film transistor 500. Without limitation, the number of the thin film transistors included in each pixel region may be set according to the performance of a desired pixel electrode. For example, the number of the thin film transistors in each pixel region may be 2 or more.

For example, as shown in FIG. 6, each thin film transistor 500 includes a first electrode 510, a gate electrode 530 and a second electrode 520. The first electrode 510 and the second electrode 520 both overlap a film layer where the gate lines 200 are located. For example, the thin film transistor 500 further includes an active layer. The first electrode 510 and the second electrode 520 both overlap the active layer, and the gate electrode 530 overlaps the active layer. For example, the gate electrode 530 may be part of structure of the gate line 200.

For example, as shown in FIG. 6, the first electrode 510 of the thin film transistor 500 is electrically connected to the pixel electrode 400 by a first connecting portion 330, and the second electrode 520 of the thin film transistor 500 is electrically connected to the data line 310.

For example, as shown in FIG. 6, the first electrode 510 of the thin film transistor 500, the second electrode 520 of the thin film transistor 500 and the first connecting portion 330 are all structures in the metal layer 300, and the first electrode 510 of the thin film transistor 500 and the second electrode 520 of the thin film transistor 500 are both insulated from the common electrode 320. For example, the first electrode 510 of the thin film transistor 500 and the second electrode 520 of the thin film transistor 500 are both spaced apart from the common electrode 320. For example, the first connecting portion 330 is spaced apart from the common electrode 320.

For example, as shown in FIG. 6, the first electrode 510 of the thin film transistor 500 and the first connecting portion 330 may be of an integrated structure, and without limitation, may also be of a structure formed by two parts which are electrically connected. For example, the first electrode 510 of the thin film transistor 500 may be a portion where the metal layer 300 overlaps the active layer, and the first connecting portion 330 may be a portion where the metal layer 300 does not overlap the active layer.

For example, the first connecting portion 330 and the common electrode 320 both overlap the pixel electrode 400 in the direction perpendicular to the base substrate 100. For example, part of the first connecting portion 330 overlaps the pixel electrode 400 in the direction perpendicular to the base substrate 100. For example, part of the common electrode 320 overlaps the pixel electrode 400 in the direction perpendicular to the base substrate 100.

For example, as shown in FIG. 6, the second connecting portion 340 overlaps the gate line 200 in the direction perpendicular to the base substrate 100. For example, the second connecting portion 340 may be of an integrated structure with the second electrode 520 of the thin film transistor 500. For example, the second connecting portion 340 may be of an integrated structure with the data line 310. For example, the second electrode 520 of the thin film transistor 500, the second connecting portion 340 and the data line 310 may be of an integrated structure. For example, the second connecting portion 340 may extend in the second direction. For example, the second connecting portion 340 is spaced apart from the common electrode 320.

For example, the array substrate shown in FIG. 6 differs from the array substrate shown in FIG. 1 further in that: the gate electrode 530 of the thin film transistor 500 on the array substrate shown in FIG. 6 is located at other position than the gate line pad 210 on the gate line 200. For example, the gate electrode 530 of the thin film transistor 500 may be located on one side of the gate line pad 210 in the Y-direction. For example, in the direction perpendicular to the base substrate 100, the gate electrode 530 of the thin film transistor 500 does not overlap the support portion 01, which is conducive to improving the flatness of the support portion. For example, in the direction perpendicular to the base substrate 100, none of the first electrode 510 and the second electrode 520 of the thin film transistor 500 may overlap the support portion 01.

Figure 7:
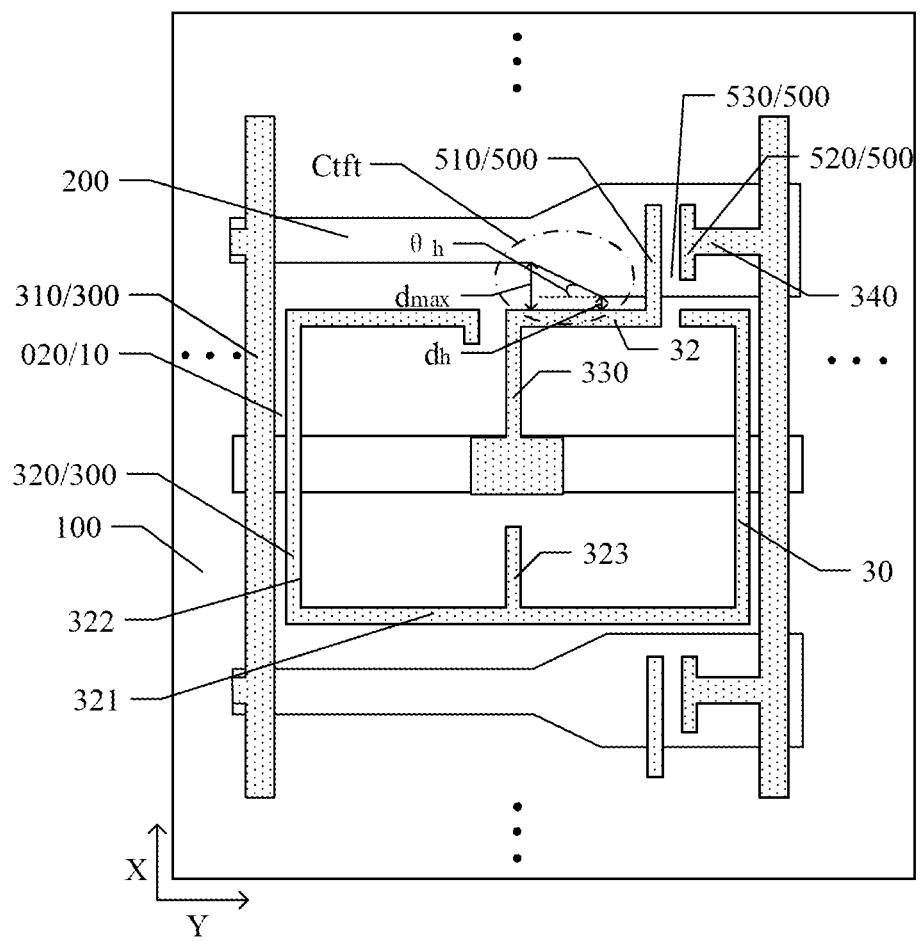
FIG. 7 is a schematic diagram of another pixel region on the array substrate shown in FIG. 6.

FIG. 7 is a schematic diagram of another pixel region on the array substrate shown in FIG. 6. For example, as shown in FIG. 6 and FIG. 7, the plurality of pixel regions 10 include at least one first pixel region 010 and at least one second pixel region 020. The first pixel region 010 is a pixel region 10 corresponding to the gate line pad 210, while the second pixel region 020 is a pixel region 10 corresponding to the portion of the gate line 200 other than the gate line pad 210.

For example, as shown in FIG. 6 and FIG. 7, the first pixel region 010 and the second pixel region 020 are different pixel regions. That is, the first pixel region 010 and the second pixel region 020 are regions defined by different data lines 310 crossing with different gate lines 200. For example, the number of the second pixel regions 020 may be greater than that of the first pixel regions 010. Without limitation, the number of the second pixel regions 020 may be less than that of the first pixel regions 010, or the number of the second pixel regions 020 may be equal to that of the first pixel regions 010.

For example, as shown in FIG. 7, the second pixel region 020 is opposite to a position at which no gate line pad is located. The extension direction of part of traces 30 located within the second pixel region 020 and extending along at least part of the contour of the second pixel region 020 may be parallel to the extension direction of the edge, close to the second pixel region 020, of a signal line (a gate line or a data line) adjacent to the part of traces 30.

For example, FIG. 7 schematically illustrates that the gate line 200 corresponding to the second pixel region 020 may have a greater width at a position where the gate electrode 530 of the thin film transistor 500 is disposed than at a position where no gate electrode 530 is disposed. However, without limitation, the gate line corresponding to the second pixel region may have an identical width at every position.

For example, as shown in FIG. 6 and FIG. 7, the common electrode 320 includes part of the plurality of first traces; and a ratio of an area of an orthographic projection of the common electrode 320 within the first pixel region 010 on the base substrate 100 to an area of an orthographic projection of the common electrode 320 within the second pixel region 020 on the base substrate 100 is 0.8-1.2. For example, the ratio of the area of the orthographic projection of the common electrode 320 within the first pixel region 010 on the base substrate 100 to the area of the orthographic projection of the common electrode 320 within the second pixel region 020 on the base substrate 100 is 0.9-1.1. For example, the area of the orthographic projection of the common electrode 320 within the first pixel region 010 on the base substrate 100 is roughly equal to the area of the orthographic projection of the common electrode 320 within the second pixel region 020 on the base substrate 100.

The pixel electrode within each pixel region overlaps the common electrode. The ratio of the area of the orthographic projection of the common electrode disposed within the first pixel region corresponding to the gate line pad (i.e., the position where the support portion is disposed) to the area of the orthographic projection of the common electrode disposed within the second pixel region corresponding to non-gate line pad (i.e., the position where no support portion is disposed) is designed to be 0.8-1.2 so that the difference between capacitances generated between the pixel electrodes and the common electrodes within different pixel regions can be reduced and the consistency of the capacitances of different pixel regions can be improved. Thus, the display effect of a display device using the array substrate may be improved.

For example, an overlapping area of the common electrode 320 and the pixel electrode within the first pixel region 010 is a first overlapping area, while an overlapping area of the common electrode 320 and the pixel electrode within the second pixel region 020 is a second overlapping area, and a ratio of the first overlapping area to the second overlapping area is 0.8-1.2. For example, the ratio of the first overlapping area to the second overlapping area is 0.9-1.1. For example, the first overlapping area is roughly equal to the second overlapping area. The ratio of the first overlapping area of the common electrode disposed within the first pixel region corresponding to the gate line pad (i.e., the position where the support portion is disposed) and the pixel electrode to the second overlapping area of the common electrode disposed within the second pixel region corresponding to non-gate line pad (i.e., the position where no support portion is disposed) and the pixel electrode is designed to be 0.8-1.2 so that the difference between capacitances generated between the pixel electrodes and the common electrodes within different pixel regions can be reduced and the consistency of the capacitances of different pixel regions can be improved. Thus, the display effect of a display device using the array substrate may be improved.

For example, as shown in FIG. 6 and FIG. 7, a ratio of a length of the common electrode 320 within the first pixel region 010 to a length of the common electrode 320 within the second pixel region 020 is 0.8-1.2. For example, the ratio of the length of the common electrode 320 within the first pixel region 010 to the length of the common electrode 320 within the second pixel region 020 is 0.9-1.1. For example, the common electrode 320 within each pixel region 10 may be a metal trace which is uniform in width.

The common electrode within the first pixel region is formed into a broken line shape at a position corresponding to the gate line pad, and each common electrode in the broken line is set to extend in the first direction or the second direction, which is conducive to allowing the length of the common electrode within the first pixel region to be equal to that of the common electrode within the second pixel region as much as possible. The difference between capacitances generated between the pixel electrodes and the common electrodes within different pixel regions can be reduced and the consistency of the capacitances of different pixel regions can be improved. Thus, the display effect of a display device using the array substrate may be improved.

For example, as shown in FIG. 6, the first connecting portion 330 includes part of the plurality of traces 30; and a ratio of an area of an orthographic projection of the first connecting portion 330 within the first pixel region 010 on the base substrate 100 to an area of an orthographic projection of the first connecting portion 330 within the second pixel region 020 on the base substrate 100 is 0.8-1.2. For example, the ratio of the area of the orthographic projection of the first connecting portion 330 within the first pixel region 010 on the base substrate 100 to the area of the orthographic projection of the first connecting portion 330 within the second pixel region 020 on the base substrate 100 is 0.9-1.1. For example, the area of the orthographic projection of the first connecting portion 330 within the first pixel region 010 on the base substrate 100 is substantially equal to the area of the orthographic projection of the first connecting portion 330 within the second pixel region 020 on the base substrate 100.

The pixel electrode within each pixel region overlaps the first connecting portion. The ratio of the area of the orthographic projection of the first connecting portion disposed within the first pixel region corresponding to the gate line pad (i.e., the position where the support portion is disposed) to the area of the orthographic projection of the first connecting portion disposed within the second pixel region corresponding to non-gate line pad (i.e., the position where no support portion is disposed) is designed to be 0.8-1.2 so that the difference between capacitances generated between the pixel electrodes and the first connecting portions within different pixel regions can be reduced and the consistency of the capacitances of different pixel regions can be improved. Thus, the display effect of a display device using the array substrate may be improved.

For example, the first connecting portion 330 includes part of the plurality of traces 30; and a ratio of an overlapping area of the first connecting portion 330 within the first pixel region 010 and the pixel electrode to an overlapping area of the first connecting portion 330 within the second pixel region 020 and the pixel electrode is 0.8-1.2. For example, the ratio of the overlapping area of the first connecting portion 330 within the first pixel region 010 and the pixel electrode to the overlapping area of the first connecting portion 330 within the second pixel region 020 and the pixel electrode is 0.9-1.1. For example, the overlapping area of the first connecting portion 330 and the pixel electrode within the first pixel region 010 is substantially equal to the overlapping area of the first connecting portion 330 and the pixel electrode within the second pixel region 020. The ratio of the overlapping area of the first connecting portion disposed and the pixel electrode within the first pixel region corresponding to the gate line pad (i.e., the position where the support portion is disposed) to the overlapping area of the first connecting portion and the pixel electrode disposed within the second pixel region corresponding to non-gate line pad (i.e., the position where no support portion is disposed) is designed to be 0.8-1.2 so that the difference between capacitances generated between the pixel electrodes and the first connecting portions within different pixel regions can be reduced and the consistency of the capacitances of different pixel regions can be improved. Thus, the display effect of a display device using the array substrate may be improved.

For example, a ratio of a length of the first connecting portion 330 within the first pixel region 010 to a length of the first connecting portion 330 within the second pixel region 020 is 0.8-1.2. For example, the ratio of the length of the first connecting portion within the first pixel region 010 to the length of the first connecting portion within the second pixel region 020 is 0.9-1.1. For example, the length of the first connecting portion within the first pixel region 010 is substantially equal to the length of the first connecting portion within the second pixel region 020.

For example, as shown in FIG. 6, the first connecting portion 330 is electrically connected to the pixel electrode through a via hole 12 located in the insulating layer between the first connecting portion 330 and the pixel electrode. A straight line in the X-direction cannot pass through the orthographic projection of the first electrode 510 of the thin film transistor 500 on the base substrate 100 and the orthographic projection of the via hole 12 on the base substrate 100. Thus, the first connecting portion cannot extend only in the first direction to the position of the via hole. The first connecting portion is designed into a linear shape inclined relative to the X-direction or a broken line shape of which each segment extends in the first direction or the second direction so as to extend to the via hole, and thus is electrically connected to the pixel electrode.

The first connecting portion within the first pixel region is formed into a broken line shape at a position corresponding to the gate line pad, and each first connecting portion in the broken line is set to extend in the first direction or the second direction, which is conducive to allowing the length of the first connecting portion within the first pixel region to be equal to that of the first connecting portion within the second pixel region as much as possible. The difference between capacitances generated between the pixel electrodes and the first connecting portions within different pixel regions can be reduced and the consistency of the capacitances of different pixel regions can be improved. Thus, the display effect of a display device using the array substrate may be improved.

For example, as shown in FIG. 6, at least one of the common electrode 320 and the first connecting portion includes a plurality of first traces. For example, the array substrate shown in FIG. 6 differs from the array substrate shown in FIG. 1 further in that: the plurality of first traces 31 include two portions, and one of the two portions is the common electrode 320, while the other one of the two portions is the first connecting portion 330.

For example, as shown in FIG. 6, two gate lines 200 located on two sides of at least one first pixel region 010 each include the gate line pad 210 protruding towards the first pixel region 010. The common electrode 320 includes a first trace 31 surrounding the protrusion 211 of the gate line pad 210 on one of the two gate lines 200, while the first connecting portion 330 includes a first trace 31 surrounding the protrusion 211 of the gate line pad 210 on the other one of the two gate lines 200.

For example, as shown in FIG. 6, the gate line pad 210 includes two protrusions 211 protruding toward two sides of the gate line 200 in the X-direction, namely a first protrusion and a second protrusion. The first traces 31 surrounding the first protrusion 211 may all be the common electrode 320, and part of the first traces 31 surrounding the second protrusion are the common electrode 320, while the other part are the first connecting portion 330. For example, all the first traces 31 surrounding the first protrusion 211 are traces 30 disposed continuously and connected end to end. The first traces 31 surrounding the second protrusion 212 include two parts of first traces 31 spaced apart from each other, and each part of first traces 31 are disposed continuously and connected end to end.

For example, as shown in FIG. 6, the first connecting portion 330 includes a sub-portion extending in the first direction and a sub-portion extending in the second direction. For example, the first connecting portion 330 may include at least one sub-portion extending in the first direction and at least one sub-portion extending in the second direction. For example, FIG. 6 schematically illustrates that the first connecting portion 330 includes three sub-portions extending in the first direction and two sub-portions extending in the second direction. Without limitation, the number of the sub-portions extending in the first direction and the number of the sub-portions extending in the second direction in the first connecting portion may be set according to product requirements.

For example, as shown in FIG. 6, part of the sub-portions of the first connecting portion 330 are the first traces 31 surrounding the gate line pad 210.

For example, as shown in FIG. 7, the common electrode 320 within the second pixel region 020 includes a first common sub-electrode 321 extending in the second direction and a second common sub-electrode 322 extending in the first direction. The first common sub-electrode 321 is disposed at a position away from the first electrode 510 of the thin film transistor 500 corresponding to the pixel region where the first common sub-electrode 321 is located. Two ends of the first common sub-electrode 321 are electrically connected to two second common sub-electrodes 322, respectively, and the two second common sub-electrodes 322 are adjacent to two data lines 310, respectively. The "two second common sub-electrodes 322 being adjacent to two data lines 310, respectively" described above may refer to that no other common electrode or other data line is disposed between the orthographic projection of each second common sub-electrode 322 on the base substrate 100 and the orthographic projection of the corresponding data line 310 on the base substrate 100.

For example, as shown in FIG. 6 and FIG. 7, a distance between the first trace 31 in the first pixel region 010 and the first electrode 510 of the thin film transistor 500 corresponding to the first pixel region 010 is smaller than that between the first common sub-electrode 321 within the second pixel region 020 and the first electrode 510 of the thin film transistor 500 corresponding to the second pixel region 020.

For example, as shown in FIG. 6 and FIG. 7, the traces 31 included in the common electrode 320 are connected end to end, and the traces 30 included in the first connecting portion 330 are connected end to end.

For example, as shown in FIG. 6 and FIG. 7, the traces 30 included in the common electrode 320 are connected end to end to form a ring with an opening. The first connecting portion 330 is inserted into the opening of the ring, and the ring is insulated from the first connecting portion 330. For example, a gap is formed between the first connecting portion 330 and an edge of the opening of the ring.

For example, as shown in FIG. 6 and FIG. 7, each of the plurality of traces 30 extends in the first direction or the second direction. No matter whether the edge, close to the pixel region, of the gate line or the edge, close to the pixel region, of the data line extends in the first direction and the second direction, each of the plurality of traces is designed to extend in the first direction or the second direction so that the influence of the plurality of traces disposed on the metal layer on the aperture opening ratio of the pixel region can be minimized.

For example, as shown in FIG. 6 and FIG. 7, the first connecting portion 330 has a greater width at a position directly facing the via hole 12 than at other positions of the first connecting portion 330 to facilitate the electrical connection of the first connecting portion 330 with the pixel electrode 400 through the via hole 12.

For example, as shown in FIG. 6 and FIG. 7, the array substrate further includes a common electrode line 600 that is disposed at a same layer with the plurality of gate lines 200. The common electrode 320 is electrically connected to the common electrode line 600.

For example, as shown in FIG. 6 and FIG. 7, an insulating layer (not shown) is disposed between the common electrode 320 and the common electrode line 600, and the common electrode 320 is electrically connected to the common electrode line 600 through a via hole 11 in the insulating layer.

For example, as shown in FIG. 6 and FIG. 7, the common electrode 320 within at least one pixel region 10 may be of an integrated structure, and the common electrode 320 within the pixel region 10 may be electrically connected to the common electrode line 600 through at least one via hole 11. Without limitation, the common electrode within at least one pixel region may also be designed as at least two structures separated from each other, with each structure being electrically connected to the common electrode line.

For example, as shown in FIG. 6 and FIG. 7, the common electrode line 600 extends in the second direction. For example, the gate line 200 and the common electrode line 600 may be disposed alternately in the first direction. For example, the common electrode line 600 overlaps the pixel electrode 400 in the direction perpendicular to the base substrate 100.

For example, as shown in FIG. 6 and FIG. 7, the first connecting portion 330 overlaps the common electrode line 600 in the direction perpendicular to the base substrate 100.

For example, as shown in FIG. 6 and FIG. 7, the via hole 12 overlaps the common electrode line 600 in the direction perpendicular to the base substrate 100.

For example, as shown in FIG. 6 and FIG. 7, the common electrode 320 further includes a third common sub-electrode 323 extending in first direction. The third common sub-electrode 323 and at least part of the sub-portions extending in the first direction in the first connecting portion 330 are located in a same straight line to divide the pixel region 10 into two subpixel regions. For example, the third common sub-electrode 323 and the first connecting portion 330 are configured to act in combination to divide one pixel region into two subpixel regions. As a matter of course, the embodiments of the present disclosure are not limited thereto, and the third common sub-electrode may also be not located in the extension direction of the same straight line with the first connecting portion.

For example, as shown in FIG. 6 and FIG. 7, the two subpixel regions included in one pixel region 10 are arranged in the Y-direction. For example, the shapes of the pixel electrodes in different subpixel regions may be the same or different. For example, the shapes of different subpixel regions in the same pixel region 10 may be the same or different. For example, the areas of different subpixel regions in the same pixel region 10 may be the same or different.

For example, as shown in FIG. 6 and FIG. 7, at least part of the first connecting portion 330 and the third common sub-electrode 323 are located on two sides of the common electrode line 600, respectively. For example, the first connecting portion 330 includes one portion overlapping the common electrode line 600 and the other portion not overlapping the common electrode line 600. The portion, not overlapping the common electrode line 600, of the first connecting portion 330 and the third common sub-electrode 323 are located on the two sides of the common electrode line 600, respectively. As a matter of course, the embodiments of the present disclosure are not limited thereto, and the first connecting portion may also include two portions located on the two sides of the common electrode line. In this case, the third common sub-electrode may be omitted. Alternatively, a portion, located on the same side of the common electrode line with the third common sub-electrode, of the first connecting portion is designed to have a smaller length to guarantee that the first connecting portion is spaced apart from the third common sub-electrode. For example, when the first connecting portion includes two portions located on the two sides of the common electrode line, the two portions may be equal or unequal in width. For example, when the first connecting portion includes two portions located on the two sides of the common electrode line, the portion, located on the same side of the common electrode line with the third common sub-electrode, of the first connecting portion may be as wide as the third common sub-electrode. Without limitation, the two may also be different in width.

For example, as shown in FIG. 6, an edge of the protrusion 211 of the gate line pad 210 includes a protrusion edge 2110 of which the extension direction is not parallel to both of the first direction and the second direction. For example, the protrusion 211 may include a plurality of edges. In addition to the protrusion edge 2110, the plurality of edges may further include an edge parallel to the first direction or the second direction. The "protrusion edge 2110 of which the extension direction is not parallel to both of the first direction and the second direction" described above refers to that the orthographic projection of the protrusion edge 2110 on the base substrate 100 is not parallel to both of the first direction and the second direction.

For example, as shown in FIG. 6, the plurality of edges of the protrusion 211 may include the protrusion edge 2110 not parallel to both of the first direction and the second direction and an edge parallel to the second direction. Without limitation, the edges of the protrusion 211 may further include an edge parallel to the first direction. For example, the number of the protrusion edges 2110 included in the protrusion 211 may be 1, 2 or more. The embodiments of the present disclosure have no limitation on the number of the protrusion edges included in each protrusion and not parallel to both of the first direction and the second direction, which may be set according to product requirements. The "edge parallel to the second direction" described above refers to that the orthographic projection of the edge of the protrusion 211 on the base substrate 100 is parallel to the second direction; and the "edge parallel to the first direction" described above refers to that the orthographic projection of the edge of the protrusion 211 on the base substrate 100 is parallel to the first direction.

For example, when the protrusion 211 includes a plurality of protrusion edges 2110, the lengths of the plurality of protrusion edges 2110 may be the same or different. For example, included angles between the plurality of protrusion edges 2110 and the second direction may be the same or different. The number of the plurality of protrusion edges and inclination angles relative to the second direction may be set according to product requirements. The above-mentioned length of the protrusion edge may refer to the length of the orthographic projection of the protrusion edge on the base substrate.

For example, as shown in FIG. 6, the number of the plurality of first traces 31 is greater than or equal to 2. For example, the number of the first traces 31 corresponding to one protrusion edge 2110 of the protrusion 211 is not less than 2. For example, the plurality of first traces 31 corresponding to one protrusion edge 2110 may be connected to one another to form a step structure.

For example, the numbers of the first traces 31 corresponding to different protrusion edges 2110 in the same protrusion 211 may be the same or different, which will not be limited in the embodiments of the present disclosure. For example, the lengths of different first traces 31 corresponding to the same protrusion edge 2110 may be different. For example, the orthographic projections of different first traces 31 corresponding to the same protrusion edge 2110 on the base substrate 100 may be the same in width. For example, different first traces 31 corresponding to the same protrusion edge 2110 may be the same in dimension in the direction perpendicular to the base substrate 100.

For example, as shown in FIG. 6, the edges of the protrusion 211 may include an edge parallel to the second direction. In the plurality of first traces 31, the first trace 31 opposite to the edge, parallel to the second direction, of the protrusion 211 is parallel to the edge of the protrusion 211. That is, the orthographic projection of the first trace 31 on the base substrate 100 is parallel to that of the edge of the protrusion 211 on the base substrate 100.

For example, as shown in FIG. 6, when the edges of the protrusion 211 include an edge parallel to the first direction or the second direction and an edge not parallel to both of the first direction and the second direction, the plurality of first traces 31 surrounding the edges of the protrusion 211 may include a first trace 31 parallel to part of the edges of the protrusion 211 and a first trace 31 not parallel to part of the edges of the protrusion 211.

The capacitance formed between the first trace included in the common electrode and the protrusion edge of the protrusion in this example may be calculated using the same method with the capacitance formed between the first trace and the protrusion edge in the examples shown in FIG. 1 and FIG. 5, and the capacitance formed between the first trace included in the first connecting portion and the protrusion edge of the protrusion in this example may also be calculated using the same method with the capacitance formed between the first trace and the protrusion edge in the examples shown in FIG. 1 and FIG. 5, which will not be described here redundantly.

For example, a first parameter Cpad in the capacitance between the first trace and the protrusion edge of the protrusion in the example of FIG. 6 meets: 0.035≤Cpad≤5.

For example, as shown in FIG. 7, the plurality of traces 30 within the second pixel region 020 include a second trace 32 parallel to the second direction, and an edge on a side, close to the second trace 32, of gate line 200 having a shortest distance to the second trace 32 is a sloping edge not parallel to the second direction. For example, the second trace 32 may be a structure in the first connecting portion 330, and may also be a structure in the common electrode 320.

For example, the capacitance between the second trace 32 shown in FIG. 7 and the sloping edge of the gate line 200 adjacent thereto may be calculated using the same method with the capacitance formed between the first trace and the protrusion edge in the examples shown in FIG. 1 and FIG. 5. For example, a second parameter Ctft in the second trace 32 and the sloping edge of the gate line 200 adjacent thereto shown in FIG. 7 may meet: Ctft=ln[(Lh/dh)×sin θh+1], where the minimum distance between the orthographic projection of the second trace 32 on the base substrate 100 and the orthographic projection of the sloping edge of the gate line 200 on the base substrate 100 is dh; the included angle between the orthographic projection of the second trace 32 on the base substrate 100 and the orthographic projection of the sloping edge of the gate line 200 on the base substrate 100 is θh; and the length of the second trace 32 is Lh. The product of the above-mentioned second parameter $C_{tft}$ with the relative dielectric constant Fd and the width W of the second trace 32 is the capacitance generated between the second trace and the sloping edge of the gate line.

For example, the minimum distance dh between the second trace 32 and the gate line 200 may be 8.955259 microns; the length Lh of the second trace 32 may be 13.48103 microns; and for example, the width W of the second trace 32 may be 11.17 microns.

For example, assuming that Fd is 1, the above-mentioned minimum distance dh between the second trace 32 and the gate line 200 and the length $L_h$ of the second trace 32 may be substituted into the relation formula ln[(Lh/dh)×sin θh+1] to obtain the value of the second parameter Ctft, namely 0.72487; and the above-mentioned values and the width W of the second trace 32 may be substituted into W×ln[(Lh/dh)×sin θh+1] to obtain the value of the capacitance between the second trace 32 and the gate line 200, namely 2.537044 F. With reference to the capacitances Ch+Cv=3.872386 formed by the first trace 31 and the protrusion edge shown in FIG. 1 and FIG. 5, a ratio of the capacitances at the two positions may be 1.526338.

For example, the minimum of the above-mentioned length $L_h$ of the second trace 32 may be 2 microns, and the minimum of the above-mentioned minimum distance dh between the second trace 32 and the gate line 200 may be 2 microns. The above-mentioned minimums may be substituted into the relation formula ln[(Lh/dh)×sin θh+1] to obtain the minimum of the second parameter Ctft, namely 0.068323. For example, the maximum of the above-mentioned length Lh of the second trace 32 may be 30 microns, and the maximum of the above-mentioned minimum distance dh between the second trace 32 and the gate line 200 may be 20 microns. The above-mentioned maximums may be substituted into the relation formula ln[(Lh/dh)×sin θh+1] to obtain the maximum of the second parameter Ctft, namely 2.451574. With reference to the maximum 4.903148 of the first parameter Cpad and the minimum 0.483114 of the first parameter Cpad in the examples shown in FIG. 1 and FIG. 5, the ratio of the maximum of the first parameter Cpad to the maximum of the second parameter Ctft may be obtained as 2, and the minimum of the first parameter Cpad to the minimum of the second parameter Ctft is 7.071068.

For example, the above-mentioned second parameter Ctft meets: 0.01≤Ctft≤2.5. For example, the above-mentioned second parameter Ctft meets: 0.05≤Ctft≤2. For example, the above-mentioned second parameter Ctft meets: 0.1≤Ctft≤2.2. For example, the above-mentioned second parameter Ctft meets: 0.5≤Ctft≤2. For example, the above-mentioned second parameter Ctft meets: 1≤Ctft≤1.5. For example, the above-mentioned second parameter Ctft meets: 1.5≤Ctft≤2.

For example, a ratio of the above-mentioned first parameter Cpad to the second parameter Ctft meets: 1≤Cpad/Ctft≤7. For example, the ratio of the above-mentioned first parameter Cpad to the second parameter Ctft meets: 2≤Cpad/Ctft≤6. For example, the ratio of the above-mentioned first parameter Cpad to the second parameter Ctft meets: 3≤Cpad/Ctft≤5.

In this embodiment of the present disclosure, each first trace in the first pixel region corresponding to the gate line pad is designed to extend in the first direction or the second direction so that the ratio of the first parameter of the first pixel region to the second parameter of the second pixel region can be reduced, thereby being conducive to improving the consistency of the capacitances of different pixel regions and reducing the stray capacitance of the gate line.

Figure 8A:
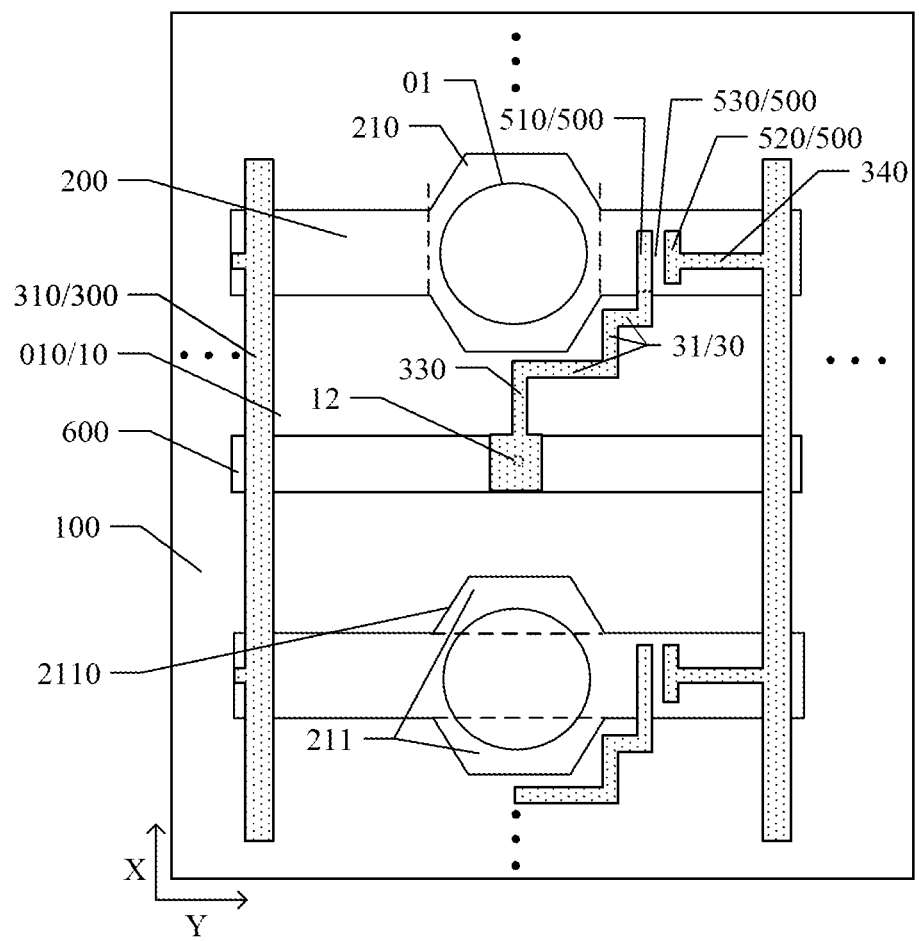
FIG. 8A is a schematic diagram illustrating a partial planar structure of an array substrate provided in another example implemented according to the present disclosure.

FIG. 8A is a schematic diagram illustrating a partial planar structure of an array substrate provided in another example implemented according to the present disclosure. As shown in FIG. 8A, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10. FIG. 8A schematically illustrates a pixel region 10. For example, as shown in FIG. 8A, the plurality of data lines 310 extend in an X-direction and arranged in a Y-direction. The plurality of gate lines 200 extend in the Y-direction and are arranged in the X-direction. For example, the first direction is the X-direction, while the second direction is the Y-direction, and the first direction is perpendicular to the second direction. Without limitation, the first direction may also not be perpendicular to the second direction. For example, the first direction and the second direction may be interchangeable. For example, as shown in FIG. 8A, two adjacent data lines 310 and two adjacent gate lines 200 are disposed crosswise to define a pixel region 10. For example, a pixel region 10 is a subpixel. For example, the array substrate includes a plurality of subpixels (a plurality of pixel regions 10) that include subpixels configured to display light of different colors. For example, the plurality of subpixels include a red subpixel configured to display red light, a green subpixel configured to display green light, and a blue subpixel configured to display blue light. For example, two adjacent subpixels arranged in at least one of the first direction and the second direction are subpixels configured to display light of different colors, respectively.

As shown in FIG. 8A, at least one gate line 200 includes a gate line pad 210 that includes a protrusion 211 protruding towards the pixel region 10 relative to the portion of the gate line 200 other than the gate line pad 210.

As shown in FIG. 8A, the metal layer 300 located in the pixel region 10 includes a plurality of traces 30 extending along at least part of the contour of the pixel region 10. For example, at least part of the above-mentioned plurality of traces 30 are electrically connected traces. For example, the electrically connected traces in the above-mentioned plurality of traces 30 are integrated traces. The "integrated traces" described above may be traces formed by performing a same patterning process on a same metal material layer. The "plurality of traces 30 extending along the contour of the pixel region 10" described above may refer to the plurality of traces extending along an edge of the data line 310 and an edge of the gate line 200. The plurality of traces extending along the contour of the pixel region described above may be parallel to the extension direction of the edge of the data line or the gate line. Without limitation, part of the plurality of traces may also be not parallel to a certain portion of the edge of the gate line or the data line. Whether a trace is parallel to an edge of a signal line (including the gate line and the data line) adjacent (in a planar view) thereto may be set according to product requirements.

As shown in FIG. 8A, the plurality of traces 30 include a plurality of first traces 31 surrounding at least part of edges of the protrusion 211. Each first trace 31 extends in the first direction or the second direction, and the plurality of first traces 31 are connected end to end to form a step structure. The "plurality of first traces 31 surrounding at least part of edges of the protrusion 211" described above may refer to an orthographic projection of the plurality of first traces 31 on the base substrate 100 surrounding an orthographic projection of at least part of edges of the protrusion 211 on the base substrate 100.

In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

For example, as shown in FIG. 8A, the gate line pad 210 is part of structure of the gate line 200. For example, in the X-direction, a width of the gate line pad 210 is greater than a width of the portion of the gate line 200 other than the gate line pad 210. For example, in a width direction, a portion, protruding relative to the portion of the gate line 200 other than the gate line pad 210, of the gate line pad 210 is a protrusion 211.

For example, the example shown in FIG. 8A differs from the example shown in FIG. 1 in that the gate line pad 210 includes protrusions 211 protruding relative to two sides of the gate line 200. For example, a plurality of gate line pads 210 may be disposed on one gate line 200, and the plurality of gate line pads 210 each include protrusions 211 protruding relative to the two sides of the gate line 200. As a matter of course, this example is not limited thereto, the gate line pad in this example may also include only a protrusion protruding relative a side of the gate line.

For example, a positional relationship between the gate line pad and the support portion in the array substrate shown in FIG. 8A may be the same as that between the gate line pad and the support portion in the array substrate shown in FIG. 1, which will not be described here redundantly.

For example, as shown in FIG. 8A, an edge of the protrusion 211 of the gate line pad 210 includes a broken line or a curve.

For example, the array substrate further includes a plurality of pixel electrodes 400 and a plurality of thin film transistors 500. In this example, the pixel electrode included in the array substrate may have the same features with the pixel electrode shown in FIG. 2, which will not be described here redundantly.

For example, as shown in FIG. 8A, each pixel region 10 may include one thin film transistor 500. Without limitation, the number of the thin film transistors included in each pixel region may be set according to the performance of a desired pixel electrode. For example, the number of the thin film transistors in each pixel region may be 2 or more.

For example, as shown in FIG. 8A, each thin film transistor 500 includes a first electrode 510, a gate electrode 530 and a second electrode 520. The first electrode 510 and the second electrode 520 both overlap a film layer where the gate lines 200 are located. For example, the thin film transistor 500 further includes an active layer. The first electrode 510 and the second electrode 520 both overlap the active layer, and the gate electrode 530 overlaps the active layer. For example, the gate electrode 530 may be part of structure of the gate line 200.

For example, as shown in FIG. 8A, the first electrode 510 of the thin film transistor 500 is electrically connected to the pixel electrode 400 by a first connecting portion 330, and the second electrode 520 of the thin film transistor 500 is electrically connected to the data line 310.

For example, as shown in FIG. 8A, the first electrode 510 of the thin film transistor 500, the second electrode 520 of the thin film transistor 500 and the first connecting portion 330 are all structures in the metal layer 300.

For example, as shown in FIG. 8A, the first electrode 510 of the thin film transistor 500 and the first connecting portion 330 may be of an integrated structure, and without limitation, they may also be of a structure formed by the two electrically connected parts. For example, the first electrode 510 of the thin film transistor 500 may be a portion where the metal layer 300 overlaps the active layer, and the first connecting portion 330 may be a portion where the metal layer 300 does not overlap the active layer.

For example, the first connecting portion 330 overlaps the pixel electrode 400 in the direction perpendicular to the base substrate 100. For example, part of the first connecting portion 330 overlaps the pixel electrode 400 in the direction perpendicular to the base substrate 100.

For example, as shown in FIG. 8A, the second connecting portion 340 overlaps the gate line 200 in the direction perpendicular to the base substrate 100. For example, the second connecting portion 340 may be of an integrated structure with the second electrode 520 of the thin film transistor 500. For example, the second connecting portion 340 may be of an integrated structure with the data line 310. For example, the second electrode 520 of the thin film transistor 500, the second connecting portion 340 and the data line 310 may be of an integrated structure. For example, the second connecting portion 340 may extend in the second direction. For example, the second connecting portion 340 is spaced apart from the common electrode 320.

For example, the array substrate shown in FIG. 8A differs from the array substrate shown in FIG. 1 further in that: the gate electrode 530 of the thin film transistor 500 on the array substrate shown in FIG. 8A is located at other position than the gate line pad 210 on the gate line 200. For example, the gate electrode 530 of the thin film transistor 500 may be located on one side of the gate line pad 210 in the Y-direction. For example, in the direction perpendicular to the base substrate 100, the gate electrode 530 of the thin film transistor 500 does not overlap the support portion 01, which is conducive to improving the flatness of the support portion. For example, in the direction perpendicular to the base substrate 100, none of the first electrode 510 and the second electrode 520 of the thin film transistor 500 may overlap the support portion 01.

The array substrate shown in FIG. 8A differs from the array substrate shown in FIG. 6 in that the metal layer includes no common electrode and the traces are all structures in the first connecting portion.

For example, as shown in FIG. 8A, all of the traces 30 may be the first traces 31.

For example, as shown in FIG. 8A, the first connecting portion 330 includes the first traces 31. For example, the first traces 31 may all be structures of the first connecting portion 330.

For example, two first traces 31, connected end to end, in the plurality of first traces 31 are electrically connected. For example, the plurality of first traces 31 may be of an integrated structure. For example, a distance between the orthographic projection of the plurality of first traces 31 on the base substrate 100 and the surrounded orthographic projection of the edges of the protrusion 211 on the base substrate 100 is smaller than a distance between an orthographic projection of other trace on the base substrate 100 and the edge of the protrusion 211. For example, distances between different first traces 31 and the surrounded edges of the protrusion 211 may be the same or different. For example, an extension direction of the first trace 31 may be parallel to the surrounded edge of the protrusion 211. The extension direction of the first trace 31 may also intersect the surrounded edge of the protrusion 211.

For example, as shown in FIG. 8A, any trace 31 in the plurality of traces 30 may extend in the first direction or extend in the second direction.

A relationship between the first trace included in the first connecting portion and the edge of the protrusion of the gate line pad in this example may have the same features with that between the first trace included in the first connecting portion and the edge of the protrusion of the gate line pad in the array substrate shown in FIG. 6, which will not be described here redundantly. The capacitance formed between the first trace included in the first connecting portion and the protrusion edge of the protrusion in this example may be calculated using the same method with the capacitance formed between the first trace and the protrusion edge in the examples shown in FIG. 1 and FIG. 5.

For example, the second pixel region included in the array substrate shown in FIG. 8A may have the same features with the second pixel region shown in FIG. 7, and the length ratio of the first connecting portions and the area ratio of the first connecting portions in the first pixel region and the second pixel region in the array substrate shown in FIG. 8A may have the same features with the length ratio of the first connecting portions and the area ratio of the first connecting portions in the first pixel region and the second pixel region in the array substrate shown in FIG. 6 and FIG. 7, respectively, which will not be described here redundantly.

In this example, the array substrate shown in FIG. 8A further includes a common electrode line 600. The common electrode line 600 may have the same features with the common electrode line shown in FIG. 6, which will not be described here redundantly.

Figure 8B:
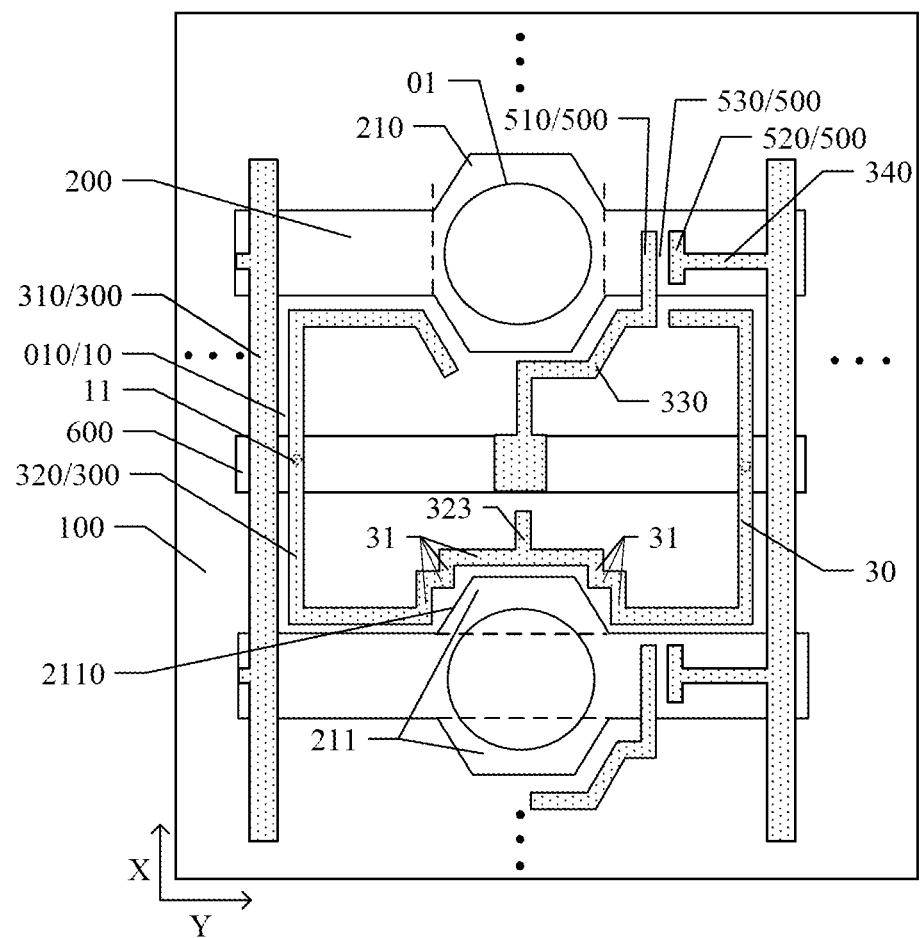
FIG. 8B is a schematic diagram illustrating a partial planar structure of an array substrate provided in another example implemented according to the present disclosure.

FIG. 8B is a schematic diagram illustrating a partial planar structure of an array substrate provided in another example implemented according to the present disclosure. As shown in FIG. 8B, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10. FIG. 8B schematically illustrates a pixel region 10.

For example, as shown in FIG. 8B, the plurality of data lines 310 extend in an X-direction and arranged in a Y-direction. The plurality of gate lines 200 extend in the Y-direction and are arranged in the X-direction. For example, the first direction is the X-direction, while the second direction is the Y-direction, and the first direction is perpendicular to the second direction. Without limitation, the first direction may also not be perpendicular to the second direction. For example, the first direction and the second direction may be interchangeable.

For example, as shown in FIG. 8B, two adjacent data lines 310 and two adjacent gate lines 200 are disposed crosswise to define a pixel region 10. For example, a pixel region 10 is a subpixel. For example, the array substrate includes a plurality of subpixels (a plurality of pixel regions 10) that include subpixels configured to display light of different colors. For example, the plurality of subpixels include a red subpixel configured to display red light, a green subpixel configured to display green light, and a blue subpixel configured to display blue light. For example, two adjacent subpixels arranged in at least one of the first direction and the second direction are subpixels configured to display light of different colors, respectively.

For example, a shape of the pixel region 10 is a polygon. For example, the shape of the pixel region 10 is a quadrangle. For example, the shape of the pixel region 10 is a rectangle. The embodiments of the present disclosure have no limitation on this. The shape of the pixel region 10 is related to shapes of an edge of the data line 310 and an edge of the gate line 200.

For example, each pixel region 10 includes a display region for display. An area of the display region may be smaller than that of the pixel region 10. For example, a shape of the display region may be the same as that of the pixel region 10. Alternatively, the shape of the display region may be different from that of the pixel region 10.

As shown in FIG. 8B, the metal layer 300 further includes a common electrode 320 located in the pixel region 10. For example, the common electrode 320 may be a film layer disposed at a same layer and made of a same material with the data line 310.

As shown in FIG. 8B, at least one gate line 200 includes a gate line pad 210 that includes a protrusion 211 protruding towards the pixel region 10 relative to the portion of the gate line 200 other than the gate line pad 210.

For example, as shown in FIG. 8B, the gate line pad 210 is part of structure of the gate line 200. For example, in the X-direction, a width of the gate line pad 210 is greater than a width of the portion of the gate line 200 other than the gate line pad 210. For example, in a width direction, a portion, protruding relative to the portion of the gate line 200 other than the gate line pad 210, of the gate line pad 210 is a protrusion 211.

For example, the example shown in FIG. 8B differs from the example shown in FIG. 1 in that the gate line pad 210 includes protrusions 211 protruding relative to two sides of the gate line 200. For example, a plurality of gate line pads 210 may be disposed on one gate line 200, and the plurality of gate line pads 210 each include protrusions 211 protruding relative to the two sides of the gate line 200.

For example, as shown in FIG. 8B, the gate line pad 210 is configured to be opposed to a support portion 01. For example, the gate line pad 210 overlaps the support portion 01 in a direction perpendicular to the base substrate 100. For example, an orthographic projection of the gate line pad 210 on the base substrate 100 may overlap an orthographic projection of the support portion 01 on the base substrate 100. For example, the orthographic projection of the support portion 01 on the base substrate 100 may completely fall into the orthographic projection of the gate line pad 210 on the base substrate 100. For example, the support portion 01 in this example may have the same features with the support portion 01 in the example shown in FIG. 1, which will not be described here redundantly. For example, FIG. 8B schematically illustrates that the support portion 01 is disposed on the array substrate. Without limitation, the support portion may be disposed on the opposed substrate. The position of the support portion may be set according to product requirements.

As shown in FIG. 8B, the metal layer 300 located in the pixel region 10 includes a plurality of traces 30 extending along at least part of a contour of the pixel region 10. For example, at least part of the above-mentioned plurality of traces 30 are electrically connected traces. For example, the electrically connected traces in the above-mentioned plurality of traces 30 are integrated traces. The "integrated traces" described above may be traces formed by performing a same patterning process on a same metal material layer. The "plurality of traces 30 extending along the contour of the pixel region 10" described above may refer to the plurality of traces extending along an edge of the data line 310 and an edge of the gate line 200. The plurality of traces extending along the contour of the pixel region described above may be parallel to the extension direction of the edge of the data line or the gate line. Without limitation, part of the plurality of traces may also be not parallel to a certain portion of the edge of the gate line or the data line. Whether a trace is parallel to an edge of a signal line (including the gate line and the data line) adjacent (in a planar view) thereto may be set according to product requirements.

For example, as shown in FIG. 8B, an edge of the protrusion 211 of the gate line pad 210 includes a broken line or a curve.

As shown in FIG. 8B, the plurality of traces 30 include a plurality of first traces 31 surrounding at least part of edges of the protrusion 211. Each first trace 31 extends in the first direction or the second direction, and the plurality of first traces 31 are connected end to end to form a step structure. The "plurality of first traces 31 surrounding at least part of edges of the protrusion 211" described above may refer to an orthographic projection of the plurality of first traces 31 on the base substrate 100 surrounding an orthographic projection of at least part of edges of the protrusion 211 on the base substrate 100.

In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

For example, two first traces 31, connected end to end, in the plurality of first traces 31 are electrically connected. For example, the plurality of first traces 31 may be of an integrated structure. For example, a distance between the orthographic projection of the plurality of first traces 31 on the base substrate 100 and the surrounded orthographic projection of the edges of the protrusion 211 on the base substrate is smaller than a distance between an orthographic projection of other trace on the base substrate 100 and the edge of the protrusion 211. For example, distances between different first traces 31 and the surrounded edges of the protrusion 211 may be the same or different. For example, an extension direction of the first trace 31 may be parallel to the surrounded edge of the protrusion 211. The extension direction of the first trace 31 may also intersect the surrounded edge of the protrusion 211.

For example, as shown in FIG. 8B, the extension direction of other traces 30 than the first traces 31 in the plurality of traces 30 may be parallel to the extension direction of the adjacent data line 310 or gate line 200. For example, the extension direction of other traces 30 than the first traces 31 in the plurality of traces 30 may be parallel to the extension direction of the edge, close to the traces 30, of the adjacent data line 310 or gate line 200.

For example, as shown in FIG. 8B, two traces 30 located at two outermost ends of the plurality of first traces 31 may extend in the second direction. For example, the two traces 30 located at the two outermost ends of the plurality of first traces 31 may be both electrically connected to the first traces 31. For example, the two traces 30 located at the two outermost ends of the plurality of first traces 31 may be both of an integrated structure with the first traces 31. Without limitation, one of the two traces located at the two outermost ends of the plurality of first traces may also be spaced apart from the first traces.

For example, as shown in FIG. 8B, any trace 31 in the plurality of traces 30 may extend in the first direction or extend in the second direction.

For example, as shown in FIG. 8B, the protrusions 211 located on two sides of a center line, extending in the Y-direction, of one gate line 200 may be the same or different in shape. For example, two protrusions 211 included in the same gate line pad 210 and protruding relative to other positions of the gate line 200 may be the same or different in shape. For example, the shapes of the two protrusions 211 included in the same gate line pad 210 may both be a trapezoid, and an upper base of the trapezoid protrudes towards the pixel region 10 relative to other portion of the gate line 200, while the lower base of the trapezoid may be flush with at least part of edges of the other portion of the gate line 200.

For example, the array substrate further includes a plurality of pixel electrodes 400 and a plurality of thin film transistors 500. In this example, the pixel electrode included in the array substrate may have the same features with the pixel electrode shown in FIG. 2, which will not be described here redundantly.

For example, as shown in FIG. 8B, each pixel region 10 may include one thin film transistor 500. Without limitation, the number of the thin film transistors included in each pixel region may be set according to the performance of a desired pixel electrode. For example, the number of the thin film transistors in each pixel region may be 2 or more.

For example, as shown in FIG. 8B, each thin film transistor 500 includes a first electrode 510, a gate electrode 530 and a second electrode 520. The first electrode 510 and the second electrode 520 both overlap a film layer where the gate lines 200 are located. For example, the thin film transistor 500 further includes an active layer. The first electrode 510 and the second electrode 520 both overlap the active layer, and the gate electrode 530 overlaps the active layer. For example, the gate electrode 530 may be part of structure of the gate line 200.

For example, as shown in FIG. 8B, the first electrode 510 of the thin film transistor 500 is electrically connected to the pixel electrode 400 by a first connecting portion 330, and the second electrode 520 of the thin film transistor 500 is electrically connected to the data line 310.

For example, as shown in FIG. 8B, the first electrode 510 of the thin film transistor 500, the second electrode 520 of the thin film transistor 500 and the first connecting portion 330 are all structures in the metal layer 300, and the first electrode 510 of the thin film transistor 500 and the second electrode 520 of the thin film transistor 500 are both insulated from the common electrode 320. For example, the first electrode 510 of the thin film transistor 500 and the second electrode 520 of the thin film transistor 500 are both spaced apart from the common electrode 320. For example, the first connecting portion 330 is spaced apart from the common electrode 320.

For example, as shown in FIG. 8B, the first electrode 510 of the thin film transistor 500 and the first connecting portion 330 may be of an integrated structure, and without limitation, may also be of a structure formed by the two electrically connected. For example, the first electrode 510 of the thin film transistor 500 may be a portion where the metal layer 300 overlaps the active layer, and the first connecting portion 330 may be a portion where the metal layer 300 does not overlap the active layer.

For example, the first connecting portion 330 and the common electrode 320 both overlap the pixel electrode 400 in the direction perpendicular to the base substrate 100. For example, part of the first connecting portion 330 overlaps the pixel electrode 400 in the direction perpendicular to the base substrate 100. For example, part of the common electrode 320 overlaps the pixel electrode 400 in the direction perpendicular to the base substrate 100.

For example, as shown in FIG. 8B, the second connecting portion 340 overlaps the gate line 200 in the direction perpendicular to the base substrate 100. For example, the second connecting portion 340 may be of an integrated structure with the second electrode 520 of the thin film transistor 500. For example, the second connecting portion 340 may be of an integrated structure with the data line 310. For example, the second electrode 520 of the thin film transistor 500, the second connecting portion 340 and the data line 310 may be of an integrated structure. For example, the second connecting portion 340 may extend in the second direction. For example, the second connecting portion 340 is spaced apart from the common electrode 320.

For example, the array substrate shown in FIG. 8B differs from the array substrate shown in FIG. 1 further in that: the gate electrode 530 of the thin film transistor 500 on the array substrate shown in FIG. 8B is located at other position than the gate line pad 210 on the gate line 200. For example, the gate electrode 530 of the thin film transistor 500 may be located on one side of the gate line pad 210 in the Y-direction. For example, in the direction perpendicular to the base substrate 100, the gate electrode 530 of the thin film transistor 500 does not overlap the support portion 01, which is conducive to improving the flatness of the support portion. For example, in the direction perpendicular to the base substrate 100, none of the first electrode 510 and the second electrode 520 of the thin film transistor 500 may overlap the support portion 01.

For example, the second pixel region included in the array substrate shown in FIG. 8B may have the same features with the second pixel region shown in FIG. 7, and the length ratio of the common electrodes and the area ratio of the common electrodes in the first pixel region and the second pixel region in the array substrate shown in FIG. 8B may have the same features with the length ratio of the common electrodes and the area ratio of the common electrodes in the first pixel region and the second pixel region in the array substrate shown in FIG. 6 and FIG. 7, respectively, which will not be described here redundantly.

For example, the array substrate shown in FIG. 8B differs from the array substrate shown in FIG. 6 in that only the common electrode 320 includes a plurality of first traces 31, while the first connecting portion 330 includes no first trace 31. For example, as shown in FIG. 8B, at least one edge of the protrusion 211 included in the gate line pad 210 is not parallel to both of the first direction and the second direction.

For example, as shown in FIG. 8B, two gate lines 200 located on two sides of at least one first pixel region 010 each include the gate line pad 210 protruding towards the first pixel region 010. The common electrode 320 includes a first trace 31 surrounding the protrusion 211 of the gate line pad 210 on one of the two gate lines 200, while the first connecting portion 330 surrounds at least part of the edges of the protrusion 211 of the gate line pad 210 on the other one of the two gate lines 200. The first connecting portion 330 surrounding at least part of the edges of the protrusion 211 includes a plurality of third traces, and each third trace is parallel to the adjacent edge of the protrusion 211. For example, the orthographic projection of each third trace on the base substrate 100 is parallel to the orthographic projection of the adjacent edge of the protrusion 211 on the base substrate 100. For example, at least one third trace is not parallel to both of the first direction and the second direction.

For example, as shown in FIG. 8B, the gate line pad 210 includes two protrusions 211 protruding toward two sides of the gate line 200 in the X-direction, namely a first protrusion and a second protrusion. The first traces 31 surrounding the first protrusion may all belong to the common electrode 320. The traces 30 surrounding the second protrusion are the third traces. One part of the third traces belongs to the common electrode 320, while the other part of the third traces belongs to the first connecting portion 330. For example, all the first traces 31 surrounding the first protrusion are traces 30 disposed continuously and connected end to end. The third traces surrounding the second protrusion include two parts of third traces spaced apart from each other, and at least one part of the third traces are disposed continuously and connected end to end. For example, the third traces included in the first connecting portion 330 surrounding the second protrusion are disposed continuously and connected end to end.

A relationship between the first trace included in the common electrode and the edge of the protrusion of the gate line pad in this example may have the same features with that between the first trace included in the common electrode and the edge of the protrusion of the gate line pad in the array substrate shown in FIG. 6, which will not be described here redundantly. The capacitance formed between the first trace included in the common electrode and the protrusion edge of the protrusion in this example may be calculated using the same method with the capacitance formed between the first trace and the protrusion edge in the examples shown in FIG. 1 and FIG. 5.

For example, as shown in FIG. 8B, the capacitance between the third trace parallel to the edge of the protrusion 211 and the edge of the protrusion 211 meets: $C = \varepsilon d \times W \times L / d$, where $\varepsilon d$ is the relative dielectric constant; W is the width of the third trace; L is the length of each third trace; and d is the distance between the third trace and the edge of the protrusion 211. For example, when the third trace is parallel to the edge of the protrusion 211, the value of the capacitance C therebetween may be 6.68.

For example, as shown in FIG. 8B, the first connecting portion 330 includes a plurality of third traces. The plurality of third traces include a third trace parallel to the first direction, a third trace parallel to the second direction, and a third trace not parallel to both of the first direction and the second direction.

For example, as shown in FIG. 8B, the array substrate further includes a common electrode line 600 that is disposed at a same layer with the plurality of gate lines 200. The common electrode 320 is electrically connected to the common electrode line 600.

For example, as shown in FIG. 8B, an insulating layer (not shown) is disposed between the common electrode 320 and the common electrode line 600, and the common electrode 320 is electrically connected to the common electrode line 600 through a via hole 11 in the insulating layer.

For example, as shown in FIG. 8B, the common electrode 320 within at least one pixel region 10 may be of an integrated structure, and the common electrode 320 within the pixel region 10 may be electrically connected to the common electrode line 600 through at least one via hole 11. Without limitation, the common electrode within at least one pixel region may also be designed as at least two structures separated from each other, with each structure being electrically connected to the common electrode line.

For example, as shown in FIG. 8B, the common electrode line 600 extends in the second direction. For example, the gate line 200 and the common electrode line 600 may be disposed alternately in the first direction. For example, the common electrode line 600 overlaps the pixel electrode 400 in the direction perpendicular to the base substrate 100.

For example, as shown in FIG. 8B, the first connecting portion 330 overlaps the common electrode line 600 in the direction perpendicular to the base substrate 100.

For example, as shown in FIG. 8B, the common electrode 320 further includes a third common sub-electrode 323 extending in first direction. The third common sub-electrode 323 and at least part of the sub-portions extending in the first direction in the first connecting portion 330 are located in a same straight line to divide the pixel region 10 into two subpixel regions. For example, the third common sub-electrode 323 and the first connecting portion 330 are configured to act in combination to divide one pixel region into two subpixel regions. As a matter of course, the embodiments of the present disclosure are not limited thereto, and the third common sub-electrode may also be not located in the extension direction of the same straight line with the first connecting portion.

For example, as shown in FIG. 8B, the two subpixel regions included in one pixel region 10 are arranged in the Y-direction. For example, the shapes of the pixel electrodes in different subpixel regions may be the same or different. For example, the shapes of different subpixel regions in the same pixel region 10 may be the same or different. For example, the areas of different subpixel regions in the same pixel region 10 may be the same or different.

For example, as shown in FIG. 8B, at least part of the first connecting portion 330 and the third common sub-electrode 323 are located on two sides of the common electrode line 600, respectively. For example, the first connecting portion 330 includes one portion overlapping the common electrode line 600 and the other portion not overlapping the common electrode line 600. The portion, not overlapping the common electrode line 600, of the first connecting portion 330 and the third common sub-electrode 323 are located on the two sides of the common electrode line 600, respectively. As a matter of course, the embodiments of the present disclosure are not limited thereto, and the first connecting portion may also include two portions located on the two sides of the common electrode line. In this case, the third common sub-electrode may be omitted. Alternatively, a portion, located on the same side of the common electrode line with the third common sub-electrode, of the first connecting portion is designed to have a smaller length to guarantee that the first connecting portion is spaced apart from the third common sub-electrode. For example, when the first connecting portion includes two portions located on the two sides of the common electrode line, the two portions may be equal or unequal in width. For example, when the first connecting portion includes two portions located on the two sides of the common electrode line, the portion, located on the same side of the common electrode line with the third common sub-electrode, of the first connecting portion may be as wide as the third common sub-electrode. Without limitation, the two may also be different in width.

Figure 9:
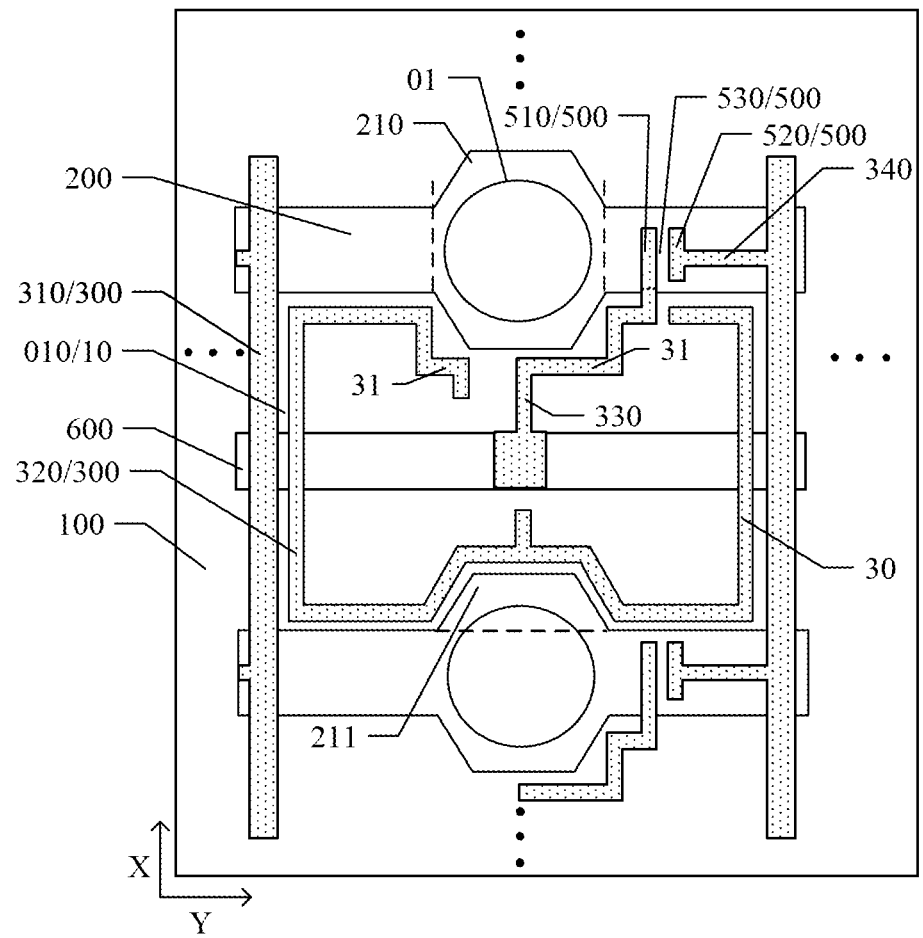
FIG. 9 is a schematic diagram illustrating a partial planar structure of an array substrate provided in another example implemented according to the present disclosure.

FIG. 9 is a schematic diagram illustrating a partial planar structure of an array substrate provided in another example implemented according to the present disclosure. As shown in FIG. 9, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10. FIG. 9 schematically illustrates a pixel region 10.

For example, as shown in FIG. 9, the plurality of data lines 310 extend in an X-direction and arranged in a Y-direction. The plurality of gate lines 200 extend in the Y-direction and are arranged in the X-direction. For example, the first direction is the X-direction, while the second direction is the Y-direction, and the first direction is perpendicular to the second direction. Without limitation, the first direction may also not be perpendicular to the second direction. For example, the first direction and the second direction may be interchangeable.

For example, as shown in FIG. 9, two adjacent data lines 310 and two adjacent gate lines 200 are disposed crosswise to define a pixel region 10. For example, a pixel region 10 is a subpixel. For example, the array substrate includes a plurality of subpixels (a plurality of pixel regions 10) that include subpixels configured to display light of different colors. For example, the plurality of subpixels include a red subpixel configured to display red light, a green subpixel configured to display green light, and a blue subpixel configured to display blue light. For example, two adjacent subpixels arranged in at least one of the first direction and the second direction are subpixels configured to display light of different colors, respectively.

For example, a shape of the pixel region 10 is a polygon. For example, the shape of the pixel region 10 is a quadrangle. For example, the shape of the pixel region 10 is a rectangle. The embodiments of the present disclosure have no limitation on this. The shape of the pixel region 10 is related to shapes of an edge of the data line 310 and an edge of the gate line 200.

For example, each pixel region 10 includes a display region for display. An area of the display region may be smaller than that of the pixel region 10. For example, a shape of the display region may be the same as that of the pixel region 10. Alternatively, the shape of the display region may be different from that of the pixel region 10.

As shown in FIG. 9, the metal layer 300 further includes a common electrode 320 located in the pixel region 10. For example, the common electrode 320 may be a film layer disposed at a same layer and made of a same material with the data line 310.

As shown in FIG. 9, at least one gate line 200 includes a gate line pad 210 that includes a protrusion 211 protruding into the pixel region 10 relative to the portion of the gate line 200 other than the gate line pad 210.

For example, as shown in FIG. 9, the gate line pad 210 is part of structure of the gate line 200. For example, in the X-direction, a width of the gate line pad 210 is greater than a width of the portion of the gate line other than the gate line pad 210. For example, in a width direction, a portion, protruding relative to the portion of the gate line 200 other than the gate line pad 210, of the gate line pad 210 is a protrusion 211.

For example, the example shown in FIG. 9 differs from the example shown in FIG. 1 in that the gate line pad 210 includes protrusions 211 protruding relative to two sides of the gate line 200. For example, a plurality of gate line pads 210 may be disposed on one gate line 200, and the plurality of gate line pads 210 each include protrusions 211 protruding relative to the two sides of the gate line 200.

For example, as shown in FIG. 9, the gate line pad 210 is configured to be opposed to a support portion 01. For example, the gate line pad 210 overlaps the support portion 01 in a direction perpendicular to the base substrate 100. For example, an orthographic projection of the gate line pad 210 on the base substrate 100 may overlap an orthographic projection of the support portion 01 on the base substrate 100. For example, the orthographic projection of the support portion 01 on the base substrate 100 may completely fall into the orthographic projection of the gate line pad 210 on the base substrate 100. For example, the support portion 01 in this example may have the same features with the support portion 01 in the example shown in FIG. 1, which will not be described here redundantly. For example, FIG. 9 schematically illustrates that the support portion 01 is disposed on the array substrate. Without limitation, the support portion may be disposed on the opposed substrate. The position of the support portion may be set according to product requirements.

As shown in FIG. 9, the metal layer 300 located in the pixel region 10 includes a plurality of traces 30 extending along at least part of a contour of the pixel region 10. For example, at least part of the above-mentioned plurality of traces 30 are electrically connected traces. For example, the electrically connected traces in the above-mentioned plurality of traces 30 are integrated traces. The "integrated traces" described above may be traces formed by performing a same patterning process on a same metal material layer. The "plurality of traces 30 extending along the contour of the pixel region 10" described above may refer to the plurality of traces extending along an edge of the data line 310 and an edge of the gate line 200. The plurality of traces extending along the contour of the pixel region described above may be parallel to the extension direction of the edge of the data line or the gate line. Without limitation, part of the plurality of traces may also be not parallel to a certain portion of the edge of the gate line or the data line. Whether a trace is parallel to an edge of a signal line (including the gate line and the data line) adjacent (in a planar view) thereto may be set according to product requirements.

For example, as shown in FIG. 9, an edge of the protrusion 211 of the gate line pad 210 includes a broken line or a curve.

As shown in FIG. 9, the plurality of traces 30 include a plurality of first traces 31 surrounding at least part of edges of the protrusion 211. Each first trace 31 extends in the first direction or the second direction, and the plurality of first traces 31 are connected end to end to form a step structure. The "plurality of first traces 31 surrounding at least part of edges of the protrusion 211" described above may refer to an orthographic projection of the plurality of first traces 31 on the base substrate 100 surrounding an orthographic projection of at least part of edges of the protrusion 211 on the base substrate 100.

In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

For example, two first traces 31, connected end to end, in the plurality of first traces 31 are electrically connected. For example, the plurality of first traces 31 may be of an integrated structure. For example, a distance between the orthographic projection of the plurality of first traces 31 on the base substrate 100 and the surrounded orthographic projection of the edges of the protrusion 211 on the base substrate is smaller than a distance between an orthographic projection of other trace on the base substrate 100 and the edge of the protrusion 211. For example, distances between different first traces 31 and the surrounded edges of the protrusion 211 may be the same or different. For example, an extension direction of the first trace 31 may be parallel to the surrounded edge of the protrusion 211. The extension direction of the first trace 31 may also intersect the surrounded edge of the protrusion 211.

For example, as shown in FIG. 9, the extension direction of other traces 30 than the first traces 31 in the plurality of traces 30 may be parallel to the extension direction of the adjacent data line 310 or gate line 200. For example, the extension direction of other traces 30 than the first traces 31 in the plurality of traces 30 may be parallel to the extension direction of the edge, close to the traces 30, of the adjacent data line 310 or gate line 200.

For example, as shown in FIG. 9, two traces 30 located at two outermost ends of the plurality of first traces 31 may extend in the second direction. For example, the two traces 30 located at the two outermost ends of the plurality of first traces 31 may be both electrically connected to the first traces 31. For example, the two traces 30 located at the two outermost ends of the plurality of first traces 31 may be both of an integrated structure with the first traces 31. Without limitation, one of the two traces located at the two outermost ends of the plurality of first traces may also be spaced apart from the first traces.

For example, as shown in FIG. 9, any of the plurality of traces 30 may extend in the first direction or extend in the second direction.

For example, as shown in FIG. 9, the protrusions 211 located on two sides of a center line, extending in the Y-direction, of one gate line 200 may be the same or different in shape. For example, two protrusions 211 included in the same gate line pad 210 and protruding relative to other positions of the gate line 200 may be the same or different in shape. For example, the shapes of the two protrusions 211 included in the same gate line pad 210 may both be a trapezoid, and an upper base of the trapezoid protrudes into the pixel region 10 relative to other portion of the gate line 200, while the lower base of the trapezoid may be flush with at least part of edges of the other portion of the gate line 200.

For example, as shown in FIG. 9, the protrusions 211 are disposed on both sides of the gate line 200 in the X-direction. In this case, in one pixel region 10, a plurality of first traces 31 in a plurality of traces 30 are centrally distributed at two positions in the plurality of traces 30.

For example, the array substrate further includes a plurality of pixel electrodes 400 and a plurality of thin film transistors 500. In this example, the pixel electrode included in the array substrate may have the same features with the pixel electrode shown in FIG. 2, which will not be described here redundantly.

For example, as shown in FIG. 9, each pixel region 10 may include one thin film transistor 500. Without limitation, the number of the thin film transistors included in each pixel region may be set according to the performance of a desired pixel electrode. For example, the number of the thin film transistors in each pixel region may be 2 or more.

For example, as shown in FIG. 9, each thin film transistor 500 includes a first electrode 510, a gate electrode 530 and a second electrode 520. The first electrode 510 and the second electrode 520 both overlap a film layer where the gate lines 200 are located. For example, the thin film transistor 500 further includes an active layer. The first electrode 510 and the second electrode 520 both overlap the active layer, and the gate electrode 530 overlaps the active layer. For example, the gate electrode 530 may be part of structure of the gate line 200.

For example, as shown in FIG. 9, the first electrode 510 of the thin film transistor 500 is electrically connected to the pixel electrode 400 by a first connecting portion 330, and the second electrode 520 of the thin film transistor 500 is electrically connected to the data line 310.

For example, as shown in FIG. 9, the first electrode 510 of the thin film transistor 500, the second electrode 520 of the thin film transistor 500 and the first connecting portion 330 are all structures in the metal layer 300, and the first electrode 510 of the thin film transistor 500 and the second electrode 520 of the thin film transistor 500 are both insulated from the common electrode 320. For example, the first electrode 510 of the thin film transistor 500 and the second electrode 520 of the thin film transistor 500 are both spaced apart from the common electrode 320. For example, the first connecting portion 330 is spaced apart from the common electrode 320.

For example, as shown in FIG. 9, the first electrode 510 of the thin film transistor 500 and the first connecting portion 330 may be of an integrated structure, and without limitation, may also be of a structure formed by the two electrically connected. For example, the first electrode 510 of the thin film transistor 500 may be a portion where the metal layer 300 overlaps the active layer, and the first connecting portion 330 may be a portion where the metal layer 300 does not overlap the active layer.

For example, the first connecting portion 330 and the common electrode 320 both overlap the pixel electrode 400 in the direction perpendicular to the base substrate 100. For example, part of the first connecting portion 330 overlaps the pixel electrode 400 in the direction perpendicular to the base substrate 100. For example, part of the common electrode 320 overlaps the pixel electrode 400 in the direction perpendicular to the base substrate 100.

For example, as shown in FIG. 9, the second connecting portion 340 overlaps the gate line 200 in the direction perpendicular to the base substrate 100. For example, the second connecting portion 340 may be of an integrated structure with the second electrode 520 of the thin film transistor 500. For example, the second connecting portion 340 may be of an integrated structure with the data line 310. For example, the second electrode 520 of the thin film transistor 500, the second connecting portion 340 and the data line 310 may be of an integrated structure. For example, the second connecting portion 340 may extend in the second direction. For example, the second connecting portion 340 is spaced apart from the common electrode 320.

For example, the array substrate shown in FIG. 9 differs from the array substrate shown in FIG. 1 further in that: the gate electrode 530 of the thin film transistor 500 on the array substrate shown in FIG. 9 is located at other position than the gate line pad 210 on the gate line 200. For example, the gate electrode 530 of the thin film transistor 500 may be located on one side of the gate line pad 210 in the Y-direction. For example, in the direction perpendicular to the base substrate 100, the gate electrode 530 of the thin film transistor 500 does not overlap the support portion 01, which is conducive to improving the flatness of the support portion. For example, in the direction perpendicular to the base substrate 100, none of the first electrode 510 and the second electrode 520 of the thin film transistor 500 may overlap the support portion 01.

For example, the second pixel region included in the array substrate shown in FIG. 9 may have the same features with the second pixel region shown in FIG. 7, and the length ratio of the common electrodes and the area ratio of the common electrodes in the first pixel region and the second pixel region in the array substrate shown in FIG. 9 may have the same features with the length ratio of the common electrodes and the area ratio of the common electrodes in the first pixel region and the second pixel region in the array substrate shown in FIG. 6 and FIG. 7, respectively, which will not be described here redundantly.

For example, the array substrate shown in FIG. 9 differs from the array substrate shown in FIG. 8B in that both of the first connecting portion 330 and the common electrode 320 include the first traces 31. For example, as shown in FIG. 9, at least one edge of the protrusion 211 included in the gate line pad 210 is not parallel to both of the first direction and the second direction.

For example, as shown in FIG. 9, two gate lines 200 located on two sides of at least one first pixel region 010 each include the gate line pad 210 protruding towards the first pixel region 010. The first connecting portion 330 includes a first trace 31 surrounding part of edges of the protrusion 211 of the gate line pad 210 on one of the two gate lines 200, while the common electrode 320 includes a first trace 31 surrounding the other part of edges of the protrusion 211 of the gate line pad 210. The common electrode 320 further includes a trace 30 surrounding an edge of the protrusion 211 of the gate line pad 210 on the other one of the two gate lines 200. The common electrode 320 surrounding the edge of the protrusion 211 includes a plurality of third traces, and each third trace is parallel to the adjacent edge of the protrusion 211. For example, the orthographic projection of each third trace on the base substrate 100 is parallel to the orthographic projection of the adjacent edge of the protrusion 211 on the base substrate 100. For example, at least one third trace is not parallel to both of the first direction and the second direction.

For example, as shown in FIG. 9, the gate line pad 210 includes two protrusions 211 protruding toward two sides of the gate line 200 in the X-direction, namely a first protrusion and a second protrusion. One part of the first traces 31 surrounding the first protrusion belongs to the first connecting portion 330, and the other part of the first traces 31 surrounding the first protrusion belongs to the common electrode 320. The traces 30 surrounding the second protrusion are the third traces, and the third traces all belongs to the common electrode 320. For example, all the third traces surrounding the second protrusion are traces 30 disposed continuously and connected end to end. The first traces 31 surrounding the first protrusion include two parts of first traces 31 spaced apart from each other, and at least one part of the first traces 31 are disposed continuously and connected end to end. For example, the first traces 31 included in the first connecting portion 330 surrounding the first protrusion are disposed continuously and connected end to end. For example, the first traces 31 included in the common electrode 320 surrounding the first protrusion are disposed continuously and connected end to end.

A relationship between the first trace included in the common electrode and the edge of the protrusion of the gate line pad in this example may have the same features with that between the first trace included in the common electrode and the edge of the protrusion of the gate line pad in the array substrate shown in FIG. 6, which will not be described here redundantly.

The capacitance formed between the first trace included in the common electrode and the protrusion edge of the protrusion in this example may be calculated using the same method with the capacitance formed between the first trace and the protrusion edge in the examples shown in FIG. 1 and FIG. 5. The capacitance formed between the third trace and the protrusion edge in this example may be calculated using the same method with the capacitance between the third trace and the protrusion edge shown in FIG. 8B, which will not be described here redundantly.

For example, as shown in FIG. 9, the array substrate further includes a common electrode line 600 that is disposed at a same layer with the plurality of gate lines 200. The common electrode 320 is electrically connected to the common electrode line 600.

For example, as shown in FIG. 9, an insulating layer (not shown) is disposed between the common electrode 320 and the common electrode line 600, and the common electrode 320 is electrically connected to the common electrode line 600 through a via hole 11 in the insulating layer.

For example, as shown in FIG. 9, the common electrode 320 within at least one pixel region 10 may be of an integrated structure, and the common electrode 320 within the pixel region 10 may be electrically connected to the common electrode line 600 through at least one via hole 11. Without limitation, the common electrode within at least one pixel region may also be designed as at least two structures separated from each other, with each structure being electrically connected to the common electrode line.

For example, as shown in FIG. 9, the common electrode line 600 extends in the second direction. For example, the gate line 200 and the common electrode line 600 may be disposed alternately in the first direction. For example, the common electrode line 600 overlaps the pixel electrode 400 in the direction perpendicular to the base substrate 100.

For example, as shown in FIG. 9, the first connecting portion 330 overlaps the common electrode line 600 in the direction perpendicular to the base substrate 100.

For example, as shown in FIG. 9, the common electrode 320 further includes a third common sub-electrode 323 extending in first direction. The third common sub-electrode 323 and at least part of the sub-portions extending in the first direction in the first connecting portion 330 are located in a same straight line to divide the pixel region 10 into two subpixel regions. For example, the third common sub-electrode 323 and the first connecting portion 330 are configured to act in combination to divide one pixel region into two subpixel regions. As a matter of course, the embodiments of the present disclosure are not limited thereto, and the third common sub-electrode may also be not located in the extension direction of the same straight line with the first connecting portion.

For example, as shown in FIG. 9, the two subpixel regions included in one pixel region 10 are arranged in the Y-direction. For example, the shapes of the pixel electrodes in different subpixel regions may be the same or different. For example, the shapes of different subpixel regions in the same pixel region 10 may be the same or different. For example, the areas of different subpixel regions in the same pixel region 10 may be the same or different.

For example, as shown in FIG. 9, at least part of the first connecting portion 330 and the third common sub-electrode 323 are located on two sides of the common electrode line 600, respectively. For example, the first connecting portion 330 includes one portion overlapping the common electrode line 600 and the other portion not overlapping the common electrode line 600. The portion, not overlapping the common electrode line 600, of the first connecting portion 330 and the third common sub-electrode 323 are located on the two sides of the common electrode line 600, respectively. As a matter of course, the embodiments of the present disclosure are not limited thereto, and the first connecting portion may also include two portions located on the two sides of the common electrode line. In this case, the third common sub-electrode may be omitted. Alternatively, a portion, located on the same side of the common electrode line with the third common sub-electrode, of the first connecting portion is designed to have a smaller length to guarantee that the first connecting portion is spaced apart from the third common sub-electrode. For example, when the first connecting portion includes two portions located on the two sides of the common electrode line, the two portions may be equal or unequal in width. For example, when the first connecting portion includes two portions located on the two sides of the common electrode line, the portion, located on the same side of the common electrode line with the third common sub-electrode, of the first connecting portion may be as wide as the third common sub-electrode. Without limitation, the two may also be different in width.

Figure 10:
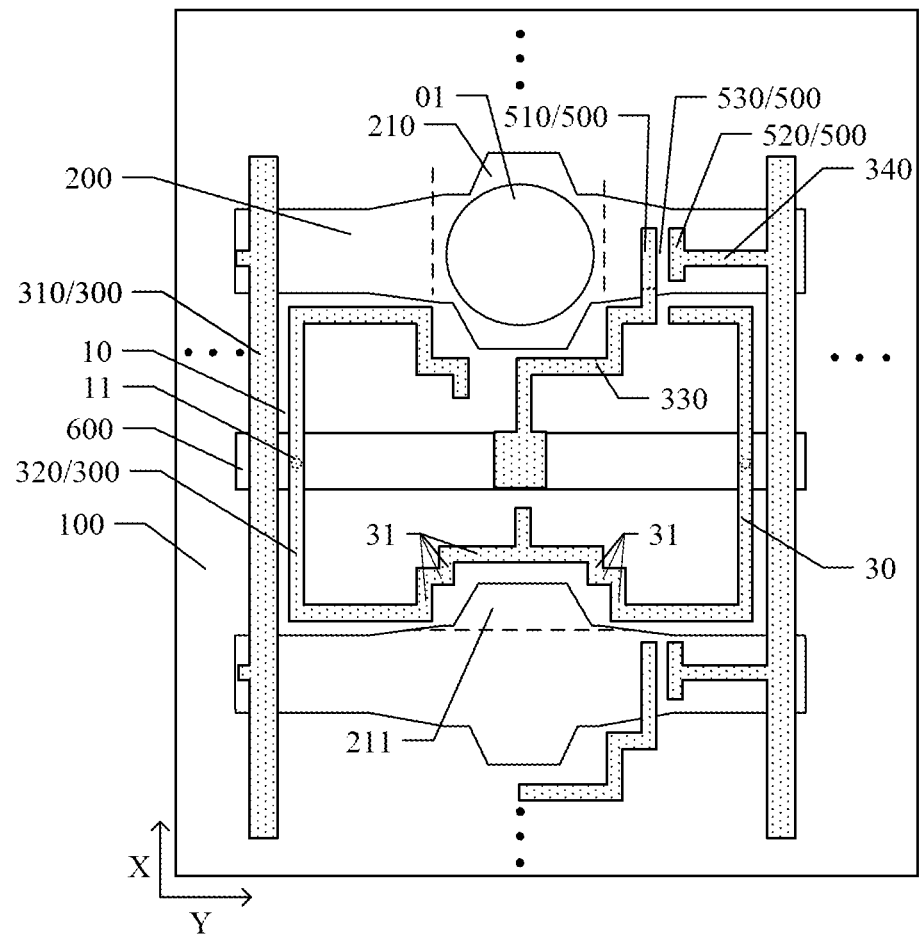
FIG. 10 is a schematic diagram illustrating a partial planar structure of an array substrate provided in another example implemented according to the present disclosure.

FIG. 10 is a schematic diagram illustrating a partial planar structure of an array substrate provided in another example implemented according to the present disclosure. As shown in FIG. 10, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10.

As shown in FIG. 10, the metal layer 300 further includes a common electrode 320 located in the pixel region 10. For example, the common electrode 320 may be a film layer disposed at a same layer and made of a same material with the data line 310.

As shown in FIG. 10, at least one gate line 200 includes a gate line pad 210 that includes a protrusion 211 protruding towards the pixel region 10 relative to the portion of the gate line 200 other than the gate line pad 210.

As shown in FIG. 10, the metal layer 300 located in the pixel region 10 includes a plurality of traces 30 extending along at least part of a contour of the pixel region 10. The plurality of traces 30 include a plurality of first traces 31 surrounding at least part of edges of the protrusion 211. Each first trace 31 extends in the first direction or the second direction, and the plurality of first traces 31 are connected end to end to form a step structure. In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

The array substrate provided in this example differs from the array substrate shown in FIG. 6 in that the gate line pad 210 has a different shape. For example, as shown in FIG. 10, the shape of the gate line pad 210 may be a polygon. For example, the shape of the protrusion 211 may be a polygon. For example, the shape of the protrusion 211 may be an irregular shape.

For example, the first traces 31 surrounding at least part of the edges of the protrusion 211 of the gate line pad 210 in the array substrate provided in this example may be distributed in the same way with the first traces shown in FIG. 6, and may also be distributed in the same way with the first traces shown in FIG. 8B or 9, which will not be limited in the embodiments of the present disclosure.

Such structures as the base substrate, the data line, the common electrode line, the thin film transistor, the first connecting portion, the second connecting portion and the pixel electrode in the array substrate provided in this example may have the same features with such structures as the base substrates, the data lines, the common electrode lines, the thin film transistors, the first connecting portions, the second connecting portions and the pixel electrodes in the array substrates shown in FIG. 1 to FIG. 9, which will not be described here redundantly.

Figure 11:
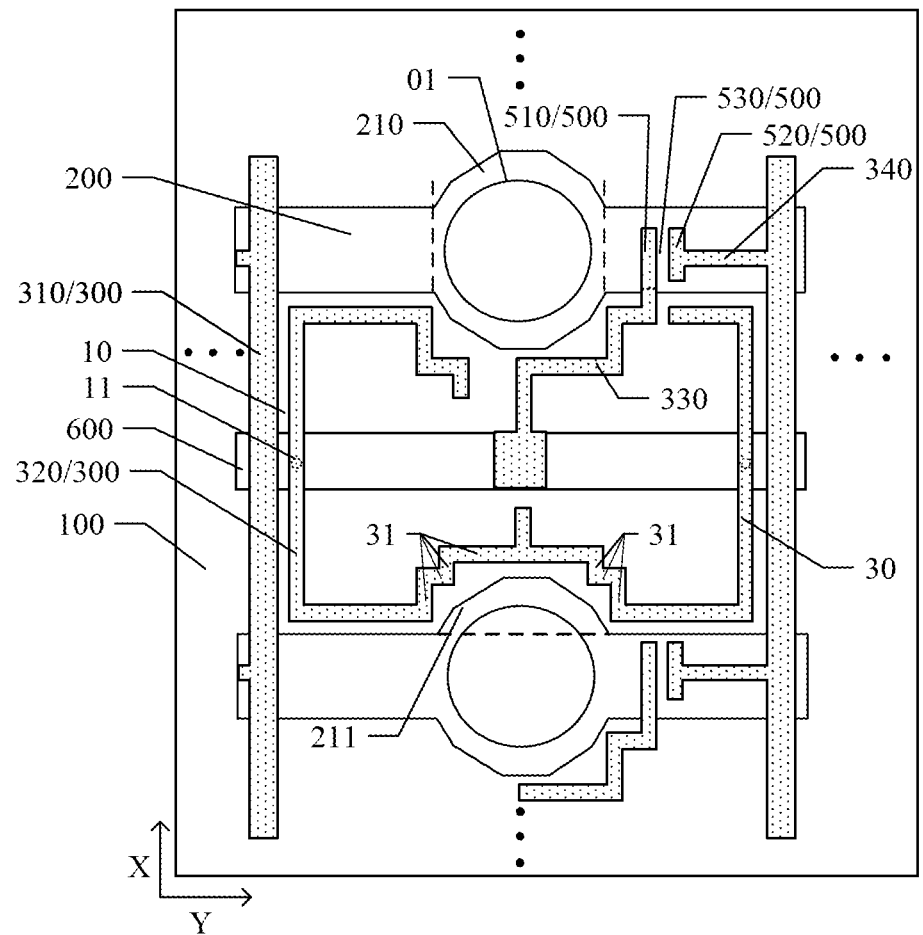
FIG. 11 is a schematic diagram illustrating a partial planar structure of an array substrate provided in another example implemented according to the present disclosure.

FIG. 11 is a schematic diagram illustrating a partial planar structure of an array substrate provided in another example implemented according to the present disclosure. As shown in FIG. 11, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10.

As shown in FIG. 11, the metal layer 300 further includes a common electrode 320 located in the pixel region 10. For example, the common electrode 320 may be a film layer disposed at a same layer and made of a same material with the data line 310.

As shown in FIG. 11, at least one gate line 200 includes a gate line pad 210 that includes a protrusion 211 protruding towards the pixel region 10 relative to the portion of the gate line 200 other than the gate line pad 210.

As shown in FIG. 11, the metal layer 300 located in the pixel region 10 includes a plurality of traces 30 extending along at least part of a contour of the pixel region 10. The plurality of traces 30 include a plurality of first traces 31 surrounding at least part of edges of the protrusion 211. Each first trace 31 extends in the first direction or the second direction, and the plurality of first traces 31 are connected end to end to form a step structure. In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

The array substrate provided in this example differs from the array substrate shown in FIG. 6 in that the gate line pad 210 has a different shape. For example, as shown in FIG. 11, the shape of the gate line pad 210 may be a polygon. For example, the shape of the protrusion 211 may be a polygon. For example, the shape of the protrusion 211 may be an irregular shape.

For example, the first traces 31 surrounding at least part of the edges of the protrusion 211 of the gate line pad 210 in the array substrate provided in this example may be distributed in the same way with the first traces shown in FIG. 6, and may also be distributed in the same way with the first traces shown in FIG. 8B or 9, which will not be limited in the embodiments of the present disclosure.

Such structures as the base substrate, the data line, the common electrode line, the thin film transistor, the first connecting portion, the second connecting portion and the pixel electrode in the array substrate provided in this example may have the same features with such structures as the base substrates, the data lines, the common electrode lines, the thin film transistors, the first connecting portions, the second connecting portions and the pixel electrodes in the array substrates shown in FIG. 1 to FIG. 9, which will not be described here redundantly.

Figure 12:
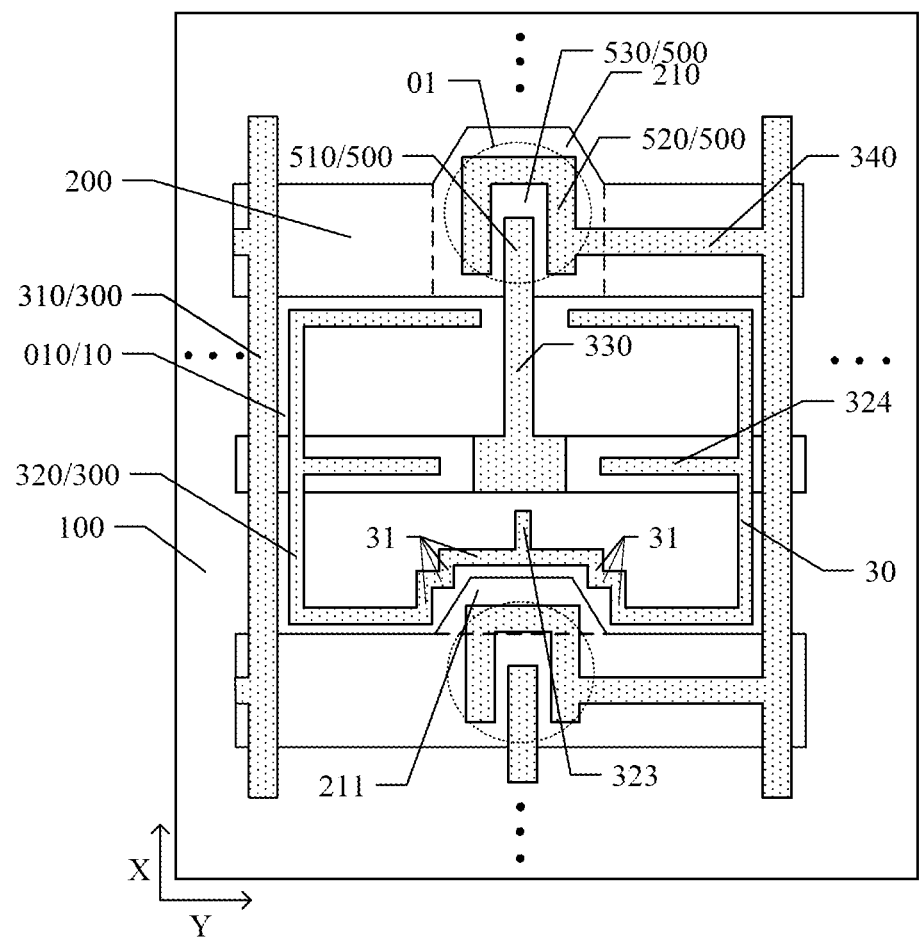
FIG. 12 is a schematic diagram illustrating a partial planar structure of an array substrate provided in another example implemented according to the present disclosure.

FIG. 12 is a schematic diagram illustrating a partial planar structure of an array substrate provided in another example implemented according to the present disclosure. As shown in FIG. 12, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10.

As shown in FIG. 12, the metal layer 300 further includes a common electrode 320 located in the pixel region 10. For example, the common electrode 320 may be a film layer disposed at a same layer and made of a same material with the data line 310.

As shown in FIG. 12, at least one gate line 200 includes a gate line pad 210 that includes a protrusion 211 protruding towards the pixel region 10 relative to the portion of the gate line 200 other than the gate line pad 210.

As shown in FIG. 12, the metal layer 300 located in the pixel region 10 includes a plurality of traces 30 extending along at least part of a contour of the pixel region 10. The plurality of traces 30 include a plurality of first traces 31 surrounding at least part of edges of the protrusion 211. Each first trace 31 extends in the first direction or the second direction, and the plurality of first traces 31 are connected end to end to form a step structure. In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

Such structures as the base substrate, the data line, the gate line, the thin film transistor, the first connecting portion, the second connecting portion and the pixel electrode in the array substrate provided in this example may have the same features with such structures as the base substrates, the data lines, the gate lines, the thin film transistors, the first connecting portions, the second connecting portions and the pixel electrodes in the array substrates shown in FIG. 1 to FIG. 11, which will not be described here redundantly.

The array substrate provided in this example differs from the array substrate shown in FIG. 1 in that the common electrode 320 further includes a third common sub-electrode 323 extending in first direction and two fourth common sub-electrodes 324 extending in the second direction. The two fourth common sub-electrodes 324 are located on two sides of the first connecting portion 330 in the second direction. The third common sub-electrode 323 and at least part of sub-portions of the first connecting portion 330 are located in a same straight line. For example, the common electrode 320 including the third common sub-electrode 323 and the fourth common sub-electrodes 324 may divide one pixel region 10 into four subpixel regions. For example, the four subpixel regions may be arranged in a 2*2 array.

The third common sub-electrode 323 in this example may have the same features with the third common sub-electrode 323 shown in FIG. 1, which will not be described here redundantly.

For example, as shown in FIG. 12, the orthographic projection of the fourth common sub-electrode 324 on the base substrate 100 overlaps the orthographic projection of the common electrode line 600 on the base substrate 100.

For example, the distribution of the first traces 31 surrounding at least part of the edges of the protrusion 211 of the gate line pad 210 in the array substrate provided in this example may not be limited to the distribution shown in FIG. 1. For example, the first traces 31 in the array substrate provided in this example may be distributed in the same way with the first traces shown in FIG. 6, and may also be distributed in the same way with the first traces shown in FIG. 8B or 9, which will not be limited in the embodiments of the present disclosure.

Figure 13:
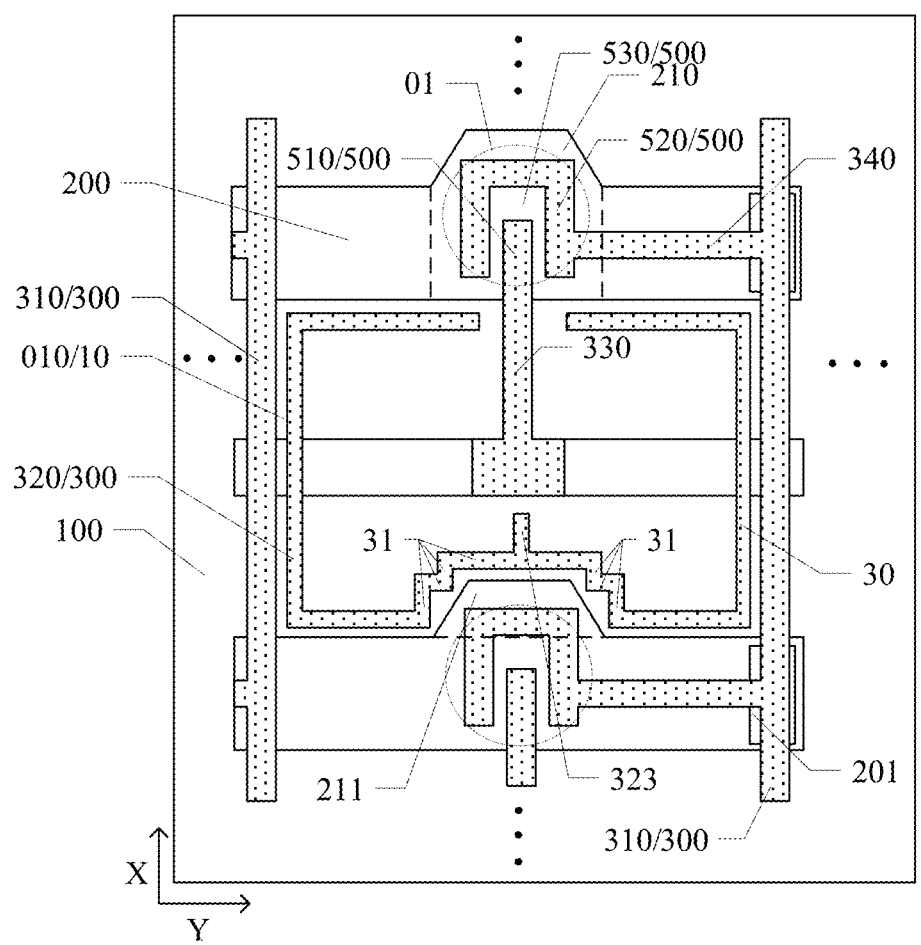
FIG. 13 is a schematic diagram illustrating a partial planar structure of an array substrate provided in another example implemented according to the present disclosure.

FIG. 13 is a schematic diagram illustrating a partial planar structure of an array substrate provided in another example implemented according to the present disclosure. As shown in FIG. 13, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10.

As shown in FIG. 13, the metal layer 300 further includes a common electrode 320 located in the pixel region 10. For example, the common electrode 320 may be a film layer disposed at a same layer and made of a same material with the data line 310.

As shown in FIG. 13, at least one gate line 200 includes a gate line pad 210 that includes a protrusion 211 protruding into the pixel region 10 relative to other position than the gate line pad 210 on the gate line 200.

As shown in FIG. 13, the metal layer 300 located in the pixel region 10 includes a plurality of traces 30 extending along at least part of a contour of the pixel region 10. The plurality of traces 30 include a plurality of first traces 31 surrounding at least part of edges of the protrusion 211. Each first trace 31 extends in the first direction or the second direction, and the plurality of first traces 31 are connected end to end to form a step structure. In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

Such structures as the base substrate, the data line, the common electrode, the thin film transistor, the first connecting portion, the second connecting portion and the pixel electrode in the array substrate provided in this example may have the same features with such structures as the base substrates, the data lines, the common electrodes, the thin film transistors, the first connecting portions, the second connecting portions and the pixel electrodes in the array substrates shown in FIG. 1 to FIG. 11, which will not be described here redundantly.

The array substrate provided in this example differs from the array substrate shown in FIG. 1 in that the gate line 200 includes a hallowed-out pattern 201, the data line 310 overlapping the hallowed-out pattern 201. For example, the hallowed-out pattern 201 includes an opening. For example, the hallowed-out pattern 201 may include a plurality of openings. In the array substrate provided in this example, the overlapping area of the data line and the gate line may be reduced by providing the hallowed-out pattern in the gate line and allowing the hallowed-out pattern of the gate line to overlap the data line, thereby reducing the capacitance resulting from the overlapping of the two.

For example, the distribution of the first traces 31 surrounding at least part of the edges of the protrusion 211 of the gate line pad 210 in the array substrate provided in this example may not be limited to the distribution shown in FIG. 1. For example, the first traces 31 in the array substrate provided in this example may be distributed in the same way with the first traces shown in FIG. 6, and may also be distributed in the same way with the first traces shown in FIG. 8B or 9, which will not be limited in the embodiments of the present disclosure.

Figure 14:
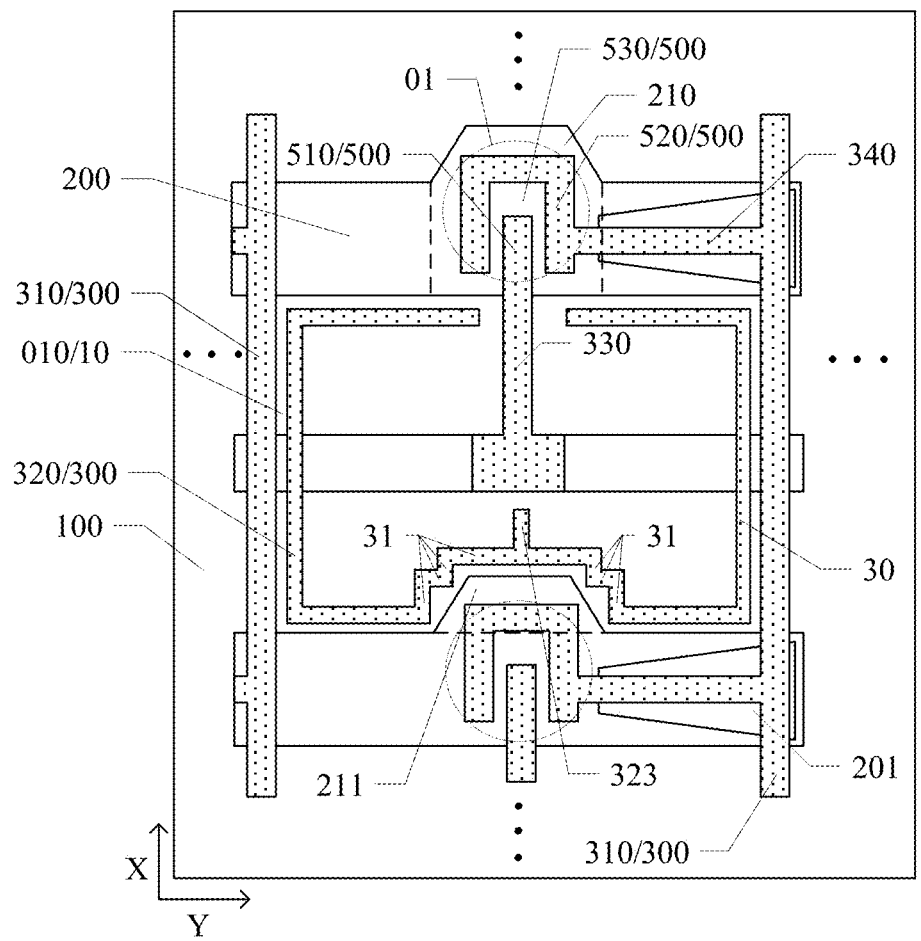
FIG. 14 is a schematic diagram illustrating a partial planar structure of an array substrate provided in another example implemented according to the present disclosure.

FIG. 14 is a schematic diagram illustrating a partial planar structure of an array substrate provided in another example implemented according to the present disclosure. As shown in FIG. 14, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10.

As shown in FIG. 14, the metal layer 300 further includes a common electrode 320 located in the pixel region 10. For example, the common electrode 320 may be a film layer disposed at a same layer and made of a same material with the data line 310.

As shown in FIG. 14, at least one gate line 200 includes a gate line pad 210 that includes a protrusion 211 protruding towards the pixel region 10 relative to the portion of the gate line 200 other than the gate line pad 210.

As shown in FIG. 14, the metal layer 300 located in the pixel region 10 includes a plurality of traces 30 extending along at least part of a contour of the pixel region 10. The plurality of traces 30 include a plurality of first traces 31 surrounding at least part of edges of the protrusion 211. Each first trace 31 extends in the first direction or the second direction, and the plurality of first traces 31 are connected end to end to form a step structure. In the embodiment of the present disclosure, the first traces surrounding the protrusion of the gate line pad are designed as the step structure, which is conducive to reducing the influence of the metal layer on an aperture ratio in a pixel region while improving the consistency of capacitances generated by the metal layer and pixel electrodes in different pixel regions.

Such structures as the base substrate, the data line, the common electrode, the thin film transistor, the first connecting portion, the second connecting portion and the pixel electrode in the array substrate provided in this example may have the same features with such structures as the base substrates, the data lines, the common electrodes, the thin film transistors, the first connecting portions, the second connecting portions and the pixel electrodes in the array substrates shown in FIG. 1 to FIG. 11, which will not be described here redundantly.

The array substrate provided in this example differs from the array substrate shown in FIG. 13 in that both of the second connecting portion 340 and the data line 310 overlap the hallowed-out pattern 201. For example, the hallowed-out pattern 201 includes an opening. For example, the hallowed-out pattern 201 may include a plurality of openings. In the array substrate provided in this example, the overlapping areas of the data line and the second connecting portion with the gate line may be reduced by providing the hallowed-out pattern in the gate line and allowing the hallowed-out pattern of the gate line to overlap both of the data line and the second connecting portion, thereby reducing the capacitance resulting from the overlapping of the metal layer and the gate line.

For example, as shown in FIG. 14, a first end of the second connecting portion 340 is electrically connected to the second electrode 520 of thin film transistor 500, while a second end of the second connecting portion 340 is electrically connected to the data line 310; and a width of the hallowed-out pattern 201 increases gradually in a direction from the first end pointing to the second end. In this example, the hallowed-out pattern is so shaped that the width thereof increases gradually in the direction from the first end pointing to the second end, which is conducive to preventing the hallowed-out pattern from affecting the performance of the thin film transistor while reducing the overlapping areas of the data line and the second connecting portion with the gate line, e.g., reducing an abrupt change in the parasitic capacitance of the source electrode of the thin film transistor (TFT) and keeping the performance of the TFT stable.

For example, as shown in FIG. 14, the shape of the hallowed-out pattern 201 may include a trapezoid. For example, the upper base of the trapezoid is close to the thin film transistor 500, while the lower base of the trapezoid is close to the data line 310.

For example, the distribution of the first traces 31 surrounding at least part of the edges of the protrusion 211 of the gate line pad 210 in the array substrate provided in this example may not be limited to the distribution shown in FIG. 1. For example, the first traces 31 in the array substrate provided in this example may be distributed in the same way with the first traces shown in FIG. 6, and may also be distributed in the same way with the first traces shown in FIG. 8B or 9, which will not be limited in the embodiments of the present disclosure.

Figure 15:
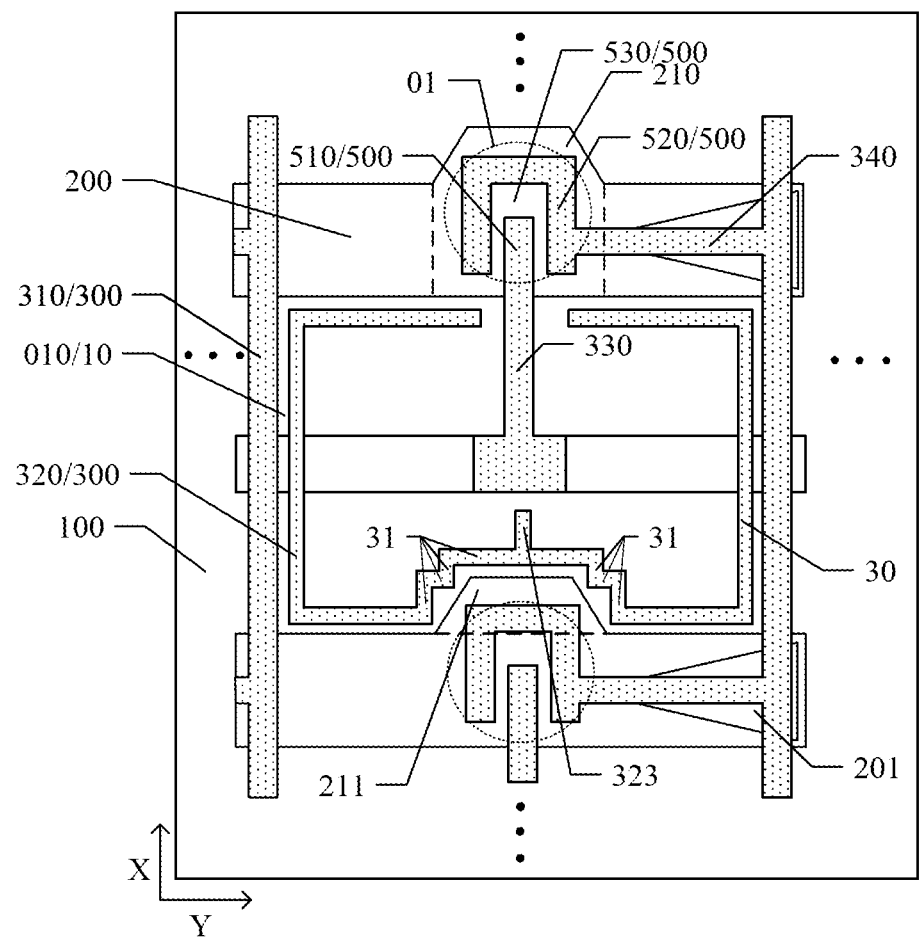
FIG. 15 is a schematic diagram illustrating a partial planar structure of an array substrate provided in another example implemented according to the present disclosure.

FIG. 15 is a schematic diagram illustrating a partial planar structure of an array substrate provided in another example implemented according to the present disclosure. The array substrate shown in FIG. 15 differs from the array substrate shown in FIG. 14 only in that the hallowed-out pattern 201 formed in the gate line 200 has a different shape. For example, as shown in FIG. 15, the shape of the hallowed-out pattern 201 is a triangle.

Figure 16:
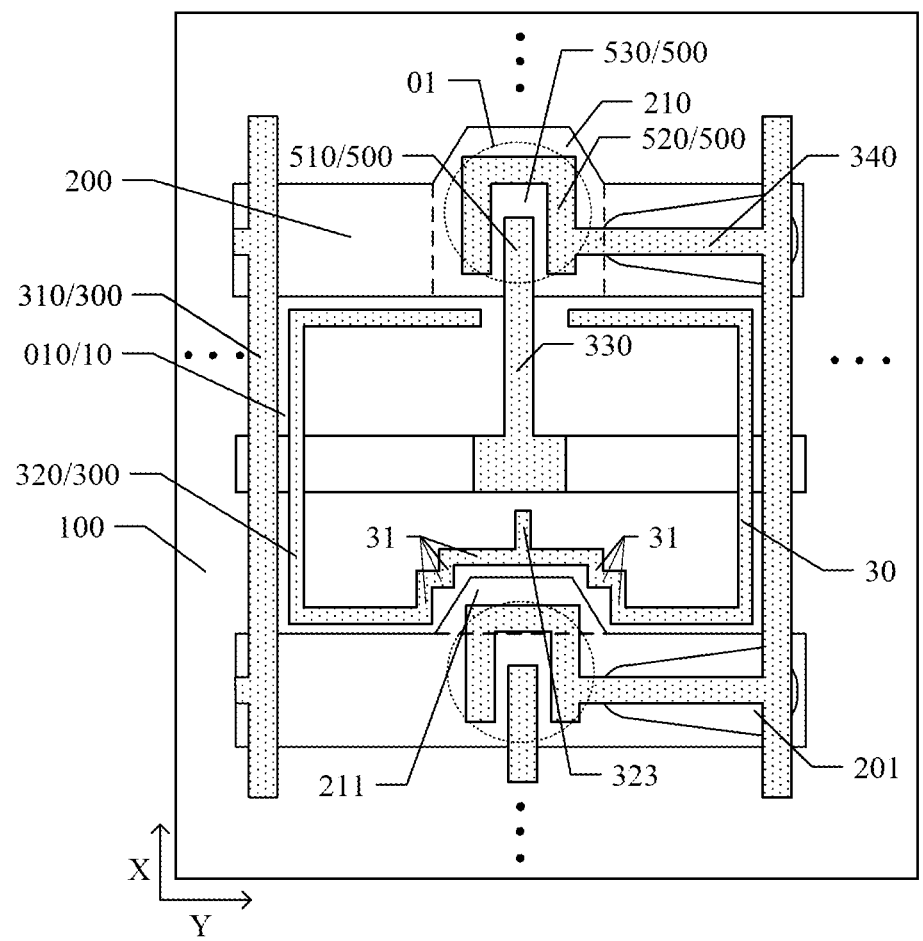
FIG. 16 is a schematic diagram illustrating a partial planar structure of an array substrate provided in another example implemented according to the present disclosure.

FIG. 16 is a schematic diagram illustrating a partial planar structure of an array substrate provided in another example implemented according to the present disclosure. The array substrate shown in FIG. 16 differs from the array substrate shown in FIG. 14 only in that the hallowed-out pattern 201 formed in the gate line 200 has a different shape. For example, as shown in FIG. 16, the shape of the hallowed-out pattern 201 is a water-drop shape.

Figure 17:
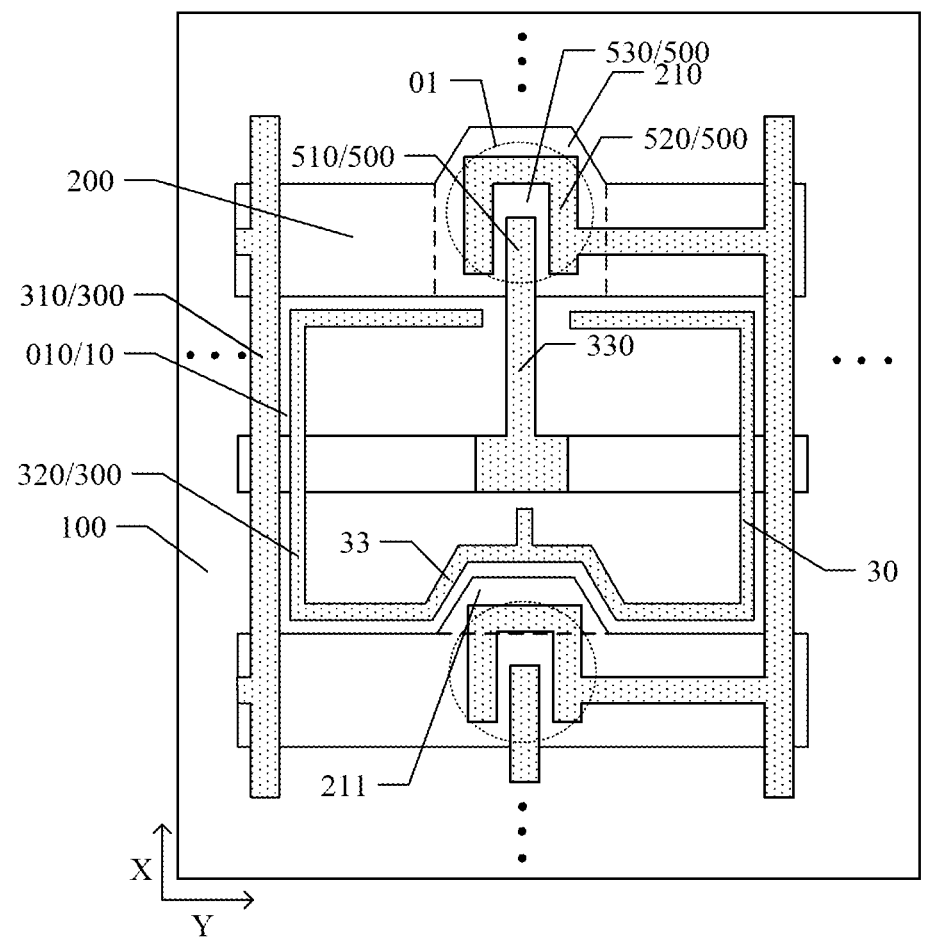
FIG. 17 is a schematic diagram illustrating a partial planar structure of an array substrate provided in another embodiment of the present disclosure.

FIG. 17 is a schematic diagram illustrating a partial planar structure of an array substrate provided in another embodiment of the present disclosure. As shown in FIG. 17, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10. FIG. 17 schematically illustrates a pixel region 10.

For example, as shown in FIG. 17, the plurality of data lines 310 extend in an X-direction and arranged in a Y-direction. The plurality of gate lines 200 extend in the Y-direction and are arranged in the X-direction. For example, FIG. 17 schematically illustrates that the first direction is the X-direction, while the second direction is the Y-direction, the first direction being perpendicular to the second direction. Without limitation, the first direction may also not be perpendicular to the second direction. For example, an included angle between the two directions may be 30-60 degrees. For example, the first direction and the second direction may be interchangeable.

For example, as shown in FIG. 17, two adjacent data lines 310 and two adjacent gate lines 200 are disposed crosswise to define a pixel region 10. For example, a pixel region 10 is a subpixel. For example, the array substrate includes a plurality of subpixels (a plurality of pixel regions 10) that include subpixels configured to display light of different colors. For example, the plurality of subpixels include a red subpixel configured to display red light, a green subpixel configured to display green light, and a blue subpixel configured to display blue light. For example, two adjacent subpixels arranged in at least one of the first direction and the second direction are subpixels configured to display light of different colors, respectively.

For example, a shape of the pixel region 10 is a polygon. For example, the shape of the pixel region 10 is a quadrangle. For example, the shape of the pixel region 10 is a rectangle. The embodiments of the present disclosure have no limitation on this. The shape of the pixel region 10 is related to shapes of an edge of the data line 310 and an edge of the gate line 200.

For example, each pixel region 10 includes a display region for display. An area of the display region may be smaller than that of the pixel region 10. For example, a shape of the display region may be the same as that of the pixel region 10. Alternatively, the shape of the display region may be different from that of the pixel region 10.

As shown in FIG. 17, the metal layer 300 further includes a common electrode 320 located in the pixel region 10. For example, the common electrode 320 may be a film layer disposed at a same layer and made of a same material with the data line 310.

As shown in FIG. 17, at least one gate line 200 includes a gate line pad 210 that includes a protrusion 211 protruding towards the pixel region 10 relative to the portion of the gate line 200 other than the gate line pad 210.

For example, as shown in FIG. 17, the gate line pad 210 is part of structure of the gate line 200. For example, in the X-direction, a width of the gate line pad 210 is greater than a width of the portion of the gate line 200 other than the gate line pad 210. For example, in a width direction, a portion, protruding relative to the portion of the gate line 200 other than the gate line pad 210, of the gate line pad 210 is a protrusion 211.

For example, as shown in FIG. 17, the gate line pad 210 may include a protrusion 211 protruding relative to a side of the gate line 200. For example, a plurality of gate line pads 210 may be disposed on one gate line 200, and the plurality of gate line pads 210 each include a protrusion 211 protruding relative to the same side of the gate line 200.

For example, the pixel region 10 includes no protrusion 211.

For example, as shown in FIG. 17, the gate line pad 210 is configured to be opposed to a support portion 01. For example, the gate line pad 210 overlaps the support portion 01 in a direction perpendicular to the base substrate 100. For example, an orthographic projection of the gate line pad 210 on the base substrate 100 may overlap an orthographic projection of the support portion 01 on the base substrate 100. For example, the orthographic projection of the support portion 01 on the base substrate 100 may completely fall into the orthographic projection of the gate line pad 210 on the base substrate 100. For example, FIG. 17 schematically illustrates that a planar shape, parallel to the plane XY, of the support portion 01 is a circle, which, without limitation, may also be a regular shape such as a polygon, or an irregular shape.

The "direction perpendicular to the base substrate 100" described above is a direction of a main board surface perpendicular to the base substrate 100 and configured to allow structures such as the gate lines to be disposed thereon, e.g., a direction perpendicular to the plane XY.

For example, the array substrate may be an array substrate in a liquid crystal display panel, and the liquid crystal display panel may also include an opposed substrate (not shown), a liquid crystal layer located between the array substrate and the opposed substrate, and a sealant for encapsulating the liquid crystal layer. For example, the opposed substrate may be a color film substrate. For example, the support portion 01 (also referred to as a spacer) is located in the liquid crystal layer between the array substrate and the opposed substrate to maintain the gap cell uniformity of the display panel. For example, the support portion 01 may be a photosensitive spacer support, i.e., a spacer having high position accuracy formed by photo lithography of a photosensitive composition. The support portion 01 includes a resin, a polymeric compound, a photopolymerization initiator, etc., which will not be limited in the embodiments of the present disclosure.

For example, the liquid crystal display panel further includes a first polarizing layer disposed on a side, away from the opposed substrate, of the array substrate, and a second polarizing layer disposed on a side, away from the array substrate, of the opposed substrate. For example, a backlight source may be disposed on a non-display side of the display panel. The backlight source is configured to provide backlight to the display panel.

For example, the array substrate includes a support portion 01 that overlaps the gate line 210 in the direction perpendicular to the base substrate 100. Without limitation, the support portion may be disposed on the opposed substrate. The position of the support portion may be set according to product requirements.

For example, a position of the gate line pad 210 may be set according to the position of the support portion 01. For example, the number of support portions 01 is K, and the number of gate line pads 210 is also K. The support portions 01 are disposed correspondingly to the gate line pads 210 one to one.

As shown in FIG. 17, the metal layer 300 located in the pixel region 10 includes a plurality of traces 30 extending along at least part of a contour of the pixel region 10. For example, at least part of the above-mentioned plurality of traces 30 are electrically connected traces. For example, the electrically connected traces in the above-mentioned plurality of traces 30 are integrated traces. The "integrated traces" described above may be traces formed by performing a same patterning process on a same metal material layer. The "plurality of traces 30 extending along the contour of the pixel region 10" described above may refer to the plurality of traces extending along an edge of the data line 310 and an edge of the gate line 200. The plurality of traces extending along the contour of the pixel region described above may be parallel to the extension direction of the edge of the data line or the gate line. Without limitation, part of the plurality of traces may also be not parallel to a certain portion of the edge of the gate line or the data line. Whether a trace is parallel to an edge of a signal line (including the gate line and the data line) adjacent (in a planar view) thereto may be set according to product requirements.

For example, as shown in FIG. 17, an edge of the protrusion 211 of the gate line pad 210 includes a broken line.

As shown in FIG. 17, the plurality of traces 30 include a plurality of trace sub-portions 33 surrounding at least part of edges of the protrusion 211, each trace sub-portion 33 being parallel to the adjacent edge of the protrusion 211. For example, the orthographic projection of each trace sub-portion 33 on the base substrate 100 is parallel to the orthographic projection of the adjacent edge of the protrusion 211 on the base substrate 100. For example, at least one trace sub-portion 33 is not parallel to both of the first direction and the second direction.

In the embodiments of the present disclosure, the trace sub-portions surrounding the protrusion of the gate line pad are designed to be parallel to the extension direction of the edges of the protrusion, which is conducive to the maximization of the aperture ratio of the pixel region.

For example, two trace sub-portions 33, connected end to end, in the plurality of trace sub-portions 33 are electrically connected. For example, the plurality of trace sub-portions 33 may be of an integrated structure. For example, a distance between the orthographic projection of the plurality of trace sub-portions 33 on the base substrate 100 and the surrounded orthographic projection of the edges of the protrusion 211 on the base substrate is smaller than a distance between an orthographic projection of other trace on the base substrate 100 and the edge of the protrusion 211. For example, distances between different trace sub-portions 33 and the surrounded edges of the protrusion 211 are all the same.

For example, as shown in FIG. 17, the extension direction of each of the plurality of traces 30 is parallel to the extension direction of the adjacent data line 310 or gate line 200.

For example, as shown in FIG. 17, two traces 30 located at the two outermost ends of the plurality of trace sub-portions 33 may be both electrically connected to the trace sub-portions 33. For example, both the two traces 30 located at the two outermost ends of the plurality of trace sub-portions 33 may be an integrated structure with the trace sub-portions 33. Without limitation, one of the two traces located at the two outermost ends of the plurality of first traces may also be spaced apart from the trace sub-portions.

For example, as shown in FIG. 17, other traces 30 than the trace sub-portions 33 in the plurality of traces 30 may extend in the first direction or extend in the second direction.

The shape of the protrusion and the distribution of the protrusions in the example shown in FIG. 17 may be the same as those in any example shown in FIG. 1 to FIG. 16, which will not be described here redundantly.

Such structures as the base substrate 100, the data line 310, the thin film transistor 500, the second connecting portion 340 and the pixel electrode in the array substrate in the example shown in FIG. 17 may have the same features with such structures as the base substrate 100, the data line 310, the thin film transistor 500, the second connecting portion 340 and the pixel electrode 400 in the array substrate in any example shown in FIG. 1 to FIG. 16, which will not be described here redundantly.

For example, the distribution of the plurality of traces 30 shown in FIG. 17 may be similar to that of the plurality of traces 30 shown in FIG. 1, which are all the common electrodes, without limitation. For example, the plurality of traces 30 shown in FIG. 17 may also be distributed the same as the plurality of traces 30 shown in FIG. 9, and one part of the plurality of traces 30 are the common electrode 320, while the other part are the first connecting portion 330. For example, the plurality of traces 30 shown in FIG. 17 may also be distributed the same as the plurality of traces 30 shown in FIG. 8A, and the plurality of traces 30 are all the first connecting portion 330.

For example, as shown in FIG. 17, when the trace sub-portion 33 in the plurality of traces 30 is a portion of the first connecting portion 330, the distribution of the first connecting portion 330 may be the same as that of the first connecting portion 330 shown in FIG. 8B, which will not be described here redundantly.

For example, the capacitance between the trace sub-portion 33 and the edge of the protrusion 211 shown in FIG. 17 may be calculated using the same method with the capacitance $C=\varepsilon d \times W \times L/d$ between the third trace parallel to the edge of the protrusion 211 and the edge of the protrusion 211 shown in FIG. 8B, which will not be described here redundantly.

Figure 18:
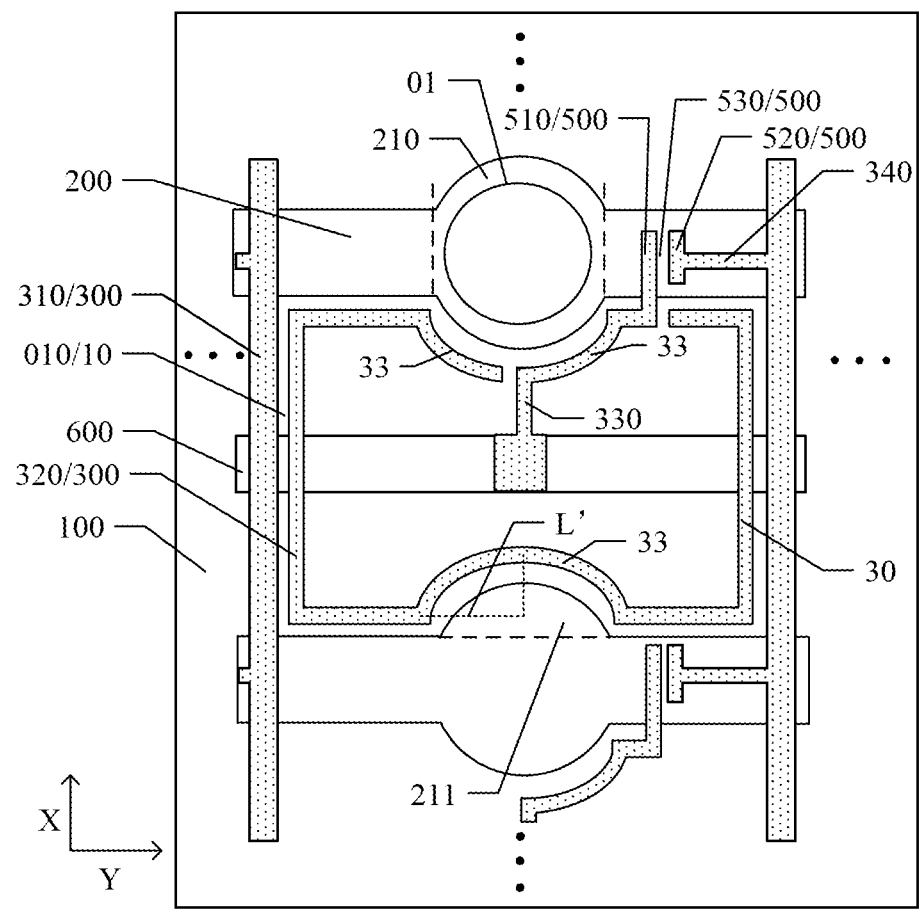
FIG. 18 is a schematic diagram illustrating a partial planar structure of an array substrate provided in another embodiment of the present disclosure.

FIG. 18 is a schematic diagram illustrating a partial planar structure of an array substrate provided in another embodiment of the present disclosure. As shown in FIG. 18, the array substrate includes a base substrate 100, and a plurality of gate lines 200 and a metal layer 300 that are located on the base substrate 100. The metal layer 300 is located on a side, away from the base substrate 100, of the plurality of gate lines 200. The metal layer 300 includes a plurality of data lines 310 that extend in a first direction and are arranged in a second direction. The plurality of gate lines 200 extend in the second direction and are arranged in the first direction. The first direction and the second direction intersect. The plurality of data lines 310 and the plurality of gate lines 200 intersect to define a plurality of pixel regions 10. FIG. 18 schematically illustrates a pixel region 10.

For example, as shown in FIG. 18, the plurality of data lines 310 extend in an X-direction and arranged in a Y-direction. The plurality of gate lines 200 extend in the Y-direction and are arranged in the X-direction. For example, FIG. 18 schematically illustrates that the first direction is the X-direction, while the second direction is the Y-direction, the first direction being perpendicular to the second direction. Without limitation, the first direction may also not be perpendicular to the second direction. For example, an included angle between the two directions may be 30-60 degrees. For example, the first direction and the second direction may be interchangeable.

For example, as shown in FIG. 18, two adjacent data lines 310 and two adjacent gate lines 200 are disposed crosswise to define a pixel region 10. For example, a pixel region 10 is a subpixel. For example, the array substrate includes a plurality of subpixels (a plurality of pixel regions 10) that include subpixels configured to display light of different colors. For example, the plurality of subpixels include a red subpixel configured to display red light, a green subpixel configured to display green light, and a blue subpixel configured to display blue light. For example, two adjacent subpixels arranged in at least one of the first direction and the second direction are subpixels configured to display light of different colors, respectively.

For example, a shape of the pixel region 10 is a polygon. For example, the shape of the pixel region 10 is a quadrangle. For example, the shape of the pixel region 10 is a rectangle. The embodiments of the present disclosure have no limitation on this. The shape of the pixel region 10 is related to shapes of an edge of the data line 310 and an edge of the gate line 200.

For example, each pixel region 10 includes a display region for display. An area of the display region may be smaller than that of the pixel region 10. For example, a shape of the display region may be the same as that of the pixel region 10. Alternatively, the shape of the display region may be different from that of the pixel region 10.

As shown in FIG. 18, the metal layer 300 further includes a common electrode 320 located in the pixel region 10. For example, the common electrode 320 may be a film layer disposed at a same layer and made of a same material with the data line 310.

As shown in FIG. 18, at least one gate line 200 includes a gate line pad 210 that includes a protrusion 211 protruding towards the pixel region 10 relative to the portion of the gate line 200 other than the gate line pad 210.

For example, as shown in FIG. 18, the gate line pad 210 is part of structure of the gate line 200. For example, in the X-direction, a width of the gate line pad 210 is greater than a width of the portion of the gate line 200 other than the gate line pad 210. For example, in a width direction, a portion, protruding relative to the portion of the gate line 200 other than the gate line pad 210, of the gate line 200 is a protrusion 211.

For example, as shown in FIG. 18, the gate line pad 210 may include a protrusion 211 protruding relative to a side of the gate line 200. For example, a plurality of gate line pads 210 may be disposed on one gate line 200, and the plurality of gate line pads 210 each include a protrusion 211 protruding relative to the same side of the gate line 200.

For example, the pixel region 10 includes no protrusion 211.

For example, as shown in FIG. 18, the gate line pad 210 is configured to be opposed to a support portion 01. For example, the gate line pad 210 overlaps the support portion 01 in a direction perpendicular to the base substrate 100. For example, an orthographic projection of the gate line pad 210 on the base substrate 100 may overlap an orthographic projection of the support portion 01 on the base substrate 100. For example, the orthographic projection of the support portion 01 on the base substrate 100 may completely fall into the orthographic projection of the gate line pad 210 on the base substrate 100. For example, FIG. 17 schematically illustrates that a planar shape, parallel to the plane XY, of the support portion 01 is a circle, which, without limitation, may also be a regular shape such as a polygon, or an irregular shape.

For example, the array substrate may be an array substrate in a liquid crystal display panel, and the liquid crystal display panel may also include an opposed substrate (not shown), a liquid crystal layer located between the array substrate and the opposed substrate, and a sealant for encapsulating the liquid crystal layer. For example, the opposed substrate may be a color film substrate. For example, the support portion 01 (also referred to as a spacer) is located in the liquid crystal layer between the array substrate and the opposed substrate to maintain the gap cell uniformity of the display panel. For example, the support portion 01 may be a photosensitive spacer support, i.e., a spacer having high position accuracy formed by photo lithography of a photosensitive composition. The support portion 01 includes a resin, a polymeric compound, a photopolymerization initiator, etc., which will not be limited in the embodiments of the present disclosure.

For example, the liquid crystal display panel further includes a first polarizing layer disposed on a side, away from the opposed substrate, of the array substrate, and a second polarizing layer disposed on a side, away from the array substrate, of the opposed substrate. For example, a backlight source may be disposed on a non-display side of the display panel. The backlight source is configured to provide backlight to the display panel.

For example, the array substrate includes a support portion 01 that overlaps the gate line 210 in the direction perpendicular to the base substrate 100. Without limitation, the support portion may be disposed on the opposed substrate. The position of the support portion may be set according to product requirements.

For example, a position of the gate line pad 210 may be set according to the position of the support portion 01. For example, the number of support portions 01 is K, and the number of gate line pads 210 is also K. The support portions 01 are disposed correspondingly to the gate line pads 210 one to one.

As shown in FIG. 18, the metal layer 300 located in the pixel region 10 includes a plurality of traces 30 extending along at least part of a contour of the pixel region 10. For example, at least part of the above-mentioned plurality of traces 30 are electrically connected traces. For example, the electrically connected traces in the above-mentioned plurality of traces 30 are integrated traces. The "integrated traces" described above may be traces formed by performing a same patterning process on a same metal material layer. The "plurality of traces 30 extending along the contour of the pixel region 10" described above may refer to the plurality of traces extending along an edge of the data line 310 and an edge of the gate line 200. The plurality of traces extending along the contour of the pixel region described above may be parallel to the extension direction of the edge of the data line or the gate line. Without limitation, part of the plurality of traces may be not parallel to a certain portion of the edge of the gate line or the data line, either. Whether a trace is parallel to an edge of a signal line (including the gate line and the data line) adjacent (in a planar view) thereto may be set according to product requirements.

For example, as shown in FIG. 18, an edge of the protrusion 211 of the gate line pad 210 includes a curve. For example, the edge of the protrusion 211 of the gate line pad 210 may be circular-arc-shaped. For example, the shape of the protrusion 211 may be a semi-circle.

As shown in FIG. 18, the plurality of traces 30 include a plurality of trace sub-portions 33 surrounding at least part of edges of the protrusion 211, each trace sub-portion 33 being parallel to the adjacent edge of the protrusion 211. For example, the orthographic projection of each trace sub-portion 33 on the base substrate 100 is parallel to the orthographic projection of the adjacent edge of the protrusion 211 on the base substrate 100. For example, at least one trace sub-portion 33 is not parallel to both of the first direction and the second direction. For example, the trace sub-portion 33 surrounding the edge of one protrusion 211 may be circular-arc-shaped, and the trace sub-portion 33 surrounding the edge of one protrusion 211 may be an entire trace 30. For example, when the edge contour of the trace sub-portion 33 is a polygon with edges of infinite number, it is similar to a circular arc. The radius r of the circular arc is designed to be r=2l0/π, l0 being an equivalent length of trace L' when the gate line corresponding to the position of the trace sub-portion 33 is provided with no gate line pad.

In the embodiments of the present disclosure, the trace sub-portions surrounding the protrusion of the gate line pad are designed to be parallel to the extension direction of the edges of the protrusion, which is conducive to the maximization of the aperture ratio of the pixel region.

For example, the capacitance between the trace sub-portion 33 and the edge of the protrusion 211 shown in FIG. 18 may be calculated using the same method with the capacitance C=ε d×W×L/d between the third trace parallel to the edge of the protrusion 211 and the edge of the protrusion 211 shown in FIG. 8B, which will not be described here redundantly.

The array substrate shown in FIG. 18 differs from the array substrate shown in FIG. 17 in that the shape of the gate line pad is different from the shape of the trace sub-portion surrounding the protrusion of the gate line pad.

Such structures as the base substrate 100, the data line 310, the thin film transistor 500, the second connecting portion 340 and the pixel electrode in the array substrate in the example shown in FIG. 18 may have the same features with such structures as the base substrate 100, the data line 310, the thin film transistor 500, the second connecting portion 340 and the pixel electrode 400 in the array substrate in any example shown in FIG. 1 to FIG. 17, which will not be described here redundantly.

For example, as shown in FIG. 18, when the gate line pad 210 is provided with protrusions 211 on two sides of the gate line 200 in the Y-direction, the trace sub-portion 33 surrounding the protrusion 211 may be one of the common electrode 320 and the first connecting portion 330.

For example, as shown in FIG. 18, two gate lines 200 located on two sides of at least one first pixel region 010 each include the gate line pad 210 protruding into the first pixel region 010. The common electrode 320 includes a trace sub-portion 33 surrounding the protrusion 211 of the gate line pad 210 on one of the two gate lines 200, while the first connecting portion 330 surrounds at least part of the edges of the protrusion 211 of the gate line pad 210 on the other one of the two gate lines 200. The first connecting portion 330 surrounding at least part of the edges of the protrusion 211 includes trace sub-portions 33, and each trace sub-portion 33 is parallel to the adjacent edge of the protrusion 211. For example, the orthographic projection of each trace sub-portion 33 on the base substrate 100 is parallel to the orthographic projection of the adjacent edge of the protrusion 211 on the base substrate 100. For example, at least one trace sub-portion 33 is not parallel to both of the first direction and the second direction.

For example, as shown in FIG. 18, the gate line pad 210 includes two protrusions 211 protruding towards two sides of the gate line 200 in the X-direction, namely a first protrusion and a second protrusion. The first traces 31 surrounding the first protrusion may all be the common electrode 320, and part of the trace sub-portions 33 surrounding the second protrusion are the common electrode 320, while the other part of the trace sub-portions 33 are the first connecting portion 330.

The example shown in FIG. 18 schematically illustrates that the gate electrode of the thin film transistor does not overlap the support portion. However, without limitation, the gate electrode of the thin film transistor may also be designed to overlap the support portion.

Except that the shape of the gate line pad and the shape of the trace surrounding the edge of the gate line pad in the array substrate provided in the example shown in FIG. 18 are different from those in the above embodiments, other structures in the array substrate shown in FIG. 18 may have the same features with any embodiment described above, which will not be described here redundantly.

For example, another embodiment of the present disclosure provides a display device including the array substrate provided in any embodiment described above. In the display device provided in the embodiment of the present disclosure, the first traces surrounding the protrusion of the gate line pad on the array substrate are designed as the step structure, which is conducive to reducing the influence of the metal layer on an aperture ratio in a pixel region while improving the consistency of capacitances generated by the metal layer and pixel electrodes in different pixel regions.

For example, the display device may further include a color film substrate disposed oppositely to the array substrate, and a liquid crystal layer disposed between the array substrate and the color film substrate.

For example, the display device may be a liquid crystal display device, or any product or component having the display function and including the liquid crystal display device, such as a television, a digital camera, a mobile phone, a watch, a tablet computer, a notebook computer and a navigator, which will not be limited in the embodiments of the present disclosure.

The following statements should be noted:
(1) The accompanying drawings related to the embodiments of the present disclosure involve only the structures in connection with the embodiments of the present disclosure, and other structures can be referred to common designs.
(2) In case of no conflict, features in one embodiment or in different embodiments of the present disclosure can be combined.

The foregoing is merely exemplary embodiments of the disclosure, but is not used to limit the protection scope of the disclosure. The protection scope of the disclosure shall be defined by the attached claims.

The invention claimed is:
1. An array substrate, comprising:
a base substrate;
a plurality of gate lines located on the base substrate;
a metal layer located on a side of the plurality of gate lines away from the base substrate, wherein the metal layer comprises a plurality of data lines that extend in a first direction and are arranged in a second direction; the plurality of gate lines extend in the second direction and are arranged in the first direction; the first direction and the second direction intersect; the plurality of data lines and the plurality of gate lines intersect to define a plurality of pixel regions;

wherein at least one gate line comprises a gate line pad that comprises a protrusion protruding towards the pixel region relative to a portion of the gate line other than the gate line pad, and the metal layer located in the pixel region comprises a plurality of traces extending along at least part of a contour of the pixel region;

the plurality of traces comprise a plurality of first traces surrounding at least part of edges of the protrusion, and the plurality of first traces are connected end to end;

the array substrate further comprises a pixel electrode and a thin film transistor, wherein the thin film transistor comprises a first electrode, a gate electrode and a second electrode; the first electrode and the second electrode both overlap a film layer where the gate lines are located; the first electrode is electrically connected to the pixel electrode by a first connecting portion, and the second electrode is electrically connected to the data line; the first electrode, the second electrode and the first connecting portion are all structures in the metal layer;

the plurality of pixel regions comprise at least one first pixel region and at least one second pixel region; the first pixel region is a pixel region corresponding to the gate line pad, and the second pixel region is a pixel region corresponding to the portion of the gate line other than the gate line pad; at least part of the first connecting portion in the first pixel region surrounds at least part of edges of the protrusion; and a ratio of an area of an orthographic projection of the first connecting portion within the first pixel region on the base substrate to an area of an orthographic projection of the first connecting portion within the second pixel region on the base substrate is 0.8-1.2, wherein the edges of the protrusion comprises a protrusion edge of which an extension direction is parallel neither to the first direction nor to the second direction; a number of the plurality of first traces is greater than or equal to 2, and a length of each first trace is $L_i$; an orthographic projection of each first trace on the base substrate is a first orthographic projection, an orthographic projection of the protrusion edge on the base substrate is a second orthographic projection; the first orthographic projection comprises a long edge extending in an extension direction thereof and close to the second orthographic projection; a minimum distance between the long edge and the second orthographic projection is $d_i$; an included angle between the long edge and the second orthographic projection is $\theta_i$; and a first parameter $C_{pad}$ in a capacitance between the first trace and the protrusion edge meets:

$$C_{pad} = \sum_{i=1}^{N} \ln\left(\frac{L_i}{d_i} \times \sin\theta_i + 1\right),$$

with N being the number of the plurality of first traces, i being a positive integer of not less than 1 and N being a positive integer of not less than 2, and wherein the first parameter $C_{pad}$ meets: $0.035 \leq C_{pad} \leq 5$.

2. The array substrate according to claim 1, wherein each first trace extends in the first direction or the second direction, and the plurality of first traces are connected end to end to form a step structure.

3. The array substrate according to claim 1, wherein the plurality of first traces are connected end to end to form an arc-shaped structure.

4. The array substrate according to claim 1, wherein the first connecting portion overlaps the pixel electrode in a direction perpendicular to the base substrate.

5. The array substrate according to claim 1, wherein the metal layer further comprises a common electrode located in the pixel region;

in a direction perpendicular to the base substrate, the common electrode overlaps the pixel electrode, and the first electrode and the second electrode of the thin film transistor are both insulated from the common electrode, and wherein the common electrode in the first pixel region comprises at least part of the plurality of first traces.

6. The array substrate according to claim 5, wherein a ratio of an area of an orthographic projection of the common electrode within the first pixel region on the base substrate to an area of an orthographic projection of the common electrode within the second pixel region on the base substrate is 0.8-1.2, wherein a ratio of a length of the common electrode within the first pixel region to a length of the common electrode within the second pixel region is 0.8-1.2, and wherein a ratio of a length of the first connecting portion within the first pixel region to a length of the first connecting portion within the second pixel region is 0.8-1.2.

7. The array substrate according to claim 5, wherein two gate lines located on two sides of at least one first pixel region each comprise the gate line pad protruding towards the first pixel region; the common electrode comprises the first trace surrounding the protrusion of the gate line pad on one of the two gate lines; and at least part of the first connecting portion surrounds the protrusion of the gate line pad on the other one of the two gate lines, and wherein the gate electrode is located on a portion of the gate line other than the gate line pad.

8. The array substrate according to claim 7, wherein the first connecting portion comprises a sub-portion extending in the first direction and a sub-portion extending in the second direction.

9. The array substrate according to claim 5, wherein the common electrode within the second pixel region comprises a first common sub-electrode extending in the second direction and a second common sub-electrode extending in the first direction; the first common sub-electrode is disposed at a position away from the first electrode of the thin film transistor corresponding to the pixel region where the first common sub-electrode is located; two ends of the first common sub-electrode are electrically connected to two second common sub-electrodes, respectively; and the two second common sub-electrodes are adjacent to two data lines, respectively, and wherein the first connecting portion comprises at least a sub-portion extending in the first direction.

10. The array substrate according to claim 5, further comprising a common electrode line disposed at a same layer with the plurality of gate lines, wherein the common electrode is electrically connected to the common electrode line, wherein the common electrode line extends in the second direction, and the first connecting portion overlaps the common electrode line in the direction perpendicular to the base substrate, and wherein an insulating layer is disposed between the pixel electrode and the metal layer; the first connecting portion is electrically connected to the pixel electrode through a via hole in the insulating layer; and a straight line parallel to the first direction passes through an orthographic projection of the via hole and the gate line pad on the base substrate.

11. The array substrate according to claim 10, wherein the common electrode further comprises a third common sub-electrode extending in the first direction; and the third common sub-electrode and at least part of the sub-portions extending in the first direction in the first connecting portion are located in a same straight line to divide the pixel region into two subpixel regions, and wherein at least part of the first connecting portion and the third common sub-electrode are located on two sides of the common electrode line, respectively.

12. The array substrate according to claim 1, wherein the plurality of traces within the second pixel region comprise a second trace parallel to the second direction, and an edge on a side, close to the second trace, of the gate line having a shortest distance to the second trace is a sloping edge not parallel to the second direction;

a minimum distance between an orthographic projection of the second trace on the base substrate and an orthographic projection of the sloping edge on the base substrate is $d_h$; a length of the second trace is $L_h$; an included angle between the orthographic projection of the second trace on the base substrate and the orthographic projection of the sloping edge on the base substrate is $\theta_h$; and a second parameter $C_{tft}$ for a capacitance between the second trace and the sloping edge meets:

$$C_{tft} = \ln\left[\left(\frac{L_h}{d_h}\right) \times \sin\theta_h + 1\right],$$

wherein the second parameter $C_{tft}$ meets: $0.01 \leq C_{tft} \leq 2.5$, and wherein a ratio of the first parameter to the second parameter meets: $1 \leq C_{pad}/C_{tft} \leq 7$.

13. The array substrate according to claim 1, wherein each of the plurality of traces extends in the first direction or the second direction.

14. The array substrate according to claim 1, wherein the gate line pad is configured to be opposed to a support portion in a direction perpendicular to the base substrate.

15. The array substrate according to claim 1, wherein the first connecting portion extends in the first direction to be electrically connected to the pixel electrode.

16. The array substrate according to claim 15, wherein the gate line pad comprises the gate electrode.

17. The array substrate according to claim 1, wherein the first connecting portion and the first electrode of the thin film transistor are of an integrated structure.

18. An array substrate, comprising:
a base substrate;
a plurality of gate lines located on the base substrate;
a metal layer located on a side of the plurality of gate lines away from the base substrate, wherein the metal layer comprises a plurality of data lines that extend in a first direction and are arranged in a second direction; the plurality of gate lines extend in the second direction and are arranged in the first direction; the first direction and the second direction intersect; the plurality of data lines and the plurality of gate lines intersect to define a plurality of pixel regions;

wherein at least one gate line comprises a gate line pad that comprises a protrusion protruding towards the pixel region relative to a portion of the gate line other than the gate line pad, and the metal layer located in the pixel region comprises a plurality of traces extending along at least part of a contour of the pixel region;

the plurality of traces comprise a plurality of first traces surrounding at least part of edges of the protrusion, and the plurality of first traces are connected end to end;

the array substrate further comprises a pixel electrode and a thin film transistor, wherein the thin film transistor comprises a first electrode, a gate electrode and a second electrode; the first electrode and the second electrode both overlap a film layer where the gate lines are located; the first electrode is electrically connected to the pixel electrode by a first connecting portion, and the second electrode is electrically connected to the data line; the first electrode, the second electrode and the first connecting portion are all structures in the metal layer;

the metal layer further comprises a common electrode located in the pixel region; in a direction perpendicular to the base substrate, the common electrode overlaps the pixel electrode, and the first electrode and the second electrode of the thin film transistor are both insulated from the common electrode;

the plurality of pixel regions comprise at least one first pixel region and at least one second pixel region; the first pixel region is a pixel region corresponding to the gate line pad, and the second pixel region is a pixel region corresponding to the portion of the gate line other than the gate line pad; the common electrode comprises at least part of the plurality of first traces; and a ratio of an area of an orthographic projection of the common electrode within the first pixel region on the base substrate to an area of an orthographic projection of the common electrode within the second pixel region on the base substrate is 0.8-1.2, wherein the edges of the protrusion comprises a protrusion edge of which an extension direction is parallel neither to the first direction nor to the second direction; a number of the plurality of first traces is greater than or equal to 2, and a length of each first trace is $L_i$; an orthographic projection of each first trace on the base substrate is a first orthographic projection, an orthographic projection of the protrusion edge on the base substrate is a second orthographic projection; the first orthographic projection comprises a long edge extending in an extension direction thereof and close to the second orthographic projection; a minimum distance between the long edge and the second orthographic projection is $d_i$; an included angle between the long edge and the second orthographic projection is $\theta_i$; and a first parameter $C_{pad}$ in a capacitance between the first trace and the protrusion edge meets:

$$C_{pad} = \sum_{i=1}^{N} \ln\left(\frac{L_i}{d_i} \times \sin\theta_i + 1\right),$$

with N being the number of the plurality of first traces, i being a positive integer of not less than 1 and N being a positive integer of not less than 2, and wherein the first parameter $C_{pad}$ meets: $0.035 \leq C_{pad} \leq 5$.

* * * * *